United States Patent
Lu et al.

(10) Patent No.: US 12,459,980 B2
(45) Date of Patent: Nov. 4, 2025

(54) IL-21 PRODRUGS AND METHODS OF USE THEREOF

(71) Applicant: ASKGENE PHARMA, INC., Camarillo, CA (US)

(72) Inventors: Yuefeng Lu, Newbury Park, CA (US); Chunxiao Yu, Santa Barbara, CA (US)

(73) Assignee: ASKGENE PHARMA, INC., Camarillo, CA (US)

( * ) Notice: Subject to any disclaimer, the term of this patent is extended or adjusted under 35 U.S.C. 154(b) by 1134 days.

(21) Appl. No.: 17/262,940

(22) PCT Filed: Jul. 25, 2019

(86) PCT No.: PCT/US2019/043360
§ 371 (c)(1),
(2) Date: Jan. 25, 2021

(87) PCT Pub. No.: WO2020/023702
PCT Pub. Date: Jan. 30, 2020

(65) Prior Publication Data
US 2021/0163562 A1    Jun. 3, 2021

Related U.S. Application Data

(60) Provisional application No. 62/703,383, filed on Jul. 25, 2018.

(51) Int. Cl.
 C07K 14/54 (2006.01)
 A61K 38/00 (2006.01)
 A61P 35/00 (2006.01)
 C07K 14/715 (2006.01)
 C07K 16/28 (2006.01)

(52) U.S. Cl.
 CPC .............. C07K 14/54 (2013.01); A61P 35/00 (2018.01); C07K 14/7155 (2013.01);
 (Continued)

(58) Field of Classification Search
CPC combination set(s) only.
See application file for complete search history.

(56) References Cited

U.S. PATENT DOCUMENTS

| | | |
|---|---|---|
| 4,411,993 A | 10/1983 | Gillis |
| 5,229,109 A | 7/1993 | Grimm et al. |

(Continued)

FOREIGN PATENT DOCUMENTS

| | | | |
|---|---|---|---|
| CA | 3083946 A1 * | 6/2019 | ............. A61P 35/00 |
| CN | 101426916 A | 5/2009 | |

(Continued)

OTHER PUBLICATIONS

Shen S, Sckisel G, Sahoo A, Lalani A, Otter DD, Pearson J, DeVoss J, Cheng J, Casey SC, Case R, Yang M, Low R, Daris M, Fan B, Agrawal NJ, Ali K. Engineered IL-21 Cytokine Muteins Fused to Anti-PD-1 Antibodies Can Improve CD8+ T Cell Function and Anti-tumor Immunity. Front Immunol. May 8, 2020;11:832. (Year: 2020).*

(Continued)

*Primary Examiner* — Adam Weidner
*Assistant Examiner* — Laura Ann Essex
(74) *Attorney, Agent, or Firm* — Steptoe LLP; Z. Ying Li; Mauricio Alvarez

(57) ABSTRACT

Provided herein are IL-21 prodrugs and methods of making and using thereof for stimulating the immune system, or treating cancer or an infectious disease.

25 Claims, 9 Drawing Sheets
Specification includes a Sequence Listing.

(52) U.S. Cl.
CPC .......... *C07K 16/2818* (2013.01); *A61K 38/00* (2013.01); *C07K 2319/30* (2013.01)

(56) References Cited

U.S. PATENT DOCUMENTS

| | | |
|---|---|---|
| 6,682,736 B1 | 1/2004 | Hanson et al. |
| 6,942,853 B2 | 9/2005 | Chernajovsky et al. |
| 6,955,807 B1 | 10/2005 | Shanafelt et al. |
| 6,984,720 B1 | 1/2006 | Korman et al. |
| 7,008,624 B1 | 3/2006 | Grabstein et al. |
| 7,153,507 B2 | 12/2006 | van de Winkel et al. |
| 7,858,081 B2 | 12/2010 | Bernard et al. |
| 7,943,743 B2 | 5/2011 | Korman et al. |
| 8,008,449 B2 | 8/2011 | Korman et al. |
| 8,211,420 B2 | 7/2012 | Bondensgaard et al. |
| 8,563,697 B2 | 10/2013 | Clarke et al. |
| 8,642,742 B2 | 2/2014 | Hofer et al. |
| 8,642,745 B2 | 2/2014 | Arathoon et al. |
| 9,206,260 B2 | 12/2015 | Hofer et al. |
| 9,428,567 B2 | 8/2016 | Garcia et al. |
| 9,447,159 B2 | 9/2016 | Ast et al. |
| 9,474,780 B2 | 10/2016 | Bokvist et al. |
| 9,732,134 B2 | 8/2017 | Gavin et al. |
| 9,822,180 B2 | 11/2017 | Cobbold et al. |
| 10,035,836 B1 | 7/2018 | Greve |
| 10,137,195 B2 | 11/2018 | Sahin et al. |
| 10,301,384 B2 | 5/2019 | Vicari et al. |
| 10,611,812 B2 | 4/2020 | Wang et al. |
| 10,800,825 B2 | 10/2020 | Lee et al. |
| 10,815,303 B2 | 10/2020 | Yue et al. |
| 10,858,452 B2 | 12/2020 | Mortier et al. |
| 11,130,806 B2 | 9/2021 | Vicari et al. |
| 11,267,883 B2 | 3/2022 | Laine et al. |
| 11,357,820 B2 | 6/2022 | Corvari et al. |
| 11,459,404 B2 | 10/2022 | Bacac et al. |
| 11,845,801 B2 | 12/2023 | Lu et al. |
| 2002/0039581 A1 | 4/2002 | Carreno et al. |
| 2002/0086014 A1 | 7/2002 | Korman et al. |
| 2003/0124678 A1 | 7/2003 | Epstein et al. |
| 2004/0053829 A1 | 3/2004 | Pfizenmaier et al. |
| 2005/0201994 A1 | 9/2005 | Korman et al. |
| 2006/0236411 A1 | 10/2006 | Dreher et al. |
| 2011/0150892 A1 | 6/2011 | Thudium et al. |
| 2011/0250213 A1 | 10/2011 | Tso et al. |
| 2011/0306752 A1 | 12/2011 | Wittrup et al. |
| 2013/0022623 A1 | 1/2013 | Karsunky et al. |
| 2013/0089516 A1 | 4/2013 | Frelinger et al. |
| 2014/0135482 A1 | 5/2014 | Bossenmaier et al. |
| 2014/0294759 A1 | 10/2014 | Chu et al. |
| 2014/0314709 A1 | 10/2014 | León Monzón et al. |
| 2014/0328791 A1 | 11/2014 | Bossard et al. |
| 2015/0266954 A1 | 9/2015 | Davies et al. |
| 2016/0319256 A9 | 11/2016 | Deming et al. |
| 2016/0340413 A1 | 11/2016 | Duerner et al. |
| 2017/0173149 A1 | 6/2017 | Ettinger et al. |
| 2017/0204154 A1 | 7/2017 | Greve |
| 2017/0240608 A1 | 8/2017 | Stagliano et al. |
| 2017/0306303 A1 | 10/2017 | Taunton et al. |
| 2018/0086849 A1* | 3/2018 | Bacac .................. C07K 16/32 |
| 2018/0118828 A1 | 5/2018 | Bernett et al. |
| 2019/0046611 A1* | 2/2019 | Ali ...................... A61K 47/6849 |
| 2019/0070264 A1* | 3/2019 | Qu ........................ C12N 15/62 |
| 2019/0153471 A1* | 5/2019 | Stevens ................ C12N 15/86 |
| 2019/0367576 A1 | 12/2019 | Winston et al. |
| 2020/0123227 A1 | 4/2020 | Fu et al. |
| 2020/0164069 A1 | 5/2020 | Ettinger et al. |
| 2020/0207846 A1 | 7/2020 | Igawa et al. |
| 2020/0331966 A1 | 10/2020 | Stover et al. |
| 2020/0347128 A1 | 11/2020 | Tagaya et al. |
| 2020/0392235 A1 | 12/2020 | Lu et al. |
| 2021/0260163 A1 | 8/2021 | Yu et al. |
| 2022/0127352 A1 | 4/2022 | Laine et al. |
| 2022/0162280 A1 | 5/2022 | Fu et al. |
| 2022/0289822 A1 | 9/2022 | Lu et al. |
| 2022/0306714 A1 | 9/2022 | Yao et al. |
| 2022/0356221 A1 | 11/2022 | Lu et al. |
| 2023/0096452 A1 | 3/2023 | Zhou et al. |
| 2023/0108562 A1 | 4/2023 | Lu et al. |
| 2024/0067739 A1 | 2/2024 | Lu et al. |
| 2024/0076331 A1 | 3/2024 | Lu et al. |
| 2024/0076355 A1 | 3/2024 | Lu et al. |

FOREIGN PATENT DOCUMENTS

| | | |
|---|---|---|
| CN | 110174363 | A 8/2019 |
| EP | 1870459 A1 | 12/2007 |
| EP | 2639241 A2 | 9/2013 |
| EP | 2665486 B1 | 12/2019 |
| EP | 3093295 B1 | 5/2020 |
| EP | 3733716 A1 | 11/2020 |
| NZ | 567242 A | 11/2009 |
| WO | WO 1999/029732 A2 | 6/1999 |
| WO | WO 2002/022833 A1 | 3/2002 |
| WO | WO 2003/017935 A2 | 3/2003 |
| WO | WO 2003/028630 A2 | 4/2003 |
| WO | WO 2004/021861 A2 | 3/2004 |
| WO | WO 2005/063279 A1 | 7/2005 |
| WO | WO 2005/066348 A2 | 7/2005 |
| WO | WO 2005/085282 A1 | 9/2005 |
| WO | WO 2005/086798 A2 | 9/2005 |
| WO | WO 2008/003473 A2 | 1/2008 |
| WO | WO 2009/025846 A2 | 2/2009 |
| WO | WO 2009/061853 A2 | 5/2009 |
| WO | WO 2010/040105 A2 | 4/2010 |
| WO | WO 2012/061536 A2 | 5/2012 |
| WO | WO 2012/099886 A1 | 7/2012 |
| WO | WO 2012/107417 A1 | 8/2012 |
| WO | WO 2012/120125 A1 | 9/2012 |
| WO | WO 2012/146628 A1 | 11/2012 |
| WO | WO 2014/066527 A2 | 5/2014 |
| WO | WO 2014/164553 A1 | 10/2014 |
| WO | WO 2015/066279 A2 | 5/2015 |
| WO | WO 2015/110930 A1 | 7/2015 |
| WO | WO 2016/001275 A1 | 1/2016 |
| WO | WO 2016/014428 A2 | 1/2016 |
| WO | WO 2016/082677 A1 | 6/2016 |
| WO | WO 2016/086186 A2 | 6/2016 |
| WO | WO 2016/090173 A1 | 6/2016 |
| WO | WO 2016/112497 A1 | 7/2016 |
| WO | WO 2016/115275 A1 | 7/2016 |
| WO | WO 2016/200645 A1 | 12/2016 |
| WO | WO-2017013203 A1 * | 1/2017 ............. A61P 35/00 |
| WO | WO 2017/046200 A1 | 3/2017 |
| WO | WO 2017/162587 A1 | 9/2017 |
| WO | WO 2017/201432 A2 | 11/2017 |
| WO | WO 2017/220989 A1 | 12/2017 |
| WO | WO 2018/004338 A1 | 1/2018 |
| WO | WO 2018/119246 A1 | 6/2018 |
| WO | WO 2018/191438 A1 | 10/2018 |
| WO | 2019/174617 A1 | 9/2019 |
| WO | WO 2019/222294 A1 | 11/2019 |
| WO | WO 2019/222296 A1 | 11/2019 |
| WO | WO 2019/246392 A1 | 12/2019 |
| WO | WO 2020/069398 A1 | 4/2020 |
| WO | WO 2020/227019 A1 | 11/2020 |
| WO | WO 2020/242884 A1 | 12/2020 |
| WO | WO 2020/247843 A2 | 12/2020 |
| WO | 2022/032003 A1 | 2/2022 |
| WO | WO 2022/155541 A1 | 7/2022 |
| WO | WO 2022/159395 A1 | 7/2022 |
| WO | WO 2022/165443 A1 | 8/2022 |
| WO | WO 2022/178103 A1 | 8/2022 |
| WO | WO 2022/221746 A1 | 10/2022 |
| WO | WO 2023/044290 A1 | 3/2023 |
| WO | 2024/119193 A2 | 6/2024 |
| WO | 2024/252184 | 12/2024 |

OTHER PUBLICATIONS

Kang L, Bondensgaard K, Li T, Hartmann R, Hjorth SA. Rational design of interleukin-21 antagonist through selective elimination of the gammaC binding epitope. J Biol Chem. Apr. 1,

(56) References Cited

OTHER PUBLICATIONS

20106;285(16):12223-31. doi: 10.1074/jbc. M110. 101444. Epub Feb. 18, 2010. PMID: 20167599; PMCID: PMC2852961. (Year: 2010).*
Zhu X, Marcus WD, Xu W, Lee HI, Han K, Egan JO, Yovandich JL, Rhode PR, Wong HC. Novel human interleukin-15 agonists. J Immunol. Sep. 15, 2009;183(6):3598-607. doi: 10.4049/jimmunol. 0901244. Epub Aug. 26, 2009. PMID: 19710453; PMCID: PMC2814526. (Year: 2009).*
Wüest T, Gerlach E, Banerjee D, Gerspach J, Moosmayer D, Pfizenmaier K. TNF-Selectokine: a novel prodrug generated for tumor targeting and site-specific activation of tumor necrosis factor. Oncogene. Jun. 20, 2002;21(27):4257-65. doi: 10.1038/sj.onc. 1205193. PMID: 12082613. (Year: 2002).*
Hutmacher C, Neri D. Antibody-cytokine fusion proteins: Biopharmaceuticals with immunomodulatory properties for cancer therapy. Adv Drug Deliv Rev. Feb. 15, 2019;141:67-91. doi: 10.1016/j.addr.2018.09.002. Epub Sep. 7, 2018. PMID: 30201522. (Year: 2018).*
Giri JG, Ahdieh M, Eisenman J, Shanebeck K, Grabstein K, Kumaki S, Namen A, Park LS, Cosman D, Anderson D. Utilization of the beta and gamma chains of the IL-2 receptor by the novel cytokine IL-15. EMBO J. Jun. 15, 1994;13(12):2822-30. doi: 10.1002/j.1460-2075.1994.tb06576.x. PMID: 8026467 (Year: 1994).*
Mehta DS, Wurster AL, Grusby MJ. Biology of IL-21 and the IL-21 receptor. Immunol Rev. Dec. 2004;202:84-95. doi: 10.1111/j.0105-2896.2004.00201.x. PMID: 15546387. (Year: 2004).*
Adoro et al., "IL-21 induces antiviral microRNA-29 in CD4 T cells to limit HIV-1 infection," Nature Communications 6:7562 (12 pages) (2015).
Bazan, "Unraveling the structure of IL-2," Science 257:410-13 (1992).
Bernard et al., "Identification of an interleukin-15alpha receptor-binding site on human interleukin-15," J Biol Chem. 279:24313-22 (2004).
Bogdan et al., "Macrophage deactivation by interleukin 10," J Exp Med. 174(6):1549-55 (1991).
"Booty et al., ""IL-21 signaling is essential for optimal host resistance against *Mycobacterium tuberculosis* infection,"" Nature, Scientific Reports 6:36720 (13 pages) (2016)."
Charych et al., "Modeling the receptor pharmacology, pharmacokinetics, and pharmacodynamics of NKTR-214, a kinetically-controlled interleukin-2 (IL2) receptor agonist for cancer immunotherapy," PLoS One 12(7) (2017).
Chothia et al., "Canonical structures for the hypervariable regions of immunoglobulins," J. Mol. Biol. 96(4): 901-17 (1987).
Colombo et al., "Interleukin-12 in anti-tumor immunity and immunotherapy," Cytokine Growth Factor Rev. 13(2):155-68 (2002).
Conlon et al., "IL15 by Continuous Intravenous Infusion to Adult Patients with Solid Tumors in a Phase I Trial Induced Dramatic NK-Cell Subset Expansion," Clin Cancer Res. 25(16):4945-4954 (2019).
Del Vecchio et al., "Interleukin-12: biological properties and clinical application," Clin Cancer Res. 13(16):4677-85 (2007).
Dall'ACQUA et al., "Properties of human IgG1s engineered for enhanced binding to the neonatal Fc receptor (FcRn)," J Biol Chem. 281: 23514-24 (2006).
De Waal Malefyt et al., "Interleukin 10 (IL-10) and viral IL-10 strongly reduce antigen-specific human T cell proliferation by diminishing the antigen-presenting capacity of monocytes via downregulation of class II major histocompatibility complex expression," J Exp Med. 174(4):915-24 (1991).
Database UniProt [Online] RecName: Full=High affinity IL-2 receptor subunit beta {ECO:00002561ARBA:ARBA00014194}; retrieved from EBI accession No. Uniprot: A0A2K6RLA0; Database accession No. A0A2K6RLA0; the whole document.
Fiorentino et al., "IL-10 acts on the antigen-presenting cell to inhibit cytokine production by Th1 cells," J Immunol. 146(10):3444-51 (1991).

Fontenot et al., "A function for interleukin 2 in Foxp3-expressing regulatory T cells," Nature Immunol 6:1142-51 (2005).
Gelebart et al., "Interleukin-21 effectively induces apoptosis in mantle cell lymphoma through a STAT1-dependent mechanism," Leukemia 23:1836-1846 (2009).
Gharibi et al., "Biological effects of IL-21 on different immune cells and its role in autoimmune diseases," Immunobiology 221(2):357-67 (2016).
Giri et al., "Utilization of the beta and gamma chains of the IL-2 receptor by the novel cytokine IL-15," EMBO J. 13:2822-30 (1994).
Giri et al., "IL-15, a novel T cell growth factor that shares activities and receptor components with I L-2," J Leukoc Biol. 57:763-6 (1995).
Grimm et al., p. 25, Abstr 5861 (2016) [www.page-meeting.org/?abstract=5861].
Guo et al., "Immunobiology of the IL-15/IL-15Rα complex as an antitumor and antiviral agent," Cytokine Growth Factor Rev 38:10-21 (2017).
Harrington et al., "Modulation of immune checkpoint molecule expression in mantle cell lymphoma," Leuk Lymphoma 60(10):2498-2507 (2019).
Heaton et al. "Human interleukin 2 analogues that preferentially bind the intermediate-affinity interleukin 2 receptor lead to reduced secondary cytokine secretion: implications for the use of these interleukin 2 analogues in cancer immunotherapy," Cancer Res. 53(11):2597-602 (1993).
Hezareh et al. "Effector function activities of a panel of mutants of a broadly neutralizing antibody against human immunodeficiency virus type 1," J. Virol. 75(24):12161-8 (2001).
Hsu et al., "A cytokine receptor-masked IL2 prodrug selectively activates tumor-infiltrating lymphocytes for potent antitumor therapy," Nature Communications, vol. 12, No. 1 (2021).
Johnson et al., "Soluble IL-2 receptor beta and gamma subunits: ligand binding and cooperativity," Eur Cytokine Netw. 5(1):23-34 (1994).
Jounaidi et al., "Tethering IL2 to Its Receptor IL2Rβ Enhances Antitumor Activity and Expansion of Natural Killer NK92 Cells," Cancer Research, vol. 77 ( 21) 5938-5951 (2017).
Kang et al., "Rational design of interleukin-21 antagonist through selective elimination of the gammaC binding epitope," J Biol Chem. 285(16):12223-31 (2010).
Kim et al., "Both integrated and differential regulation of components of the IL-2/IL-2 receptor system," Cytokine Growth Factor Rev. 17:349-66 (2006).
Kirwkood, "Cancer immunotherapy: the interferon-alpha experience," Semin Oncol. 29(3 Suppl 7):18-26 (2002).
Klein et al., "Cergutuzumab amunaleukin (CEA-IL2v), a CEA-targeted IL-2 variant-based immunocytokine for combination cancer immunotherapy: Overcoming limitations of aldesleukin and conventional IL-2-based immunocytokines," Oncoimmunology 6(3):e1277306 (2017).
Korn et al., "IL-21 initiates an alternative pathway to induce proinflammatory T(H)17 cells," Nature 448(7152):484-87 (2007).
Krieg et al., "Improved IL-2 immunotherapy by selective stimulation of IL-2 receptors on lymphocytes and endothelial cells," Proc Natl Acad Sci. 107:11906-11 (2010).
Kuen et al., "Antibody masked cytokines as new approach in targeted tumor therapy," (2018) (Doctoral Thesis). XP055702405.
Lasek et al., "Interleukin 12: still a promising candidate for tumor immunotherapy?" Cancer Immunol Immunother. 63(5):419-35 (2014).
Lehours et al., "Subunit structure of the high and low affinity human interleukin-15 receptors," Eur Cytokine Netw. 11:207-15 (2000).
Lopes et al., "ALKS 4230: a novel engineered IL-2 fusion protein with an improved cellular selectivity profile for cancer immunotherapy," J Immunother Cancer. 8(1) (2020).
Macatonia et al., "Differential effect of IL-10 on dendritic cell-induced T cell proliferation and IFN-gamma production," J Immunol. 150(9):3755-65 (1993).
Mcdonald et al., "Interleukin 2-Based Fusion Proteins for the Treatment of Cancer," Journal of Immunology Research, vol. 2021 pp. 1-11 (2021).
Marth et al., "Interferon-gamma in combination with carboplatin and paclitaxel as a safe and effective first-line treatment option for

(56) References Cited

OTHER PUBLICATIONS advanced ovarian cancer: results of a phase I/II study," Int. J. Gynecol. (Cancer) 16:1522-1528 (2006).
Merchant et al., "An efficient route to human bispecific IgG," Nature Biotech 16:677-81 (1998).
Minami et al., "The IL-2 receptor complex: its structure, function, and target genes," Annu Rev Immunol. 11:245-68 (1993).
Moretto et al., "IL-21 is important for induction of KLRG1+ effector CD8 T cells during acute intracellular infection," J Immunol. 196(1):375-384 (2016).
Nurieva et al., "Essential autocrine regulation by IL-21 in the generation of inflammatory T cells," Nature 448(7152):480-83 (2007).
Ortiz-Sanchez et al., "Antibody-cytokine fusion proteins: applications in cancer therapy," Expert Opin Biol Ther. 8(5): 609-632 (2008).
Parkin et al., "An overview of the immune system," Immunology 357(9270):1777-89 (2001).
Pettit et al., "Structure-Function Studies of Interleukin 15 using Site-specific Mutagenesis, Polyethylene Glycol Conjugation, and Homology Modeling," J Biol Chem. 272: 2312-18 (1997).
Publicover et al., "IL-21 is pivotal in determining age-dependent effectiveness of immune responses in a mouse model of human hepatitis B," J Clin Invest. 121(3):1154-62 (2011).
Puskas et al., "Development of an attenuated interleukin-2 fusion protein that can be activated by tumour-expressed proteases," Immunology 133:206-220 (2011).
Robbie et al., "A novel investigational Fc-modified humanized monoclonal antibody, motavizumab-YTE, has an extended half-life in healthy adults," Antimicrob Agents Chemother. 57(12):6147-53 (2013).
Sanjabi et al., "Regulation of the Immune Response by TGF-β: From Conception to Autoimmunity and Infection," Cold Spring Harb Perspect Biol. 9(6) (2017).
Schmidt et al., "Safety and Clinical Effect of Subcutaneous Human Interleukin-21 in Patients with Metastatic Melanoma or Renal Cell Carcinoma: A Phase I Trial," Clin Cancer Res. 16(21):5312-19 (2010).
Skrombolas et al., "Development of an Interleukin-12 Fusion Protein That is Activated by Cleavage with Matrix Metalloproteinase 9," J Interferon Cytokine Res. 39(4):233-245 (2019).
Smith, "Interleukin-2: inception, impact, and implications," Science 240:1169-76 (1988).
Soerensen et al., "Safety, PK/PD, and anti-tumor activity of RO6874281, an engineered variant of interleukin-2 (IL-2v) targeted to tumor-associated fibroblasts via binding to fibroblast activation protein (FAP)," J Clin Onc. 36:15 suppl (2018).
Sogkas et al., "First Association of Interleukin 12 Receptor Beta 1 Deficiency with Sjogren's Syndrome," Front Immunol. 8:885 (2017).
Spiess et al., "Alternative molecular formats and therapeutic applications for bispecific antibodies," Mol Imm. 67(2)(A):95-106 (2015).
Spolski et al., "The Yin and Yang of Interleukin-21 in Allergy, Autoimmunity and Cancer," Curr Opin Immunol. 20(3):295-301 (2008).
Spolski et al., "Interleukin-21: basic biology and implications for cancer and autoimmunity," Annu Rev Immunol. 26:57-79 (2008).
Tam et al., "Functional, Biophysical, and Structural Characterization of Human IgG1 and IgG4 Fc Variants with Ablated Immune Functionality," Antibodies 6(12):1-34 (2017).
Vazquez-Lombardi et al., "Molecular Engineering of Therapeutic Cytokines," Antibodies 2(3), 426-451 (2013).
Wang et al., "Structure of the quaternary complex of interleukin-2 with its alpha, beta, and gammac receptors," Science 310:1159-63 (2005).
Wang et al., "Targeting IL-10 Family Cytokines for the Treatment of Human Diseases," Cold Spring Harb Perspect Biol. 11(2):a028548 (2019).
Watford et al., "The biology of IL-12: coordinating innate and adaptive immune responses," Cytokine Growth Factor Rev. 14(5):361-8 (2003).
Weerd et al. "Type I interferon receptors: biochemistry and biological functions," The Journal of Biological Chemistry 282 (28): 20053-7 (2007).
Wei et al., "The Sushi domain of soluble IL-15 receptor alpha is essential for binding IL-15 and inhibiting inflammatory and allogenic responses in vitro and in vivo," J Immunol. 167(1):277-82 (2001).
Weidle et al., "Proteases as activators for cytotoxic prodrugs in antitumor therapy," Cancer Genomics Proteomics. 11(2):67-80 (2014).
Worthington et al., "Regulation of TGFβ in the immune system: an emerging role for integrins and dendritic cells," Immunobiology 217(12):1259-65 (2012).
Ye et al., "Targeting IL-2: an unexpected effect in treating immunological diseases," Signal Transduct Target Ther. 3:2 (2018).
Young et al., "Antibody-cytokine fusion proteins for treatment of cancer: engineering cytokines for improved efficacy and safety," Semin Oncol. 41(5): 623-636 (2014).
Zarkavelis et al., "The emerging role of Interleukin-21 as an antineoplastic immunomodulatory treatment option," Transl Cancer Res. 6(Suppl 2) S328-30 (2017).
Zhang et al., "Human IL-21 and IL-4 bind to partially overlapping epitopes of common gamma-chain," Biochem Biophys Res Commun. 300(2):291-6 (2003).
Zhu et al., "Novel Human Interleukin-15 Agonists," J Immnol. 183(6):3598 (2009).
DiSanto et al., "Interleukin-2 (IL-2) receptor gamma chain mutations in X-linked severe combined immunodeficiency disease result in the loss of high-affinity IL-2 receptor binding," Eur J Immunol. (1994) 24(2):475-9.
Donaldson et al., "Design and development of masked therapeutic antibodies to limit off-target effects: application to anti-EGFR antibodies," Cancer Biol Ther. (2009) 8(22):2147-52.
Rosen et al., "TransCon IL-2 β/γ: a novel long-acting prodrug with sustained release of an IL-2Rβ/γ-selective IL-2 variant with improved pharmacokinetics and potent activation of cytotoxic immune cells for the treatment of cancer," J Immunother Cancer. (2022) 10(7):e004991 (14 pages).
Sockolosky et al., "Selective targeting of engineered T cells using orthogonal IL-2 cytokine-receptor complexes," Science. (2018)359(6379):1037-1042.
Stauber et al., "Crystal structure of the IL-2 signaling complex: paradigm for a heterotrimeric cytokine receptor," Proc Natl Acad Sci U S A. (2006) 103(8):2788-93.
U.S. Appl. No. 18/960,740, filed Nov. 26, 2024, Chunxiao Yu.
Holcomb et al., "A forced marriage of IL-2 and PD-1 antibody nurtures tumor-infiltrating T cells," J Clin Invest. 132(3):e156628 (2022).
Mitra et al., "Interleukin-2 activity can be fine tuned with engineered receptor signaling clamps," Immunity 42(5):826-38 (2015).
Mullard, "Restoring IL-2 to its cancer immunotherapy glory," Nat Rev Drug Discov. 20(3):163-165 (2021).
Raeber et al., "A systematic review of interleukin-2-based immunotherapies in clinical trials for cancer and autoimmune diseases," eBioMedicine 90:104539 (25 pages) (2023).
Zhang et al., "A phase I/II study of ASKB589 (anti-claudin 18.2 [CLDN18.2] monoclonal antibody) in patients with solid tumors," Journal of Clinical Oncology 41(4 suppl):397-397 (2023).
Moya et al., "Isolation and characterization of modified species of a mutated (Cys(125)-Ala) recombinant human interleukin-2," J Chromatogr A. 971(1-2):129-42 (2002).
Robinson et al., "The potential and promise of IL-15 in immuno-oncogenic therapies." Immunol Lett. 190:159-168 (2017).

* cited by examiner

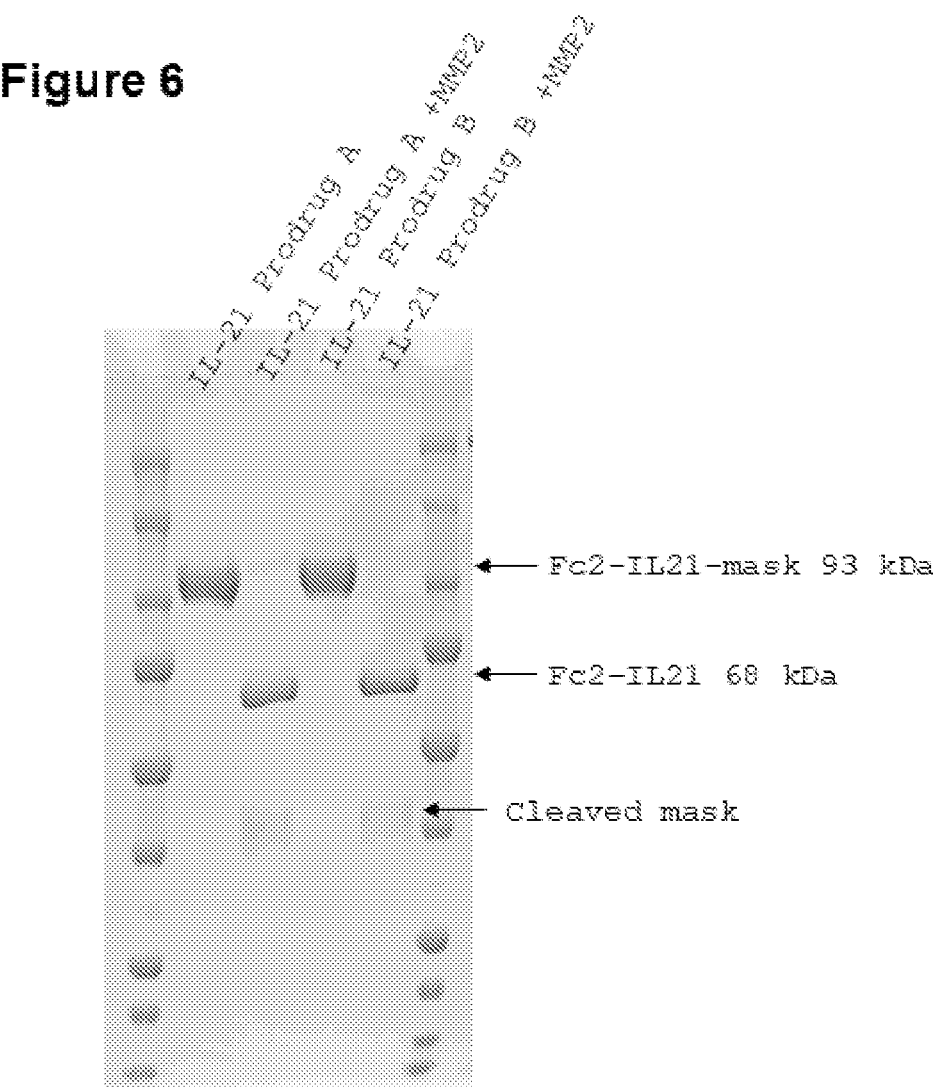

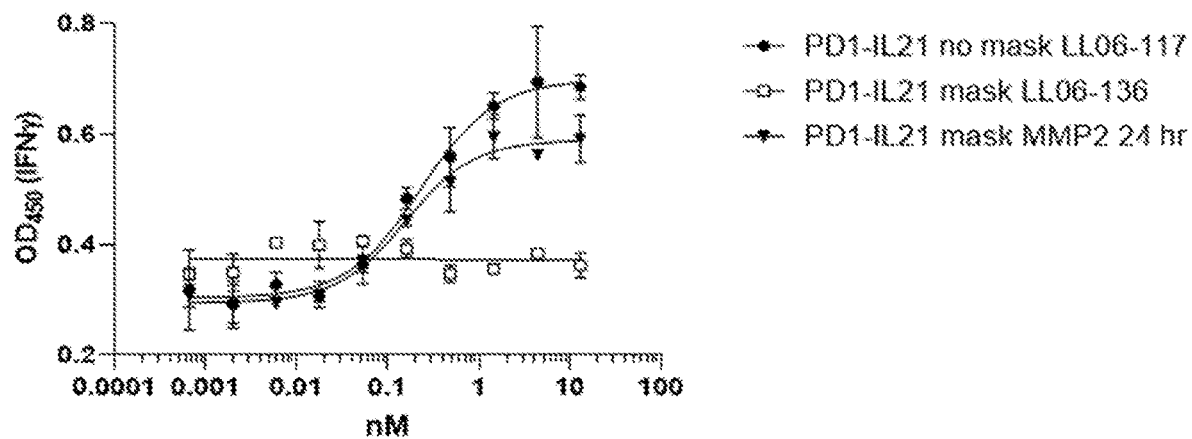

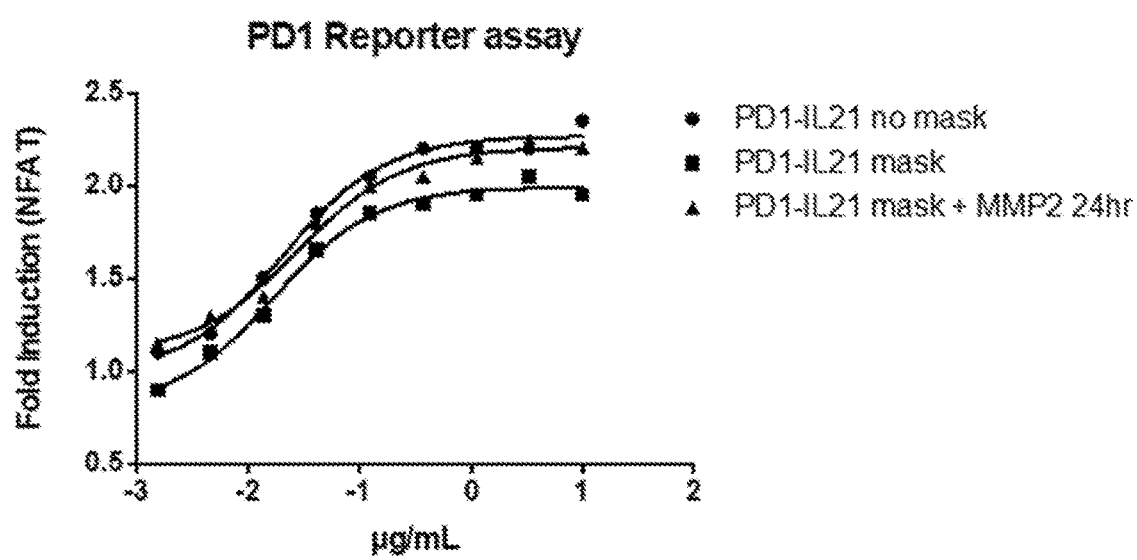

IL-21 PRODRUGS AND METHODS OF USE THEREOF

CROSS REFERENCE TO RELATED APPLICATIONS

The present application is a national stage application under 35 U.S.C. § 371 of International Patent Application No. PCT/US2019/043360, filed Jul. 25, 2019, which claims priority from U.S. Provisional Application No. 62/703,383, filed Jul. 25, 2018. The contents of both applications are incorporated herein by reference in their entirety.

SEQUENCE LISTING

The instant application contains a Sequence Listing that has been submitted electronically in ASCII format. The Sequence Listing is hereby incorporated by reference in its entirety. The ASCII copy, created on Jul. 22, 2019, is named 025471_WO003_SL.txt and is 189,683 bytes in size.

FIELD OF THE INVENTION

The present application relates to novel IL-21 prodrugs that are activatable at the site of a tumor. Further included in the present disclosure are methods of using the novel prodrugs.

BACKGROUND OF THE INVENTION

Interleukin-21 (IL-21) is produced by activated CD4$^+$ T cells, T-follicular helper cells, and natural killer T (NKT) cells (Spolski and Leonard, *Ann Rev Immunol.* (2008) 26:57008). IL-21 has been shown to exert pleiotropic effects on the proliferation, differentiation, and cytotoxicity of various classes of lymphoid cells. More recently, IL-21 has been further shown to play a crucial role in the differentiation of CD4$^+$ T cells into T-helper 17 (TH$_{17}$) cells, a subset of T cells associated with development of inflammatory conditions and autoimmune diseases (Korn et al., *Nature* (2007) 448(7152):484-87; Nurieva et al., *Nature* (2007) 448(7152):480-83).

The receptor complex of IL-21 is composed of the private chain IL-21Rα and the common chain γC (or Rγ); the common chain is shared by five other cytokines: IL-2, IL-4, IL-7, IL-9, and IL-15 (Spolski and Leonard, supra). Human IL-21 binds to IL-21Rα with a very high affinity ($K_D$~70 pM; Zhang et al., *Biochem Biophys Res Commun.* (2003) 300(2):291-6), while binding to IL-21Rγ with a relatively low affinity ($K_D$~160 μM).

Recombinant IL-21 has been tested in several clinical trials for the treatment of solid tumors (Zarkavelis et al., *Transl Cancer Res.* (2017) 6(Suppl 2):S328-30). In one of the studies, the maximum tolerated dose was established at 200 μg/kg (Schmidt et al., *Clin Cancer Res.* (2010) 16(21): 5312-19). Thus, as with other cytokine therapies, systemic toxicity may severely limit the therapeutic dosage of IL-21. In addition, IL-21 may encounter "PK sinks" in vivo because it binds to its receptor IL-21Rα with a very high affinity (Zhang et al., supra). Consequently, it may be difficult for IL-21 to achieve optimal pharmacokinetics (PK) and exposure in patients. Analogs of IL-21 have been disclosed in U.S. Pat. No. 8,211,420 and Kan et al., *J Biol Chem.* (2010) 285(16):12223-31. However, some of the analogs have selectively reduced γC binding affinity and are IL-21 antagonists.

There remains a need to develop IL-21-based cancer therapeutics that are more tumor site-selective and have improved PK and efficacy, while causing fewer severe side effects.

SUMMARY OF THE INVENTION

The present disclosure provides a IL-21 prodrug comprising a cytokine moiety, a masking moiety, and a carrier moiety, wherein the cytokine moiety is an IL-21 agonist polypeptide, wherein the masking moiety binds to the cytokine moiety and inhibits a biological activity of the cytokine moiety (e.g., prevents the cytokine moiety from binding to its receptor on a target cell, or reduces one or more biological activities of the cytokine moiety, e.g., stimulation of interferon-γ secretion by immune cells such as T cells and NK cells), and wherein the cytokine moiety is fused to the carrier moiety and the masking moiety is fused to the cytokine moiety or to the carrier moiety through a cleavable peptide linker. In some embodiments, the masking moiety comprises an IL-21 receptor alpha (IL-21Rα) extracellular domain (ECD) or functional analog thereof.

In some embodiments, the cytokine moiety is a wildtype human IL-21 or a mutein thereof, for example, the human IL-21 agonist polypeptide such as one comprising SEQ ID NO: 1 or an amino acid sequence that is at least 90% (e.g., at least 95, 96, 97, 98, or 99 percent) identical to SEQ ID NO: 1. In some embodiments, the human IL-21 agonist polypeptide comprises one or more mutations at position(s) selected from D18, Q19, E109, and K117 (numbering according to SEQ ID NO: 1). In particular embodiments, the human IL-21 agonist polypeptide comprises an amino acid sequence selected from SEQ ID NOs: 1, 2, 3, 4, and 5.

In some embodiments, the masking moiety of the present prodrug comprises an ECD of human IL-21Rα or a functional analog thereof. In further embodiments, the masking moiety comprises (i) two copies of the ECD of human IL-21Rα or a functional analog thereof fused together through a peptide linker, or (ii) the ECD human IL-2Rβ or a functional analog thereof fused to an ECD of human IL-21Rγ or a functional analog thereof through a peptide linker. In some embodiments, the ECD of human IL-21Rγ or a functional analog thereof comprises SEQ ID NO: 7 or an amino acid sequence that is at least 90% (e.g., at least 95, 96, 97, 98, or 99 percent) identical to SEQ ID NO: 7. In particular embodiments, the ECD of human IL-21Rα or a functional analog thereof comprises SEQ ID NO: 6 or an amino acid sequence that is at least 90% (e.g., at least 95, 96, 97, 98, or 99 percent) identical to SEQ ID NO: 6.

In some embodiments, the prodrugs further comprise a second masking moiety that binds to the second cytokine moiety and inhibits a biological activity of the second cytokine moiety, wherein the second masking moiety is fused to the second cytokine moiety or to the carrier moiety through a cleavable peptide linker. In particular embodiments, the second masking moiety is selected from an ECD of IL-2 receptor beta subunit or a functional analog thereof, an ECD of an IL-7 receptor or a functional analog thereof, and an ECD of an IL-9 receptor or a functional analog thereof.

In some embodiments of the present prodrugs, the cytokine moieties are fused to the carrier moieties through a noncleavable peptide linker, such as one selected from SEQ ID NOs: 29-33.

In some embodiments of the present prodrugs, the cleavable peptide linker linking the masking moiety directly or indirectly (e.g., through the cytokine moiety) to the carrier moiety comprises a substrate sequence of urokinase-type plasminogen activator (uPA), matrix metallopeptidase (MMP) 2, or MMP9. In further embodiments, the cleavable peptide linker comprises substrate sequences of (i) both uPA and MMP2, (ii) both uPA and MMP9, or (iii) uPA, MMP2 and MMP9. In particular embodiments, the cleavable peptide linker comprises an amino acid sequence selected from SEQ ID NOs: 11-26. In certain embodiments, the cleavable peptide linker is cleavable by one or more proteases located at a tumor site or its surrounding environment, and the cleavage leads to activation of the prodrug at the tumor site or surrounding environment.

In some embodiments of the present prodrugs, the carrier moiety is a PEG molecule, a fatty acid chain, an albumin (e.g., a human serum albumin) or a fragment thereof, an antibody Fc domain, or an antibody or an antigen-binding fragment thereof. In particular embodiments, the carrier moiety is an IgG1 antibody Fc domain or an antibody that comprises mutations L234A and L235A ("LALA") (EU numbering) or an IgG4 Fc domain that comprises mutations S228P/L234A/L235A (PAA). Other mutations which lead to the reduced Fc functionality such as the ones described by Tam et al., *Antibodies* (2017) 6(12):1-34 can also be introduced when the Fc domain or the Fc of an antibody is used as the carrier moiety.

In particular embodiments, the carrier moiety is an antibody Fc domain or an antibody comprising knobs-into-holes mutations, and wherein the cytokine moieties and the masking moieties are fused to different polypeptide chains of the antibody Fc domain or to the different heavy chains of the antibody. In some embodiments, the cytokine moiety and the masking moiety are fused to the C-termini of the two different polypeptide chains of the Fc domain or to the C-termini of the two different heavy chains of the antibody. In other embodiments, the cytokine moiety and the masking moiety are fused to the N-termini of the two different polypeptide chains of the Fc domain or to the N-termini of the two different heavy chains of the antibody. In certain embodiments, the knobs-into-holes mutations comprise a T366Y "knob" mutation on a polypeptide chain of the Fc domain or a heavy chain of the antibody, and a Y407T "hole" mutation in the other polypeptide of the Fc domain or the other heavy chain of the antibody (EU numbering). In certain embodiments, the knobs-into-holes mutations comprise Y349C and/or T366W mutations in the CH3 domain of the "knob chain" and E356C, T366S, L368A, and/or Y407V mutations in the CH3 domain of the "hole chain" (EU numbering).

In particular embodiments, the prodrug comprises two polypeptide chains whose amino acid sequences respectively comprise SEQ ID NOs: 36 and 38; SEQ ID NOs: 37 and 38; SEQ ID NOs: 39 and 41; SEQ ID NOs: 40 and 41; SEQ ID NOs: 42 and 44; SEQ ID NOs: 43 and 44; SEQ ID NOs: 45 and 47; or SEQ ID NOs: 46 and 47.

In some embodiments, the carrier moiety is an antibody or an antigen-binding fragment thereof that specifically binds to one or more antigens selected from guanyl cyclase C (GCC), carbohydrate antigen 19-9 (CA19-9), glycoprotein A33 (gpA33), mucin 1 (MUC1), carcinoembryonic antigen (CEA), insulin-like growth factor 1 receptor (IGF1-R), human epidermal growth factor receptor 2 (HER2), human epidermal growth factor receptor 3 (HER3), delta-like protein 3 (DLL3), delta-like protein 4 (DLL4), epidermal growth factor receptor (EGFR), glypican-3 (GPC3), c-MET, vascular endothelial growth factor receptor 1 (VEGFR1), vascular endothelial growth factor receptor 2 (VEGFR2), Nectin-4, Liv-1, glycoprotein NMB (GPNMB), prostate specific membrane antigen (PSMA), Trop-2, carbonic anhydrase IX (CA9), endothelin B receptor (ETBR), six transmembrane epithelial antigen of the prostate 1 (STEAP1), folate receptor alpha (FR-α), SLIT and NTRK-like protein 6 (SLITRK6), carbonic anhydrase VI (CA6), ectonucleotide pyrophosphatase/phosphodiesterase family member 3 (ENPP3), mesothelin, trophoblast glycoprotein (TPBG), CD19, CD20, CD22, CD33, CD40, CD56, CD66e, CD70, CD74, CD79b, CD98, CD123, CD138, CD352, CD47, signal-regulatory protein alpha (SIRPα), PD1, Claudin 18.2, Claudin 6, 5T4, BCMA, PD-L1, PD-1, fibroblast activation protein alpha (FAPalpha), the melanoma-associated chondroitin sulfate proteoglycan (MCSP), and epithelial cellular adhesion molecule (EPCAM). In specific embodiments, the carrier moiety is an antibody or fragment thereof which binds to FAPalpha or 5T4.

In particular embodiments, the carrier moiety is an antibody comprising two heavy chain polypeptides whose amino acid sequences respectively comprise SEQ ID NO: 48 and SEQ ID No: 49; and wherein said antibody comprises a light chain polypeptide chain with an amino acid sequence as shown in SEQ ID NO: 50 or 51.

In some embodiments, the prodrug further comprises two or three ectodomains of a TNF ligand family member or fragments thereof or two or three ectodomains of 4-1BB ligand or fragments thereof.

In some embodiments, the prodrug further comprises a second effector polypeptide selected from the following: (i) a human IL-2 agonist polypeptide comprising SEQ ID NO: 8 or an amino acid sequence that is at least 90% (e.g., at least 95, 96, 97, 98, or 99 percent) identical to SEQ ID NO: 8, or (ii) a human IL-7 agonist polypeptide, or (iii) a human IL-9 agonist polypeptide, or (iv) a human IL-15 agonist polypeptide comprising SEQ ID NO: 9 or an amino acid sequence that is at least 90% (e.g., at least 95, 96, 97, 98, or 99 percent) identical to SEQ ID NO: 9, or (v) a human IL-15 agonist polypeptide and a IL-15 receptor alpha sushi domain, or (vi) a CCL19 polypeptide comprising an amino acid sequence that is at least 90% (e.g., at least 95, 96, 97, 98, or 99 percent) identical to SEQ ID NO: 27.

In other embodiments, the prodrug further comprises a second effector polypeptide such as a second cytokine agonist polypeptide and optionally a second masking moiety that binds this second effector polypeptide. An example of such a prodrug comprises two polypeptide chains whose amino acid sequences respectively comprise SEQ ID NO: 42 and SEQ ID NO: 44. Another example is where the prodrug comprises two polypeptide chains whose amino acid sequences respectively comprise SEQ ID NO: 43 and SEQ ID NO: 44. Another example is where the prodrug comprises two polypeptide chains whose amino acid sequences respectively comprise SEQ ID NO: 45 and SEQ ID NO: 47. Yet another example is where the prodrug comprises two polypeptide chains whose amino acid sequences respectively comprise SEQ ID NO: 46 and SEQ ID NO: 47.

In another aspect, the present disclosure provides polynucleotides encoding the present prodrugs, expression vectors comprising the polynucleotides, and host cells (e.g., mammalian host cells such as CHO, NS0 cells, and 293T cells) comprising the expression vectors. The present disclosure also provides methods for making the present prodrugs, comprising culturing the mammalian host cells under conditions that allow expression of the prodrugs and isolating the prodrugs.

The present disclosure also provides a method of treating a cancer or an infectious disease or stimulating the immune system in a patient (e.g., human patient) in need thereof, comprising administering to the patient a therapeutically effective amount of the IL-21 prodrug, or the pharmaceutical composition of the present disclosure. The patient may have, for example, a viral infection (e.g., HIV, HBV, HCV, or HPV infection), or a cancer selected from the group consisting of breast cancer, lung cancer, pancreatic cancer, esophageal cancer, medullary thyroid cancer, ovarian cancer, uterine cancer, prostate cancer, testicular cancer, colorectal cancer, and stomach cancer. Also provided herein are an IL-21 prodrug for use in treating a cancer or an infectious disease or stimulating the immune system in the present method; use of an Il-21 prodrug for the manufacture of a medicament for treating a cancer or an infectious disease or stimulating the immune system in the present method; and articles of manufacture (e.g., kits) comprising one or more dosing units of the present Il-21 prodrug.

Other features, objectives, and advantages of the invention are apparent in the detailed description that follows. It should be understood, however, that the detailed description, while indicating embodiments and aspects of the invention, is given by way of illustration only, not limitation. Various changes and modification within the scope of the invention will become apparent to those skilled in the art from the detailed description.

BRIEF DESCRIPTIONS OF THE DRAWINGS

Figure 1:
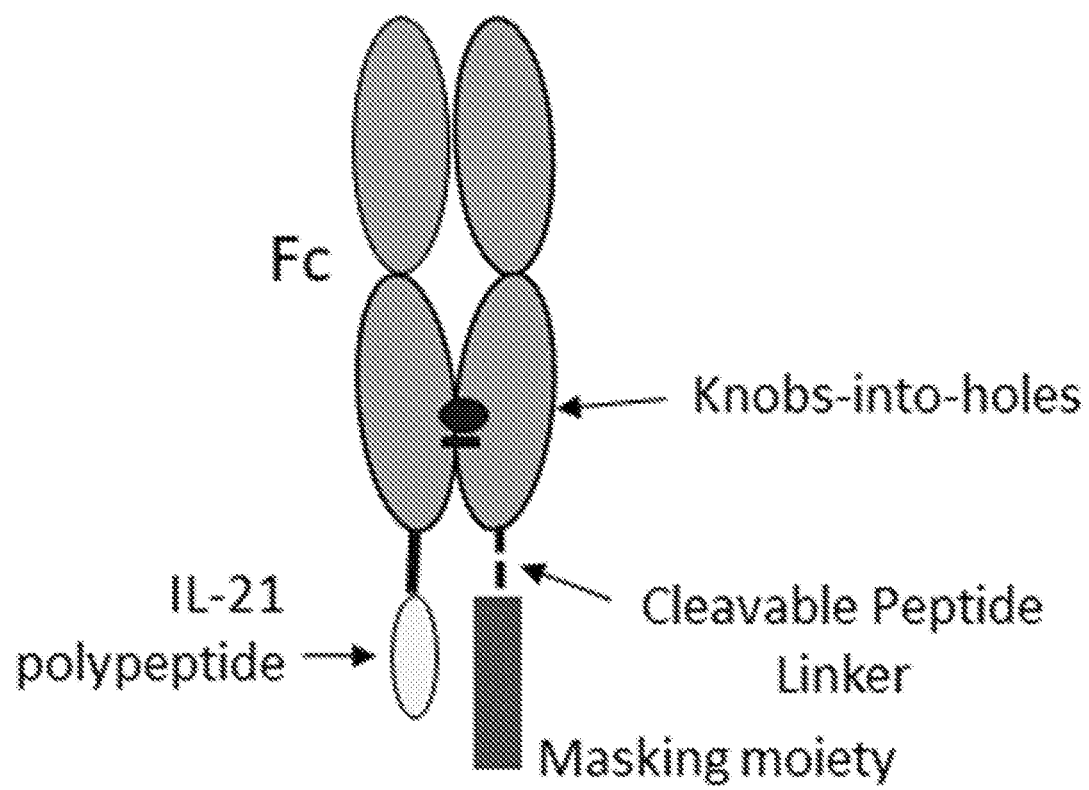
FIG. 1 illustrates a heterodimeric IL-21 prodrug wherein the carrier is a Fc domain. The two chains of the Fc domain contain knobs-into-holes mutations.
Figure 2:
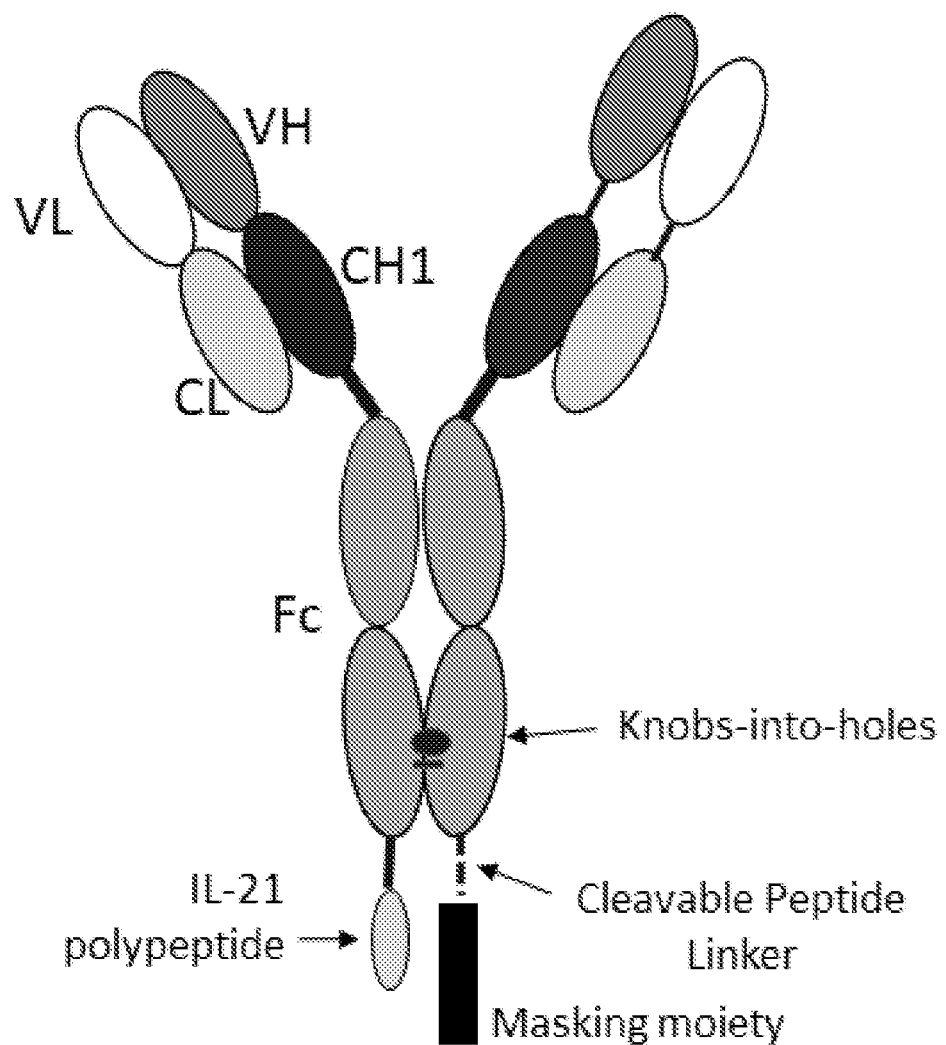
FIG. 2 illustrates a tetrameric IL-21 prodrug wherein the carrier is an antibody containing knobs-into-holes mutations in the Fc domain.
Figure 3A:
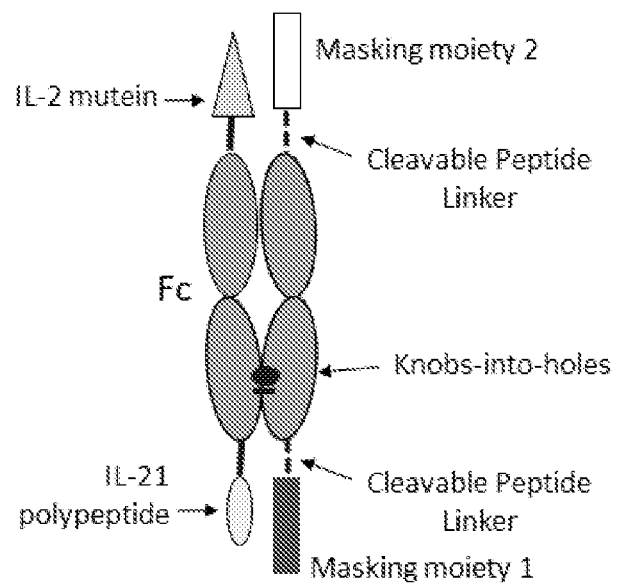
FIG. 3A illustrates a heterodimeric IL-21 prodrug comprising (i) an IL-21 polypeptide and its corresponding mask, and (ii) an IL-2 mutein and its corresponding mask.
Figure 3B:
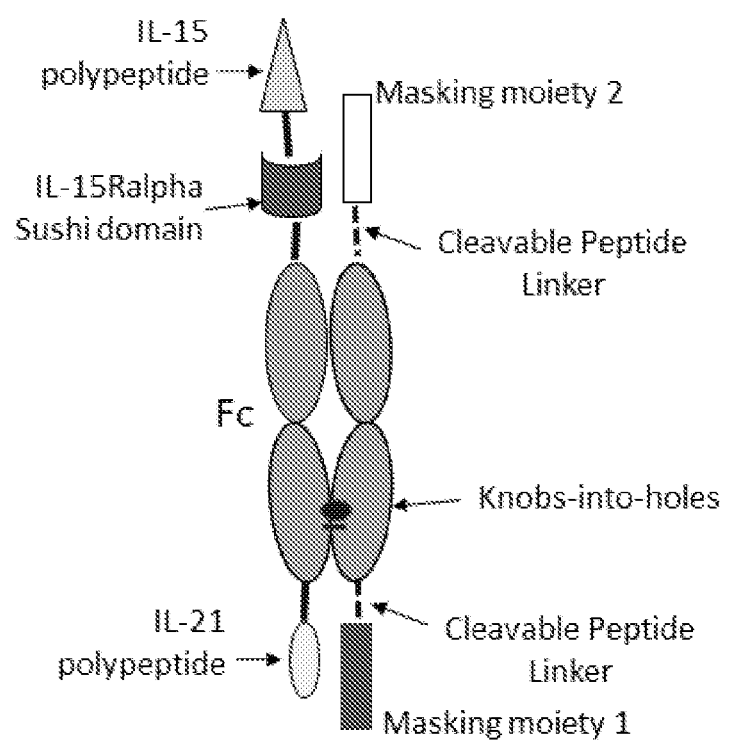
FIG. 3B illustrates an IL-21 prodrug comprising (i) an IL-21 polypeptide and its corresponding mask, and (ii) an IL-15 polypeptide, an IL-15Rα sushi domain and the corresponding mask.
Figure 4:
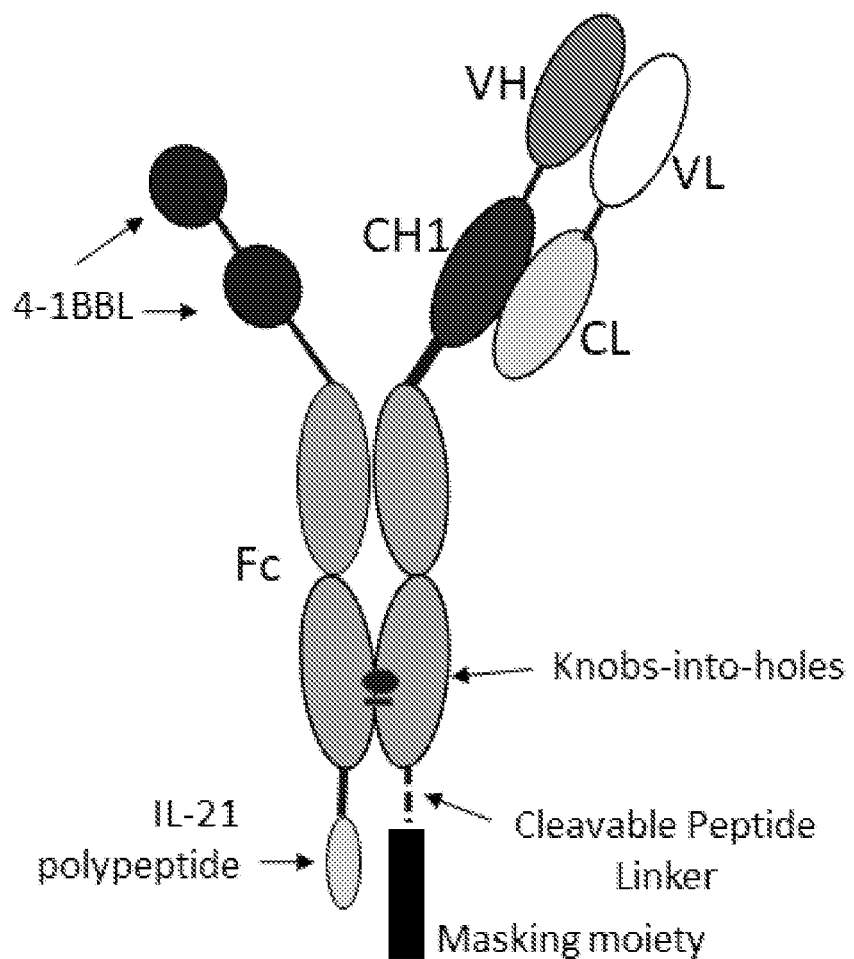
FIG. 4 illustrates an IL-21 prodrug with two 4-1BBL ectodomains.
Figure 5B:
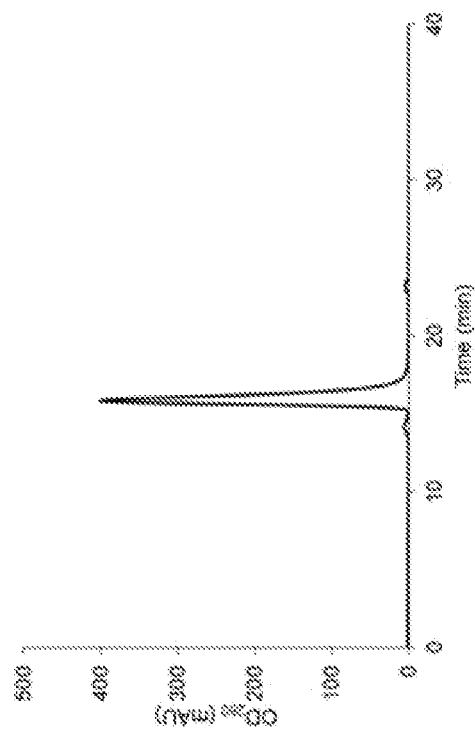
Figure 5A:
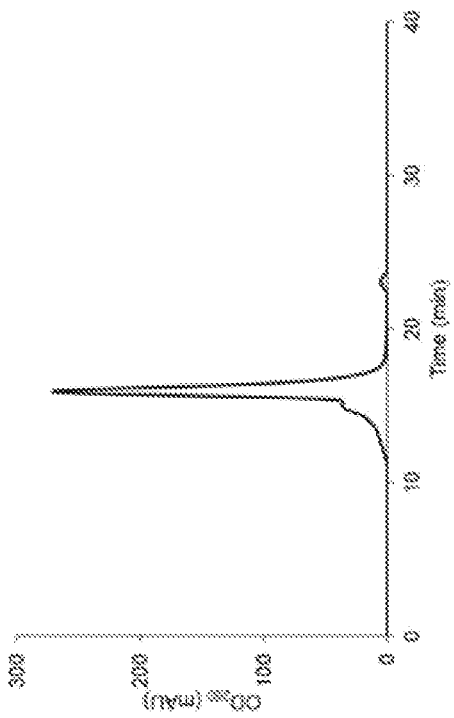
Figure 5C:
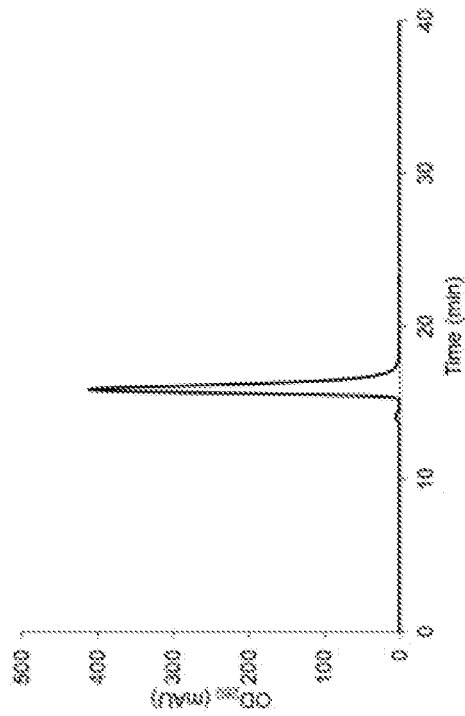

FIGS. 5A-C show the size exclusion chromatography (SEC) HPLC analysis of the IL-21 Prodrug A after purification.

FIG. 6 shows the SDS-PAGE analysis of the IL-21 prodrugs prior to and after activation by the protease matrix metalloproteinase-2 (MMP2). Prodrug A comprises a wild type IL-21 polypeptide, while Prodrug B comprises an IL-21 mutein with the mutations Q19K and E109R.

Figure 7A:
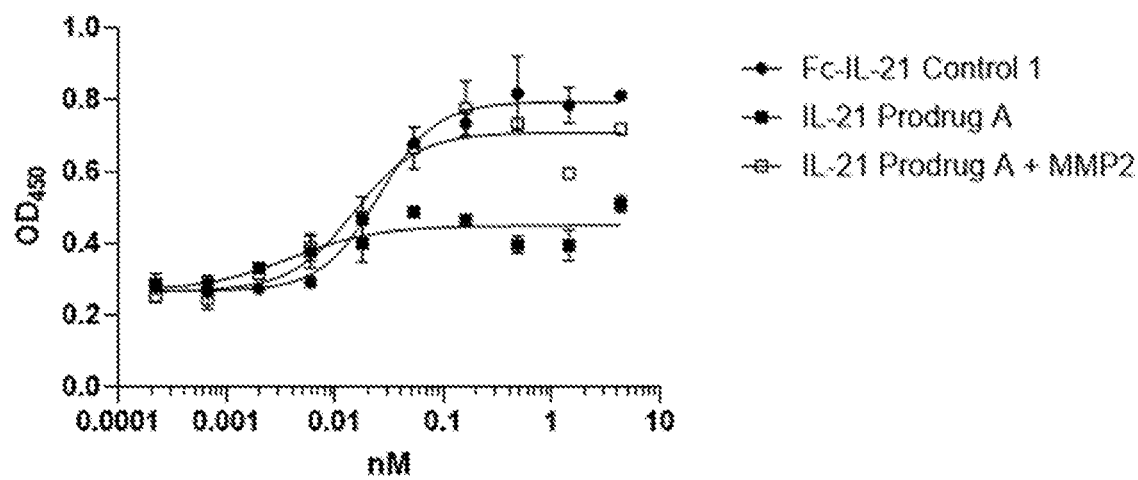
Figure 7B:
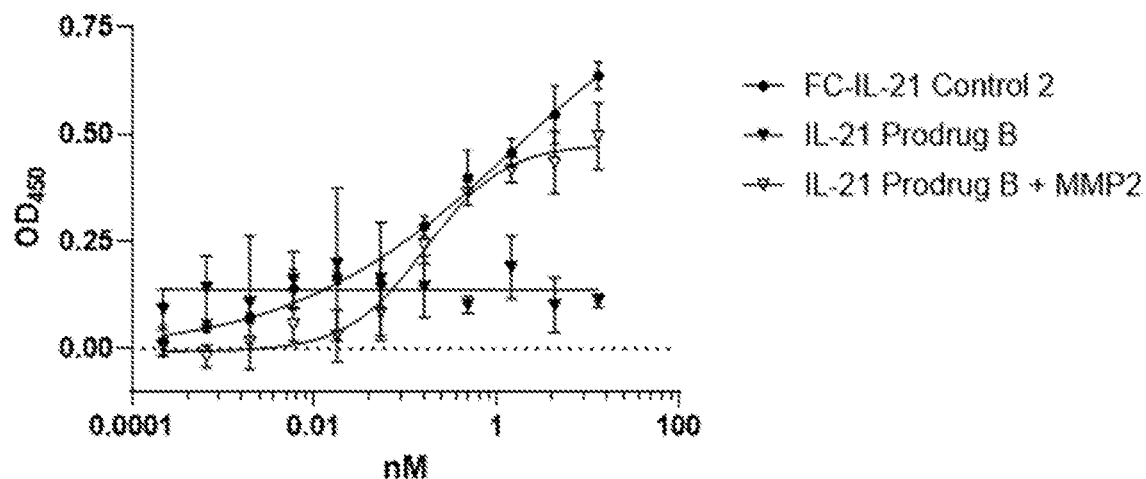

FIGS. 7A and 7B show the results of a cell-based biological activity assay of IL-21 prodrugs prior to and after activation by protease MMP2. FIG. 7A shows the results of the IL-21 Prodrug A, which comprises wild type IL-21. FIG. 7B shows the results of the IL-21 Prodrug B, which comprises an IL-21 mutein.

FIG. 8 shows the results of a cell-based biological activity assay of PD-1-IL-21 Prodrugs prior to and after activation by protease MMP2.

FIG. 9 shows the results of a PD-1 reporter assay, which assesses the ability of the anti-PD-1 antibody of the fusion molecules to block PD-L1-mediated PD-1 signaling.

DETAILED DESCRIPTION OF THE INVENTION

As used herein and in the appended claims, the singular forms "a," "or," and "the" include plural referents unless the context clearly dictates otherwise.

Reference to "about" a value or parameter herein includes (and describes) variations that are directed to that value or parameter per se. For example, description referring to "about X" includes description of "X." Additionally, use of "about" preceding any series of numbers includes "about" each of the recited numbers in that series. For example, description referring to "about X, Y, or Z" is intended to describe "about X, about Y, or about Z."

The term "antigen-binding moiety" refers to a polypeptide or a set of interacting polypeptides that specifically bind to an antigen, and includes, but is not limited to, an antibody (e.g., a monoclonal antibody, a polyclonal antibody, a multi-specific antibody, a dual-specific or bispecific antibody, an anti-idiotypic antibody, or a bifunctional hybrid antibody) or an antigen-binding fragment thereof (e.g., a Fab, a Fab', a F(ab')$_2$, a Fv, a disulfide linked Fv, a scFv, a single domain antibody (dAb), or a diabody, a single chain antibody, and an Fc-containing polypeptide such as an immunoadhesin). In some embodiments, the antibody may be of any heavy chain isotype (e.g., IgG, IgA, IgM, IgE, or IgD) or subtype (e.g., IgG$_1$, IgG$_2$, IgG$_3$, or IgG$_4$). In some embodiments, the antibody may be of any light chain isotype (e.g., kappa or lambda). The antibody may be human, non-human (e.g., from mouse, rat, rabbit, goat, or another non-human animal), chimeric (e.g., with a non-human variable region and a human constant region), or humanized (e.g., with non-human CDRs and human framework and constant regions). In some embodiments, the antibody is a derivatized antibody.

The term "cytokine agonist polypeptide" refers to a wildtype cytokine, or an analog thereof. An analog of a wildtype cytokine has the same biological specificity (e.g., binding to the same receptor(s) and activating the same target cells) as the wildtype cytokine, although the activity level of the analog may be different from that of the wildtype cytokine. The analog may be, for example, a mutein (i.e., mutated polypeptide) of the wildtype cytokine, and may comprise at least one, at least two, at least three, at least four, at least five, at least six, at least seven, at least eight, at least nine, or at least ten mutations relative to the wildtype cytokine.

The term "cytokine antagonist" or "cytokine mask" refers to a moiety (e.g., a polypeptide) that binds to a cytokine and thereby inhibits the cytokine from binding to its receptor on the surface of a target cell and/or exerting its biological functions while being bound by the antagonist or mask. Examples of a cytokine antagonist or mask include, without limitations, a polypeptide derived from an extracellular domain of the cytokine's natural receptor that makes contact with the cytokine.

The term "effective amount" or "therapeutically effective amount" refers to an amount of a compound or composition sufficient to treat a specified disorder, condition, or disease (e.g., ameliorate, palliate, lessen, and/or delay one or more of its symptoms). In reference to a disease such as cancer, an effective amount may be an amount sufficient to delay cancer development or progression (e.g., decrease tumor growth rate, and/or delay or prevent tumor angiogenesis, metastasis, or infiltration of cancer cells into peripheral organs), reduce the number of epithelioid cells, cause cancer regression (e.g., shrink or eradicate a tumor), and/or prevent or delay cancer occurrence or recurrence. An effective amount can be administered in one or more doses.

The term "functional analog" refers to a molecule that has the same biological specificity (e.g., binding to the same ligand) and/or activity (e.g., activating or inhibiting a target cell) as a reference molecule.

The term "fused" or "fusion" in reference to two polypeptide sequences refers to the joining of the two polypeptide sequences through a backbone peptide bond. Two polypeptides may be fused directly or through a peptide linker that is one or more amino acids long. A fusion polypeptide may be made by recombinant technology from a coding sequence containing the respective coding sequences for the two fusion partners, with or without a coding sequence for a peptide linker in between. In some embodiments, fusion encompasses chemical conjugation.

The term "pharmaceutically acceptable excipient" when used to refer to an ingredient in a composition means that the excipient is suitable for administration to a treatment subject, including a human subject, without undue deleterious side effects to the subject and without affecting the biological activity of the active pharmaceutical ingredient (API).

The term "prodrug" refers to a therapeutic molecule that is inactive until having been activated in vivo.

The term "subject" refers to a mammal and includes, but is not limited to, a human, a pet (e.g., a canine or a feline), a farm animal (e.g., cattle or horse), a rodent, or a primate.

As used herein, "treatment" or "treating" is an approach for obtaining beneficial or desired clinical results. Beneficial or desired clinical results include, but are not limited to, one or more of the following: alleviating one or more symptoms resulting from a disease, diminishing the extent of a disease, ameliorating a disease state, stabilizing a disease (e.g., preventing or delaying the worsening or progression of the disease), preventing or delaying the spread (e.g., metastasis) of a disease, preventing or delaying the recurrence of a disease, providing partial or total remission of a disease, decreasing the dose of one or more other medications required to treat a disease, increasing the patient's quality of life, and/or prolonging survival. The methods of the present disclosure contemplate any one or more of these aspects of treatment.

It is to be understood that one, some, or all of the properties of the various embodiments described herein may be combined to form other embodiments of the present invention. The section headings used herein are for organizational purposes only and are not to be construed as limiting the subject matter described thereunder.

IL-21 Prodrugs

The present disclosure provides IL-21 prodrugs that are metabolized in vivo to become active IL-21 therapeutics. The IL-21 prodrugs have fewer side effects, better in vivo PK profiles (e.g., longer half-life) and better target specificity, and are more efficacious as compared to prior IL-21 therapeutics. The present IL-21 prodrugs comprise an IL-21 agonist polypeptide (cytokine moiety) linked to a carrier moiety and masked (bound) by an IL-21 antagonist (masking moiety or cytokine mask). The IL-21 antagonist, which may be, for example, an extracellular domain of IL-21Rα, is linked to the cytokine moiety or to the carrier moiety through a cleavable linker (e.g., a cleavable peptide linker). The mask inhibits the cytokine moiety's biological functions while the mask is binding to it. The prodrugs may be activated at a target site (e.g., at a tumor site or the surrounding environment) in the patient by cleavage of the linker and the consequent release of the cytokine mask from the prodrug, exposing the previously masked cytokine moiety and allowing the cytokine moiety to bind to its receptor on a target cell and exert its biological functions on the target cell. In some embodiments, the carriers for the IL-21 prodrugs are antigen-binding moieties, such as antibodies, that bind an antigen at the target site.

In some embodiments, the present IL-21 prodrugs are metabolized to become active at a target site in the body targeted by the carrier. In further embodiments, the carrier in the prodrug is an antibody targeting a tumor antigen such that the IL-21 prodrug is delivered to a tumor site in a patient and is metabolized locally (e.g., inside or in the vicinity of the tumor microenvironment) through cleavage of the linker linking the cytokine mask to the carrier or the cytokine moiety, making the cytokine moiety available to interact with its receptor on a target cell and stimulating the target immune cells locally.

A. Cytokine Moieties of the Prodrugs

An IL-21 prodrug may comprise an IL-21 agonist polypeptide (cytokine moiety), a carrier (carrier moiety), and an IL-21 antagonist (masking moiety), wherein the IL-21 agonist polypeptide is fused to the carrier directly or through a linker (e.g., cleavable or noncleavable peptide linker), and the IL-21 antagonist is linked to the IL-21 agonist polypeptide or to the carrier through a cleavable peptide linker. In the present IL-21 prodrugs, the IL-21 agonist polypeptide may be a wildtype IL-21 polypeptide such as a wildtype human IL-21 (e.g., SEQ ID NO: 1), or an IL-21 mutein such as one derived from a human IL-21, e.g., one with an amino acid sequence selected from SEQ ID NOs: 2-5. The IL-21 mutein may have significantly reduced affinity for IL-21Rα or IL-21RαRγ, as compared to wild type IL-21. In some embodiments, the IL-21 mutein has a binding affinity for the high-affinity IL-2Rα that is 5 times, 10 times, 20 times, 50 times, 100 times, 300 times, 500 times, 1,000 times, or 10,000 times lower compared to wild type IL-21. Unless otherwise indicated, all residue numbers in IL-21 and IL-21 muteins described herein are in accordance with the numbering in SEQ ID NO: 1.

B. Masking Moieties of the IL-21 Prodrugs

The IL-21 antagonist, i.e., the masking moiety, in the present prodrug may comprise a peptide or an antibody or antibody fragment that binds to the cytokine moiety in the prodrug, masking the cytokine moiety and inhibiting its biological functions.

By way of example, IL-21 antagonists may comprise peptides and antibodies that bind IL-21 and interfere with the binding of the IL-21 to its receptors, leading to the reduced biological activities of the IL-21 moiety while masked. In some embodiments, the IL-21 antagonist comprises an IL-21Rα or IL-21Rγ extracellular domain or its functional analog such as one derived from human IL-21Rα or human IL-21Rγ (e.g., SEQ ID NO: 6 or 7). In some embodiments, the IL-21 antagonist comprises a peptide identified from the screening of a peptide library. In some embodiments, the IL-21 antagonist comprises an antibody or fragment thereof that blocks the binding of IL-21 or IL-21 muteins to an IL-21 receptor.

In some embodiments, the IL-21 antagonist in the present prodrug is an IL-21Rα extracellular domain (ECD). The present inventors have surprisingly found that, when the IL-21Rα ECD was cleaved by a protease, the cell-based activity of the IL-21 agonist polypeptide was nearly fully recovered, despite the high binding affinity of the IL-21 agonist polypeptide for the IL-21Rα ECD.

C. Carrier Moieties of the Prodrugs

The carrier moieties of the present IL-21 prodrugs may be an antigen-binding moiety, or a moiety that is not an antigen-binding moiety. The carrier moiety may improve the PK profiles such as serum half-life of the cytokine agonist polypeptide, and may also target the cytokine agonist polypeptide to a target site in the body, such as a tumor site.

1. Antigen-Binding Carrier Moieties

The carrier moiety may be an antibody or an antigen-binding fragment thereof, or an immunoadhesin. In some embodiments, the antigen-binding moiety is a full-length antibody with two heavy chains and two light chains, a Fab fragment, a Fab' fragment, a F(ab')$_2$ fragment, a Fv fragment, a disulfide linked Fv fragment, a single domain antibody, a nanobody, or a single-chain variable fragment (scFv). In some embodiments, the antigen-binding moiety is a bispecific antigen-binding moiety and can bind to two different antigens or two different epitopes on the same antigen. The antigen-binding moiety may provide additional and potentially synergetic therapeutic efficacy to the cytokine agonist polypeptide.

The IL-21 agonist polypeptide and its mask may be fused to the N-terminus or C-terminus of the light chain(s) and/or heavy chain(s) of the antigen-binding moiety. By way of example, the IL-21 agonist polypeptide and its mask may be fused to the antibody heavy chain or an antigen-binding fragment thereof or to the antibody light chain or an antigen-binding fragment thereof. In some embodiments, one terminus of the IL-21 agonist polypeptide is fused to the C-terminus of one or both of the heavy chains of an antibody, and the IL-21 mask is fused to the other terminus of the IL-21 agonist polypeptide through a cleavable peptide linker. In some embodiments, the IL-21 agonist polypeptide is fused to the C-terminus of one of the heavy chains of an antibody, and the IL-21 mask is fused to the C-terminus of the other heavy chain of the antibody through a cleavable peptide linker, wherein the two heavy chains contain mutations that allow the specific pairing of the two different heavy chains.

Strategies of forming heterodimers are well known (see, e.g., Spies et al., *Mol Imm.* (2015) 67(2)(A):95-106). For example, the two heavy chain polypeptides in the prodrug may form stable heterodimers through "knobs-into-holes" mutations. "Knobs-into-holes" mutations are made to promote the formation of the heterodimers of the antibody heavy chains and are commonly used to make bispecific antibodies (see, e.g., U.S. Pat. No. 8,642,745). For example, the Fc domain of the antibody may comprise a T366W mutation in the CH3 domain of the "knob chain" and T366S, L368A, and/or Y407V mutations in the CH3 domain of the "hole chain." An additional interchain disulfide bridge between the CH3 domains can also be used, e.g., by introducing a Y349C mutation into the CH3 domain of the "knobs chain" and an E356C or S354C mutation into the CH3 domain of the "hole chain" (see, e.g., Merchant et al., *Nature Biotech* (1998) 16:677-81). In other embodiments, the antibody moiety may comprise Y349C and/or T366W mutations in one of the two CH3 domains, and E356C, T366S, L368A, and/or Y407V mutations in the other CH3 domain. In certain embodiments, the antibody moiety may comprise Y349C and/or T366W mutations in one of the two CH3 domains, and S354C (or E356C), T366S, L368A, and/or Y407V mutations in the other CH3 domain, with the additional Y349C mutation in one CH3 domain and the additional E356C or S354C mutation in the other CH3 domain, forming an interchain disulfide bridge (numbering always according to EU index of Kabat; Kabat et al., "Sequences of Proteins of Immunological Interest," 5th ed., Public Health Service, National Institutes of Health, Bethesda, Md. (1991)). Other knobs-into-holes technologies, such as those described in EP1870459A1, can be used alternatively or additionally. Thus, another example of knobs-into-holes mutations for an antibody moiety is having R409D/K370E mutations in the CH3 domain of the "knob chain" and D399K/E357K mutations in the CH3 domain of the "hole chain" (EU numbering).

In some embodiments, the antibody moiety in the prodrug comprises L234A and L235A ("LALA") mutations in its Fc domain. The LALA mutations eliminate complement binding and fixation as well as Fcγ dependent ADCC (see, e.g., Hezareh et al. *J. Virol.* (2001) 75(24):12161-8). In further embodiments, the LALA mutations are present in the antibody moiety in addition to the knobs-into-holes mutations.

In some embodiments, the antibody moiety comprises the M252Y/S254T/T256E ("YTE") mutations in the Fc domain. The YTE mutations allow the simultaneous modulation of serum half-life, tissue distribution and activity of IgG$_1$ (see Dall'Acqua et al., *J Biol Chem.* (2006) 281:23514-24; and Robbie et al., *Antimicrob Agents Chemother.* (2013) 57(12): 6147-53). In further embodiments, the YTE mutations are present in the antibody moiety in addition to the knobs-into-holes mutations. In particular embodiments, the antibody moiety has YTE, LALA and knobs-into-holes mutations or any combination thereof.

The antigen-binding moiety may bind to an antigen on the surface of a cell, such as an immune cell, for example, T cells, NK cells, and macrophages, or bind to a cytokine. For example, the antigen-binding moiety may bind to PD-1, LAG-3, TIM-3, TIGIT, CTLA-4, or TGF-beta and may be an antibody. The antibody may have the ability to activate the immune cell and enhance its anti-cancer activity.

The antigen-binding moiety may bind to an antigen on the surface of a tumor cell. For example, the antigen-binding moiety may bind to FAP alpha, 5T4, Trop-2, PD-L1, HER-2, EGFR, Claudin 18.2, DLL-3, GCP3, or carcinoembryonic antigen (CEA), and may be an antibody. The antibody may or may not have ADCC activity. The antibody may also be further conjugated to a cytotoxic drug.

In some embodiments, the antigen-binding moiety binds to guanyl cyclase C (GCC), carbohydrate antigen 19-9 (CA19-9), glycoprotein A33 (gpA33), mucin 1 (MUC1), insulin-like growth factor 1 receptor (IGF1-R), human epidermal growth factor receptor 2 (HER2), human epidermal growth factor receptor 3 (HER3), delta-like protein 3 (DLL3), delta-like protein 4 (DLL4), epidermal growth factor receptor (EGFR), glypican-3 (GPC3), c-MET, vascular endothelial growth factor receptor 1 (VEGFR1), vascular endothelial growth factor receptor 2 (VEGFR2), Nectin-4, Liv-1, glycoprotein NMB (GPNMB), prostates-specific membrane antigen (PSMA), Trop-2, carbonic anhydrase IX (CA9), endothelin B receptor (ETBR), six transmembrane epithelial antigen of the prostate 1 (STEAP1), folate receptor alpha (FR-α), SLIT and NTRK-like protein 6 (SLITRK6), carbonic anhydrase VI (CA6), ectonucleotide pyrophosphatase/phosphodiesterase family member 3 (ENPP3), mesothelin, trophoblast glycoprotein (TPBG), CD19, CD20, CD22, CD33, CD40, CD56, CD66e, CD70, CD74, CD79b, CD98, CD123, CD138, CD352, CD47, signal-regulatory protein alpha (SIRPα), Claudin 18.2, Claudin 6, BCMA, or EPCAM. In some embodiments, the antigen-binding moiety binds to an epidermal growth factor (EGF)-like domain of DLL3. In some embodiments, the antigen-binding moiety binds to a Delta/Serrate/Lag2 (DSL)-like domain of DLL3. In some embodiments, the antigen-binding moiety binds to an epitope located after the 374th amino acid of GPC3. In some embodiments, the antigen-binding moiety binds to a heparin sulfate glycan of GPC3. In some embodiments, the antigen-binding moiety binds to Claudin 18.2 and does not bind to Claudin 18.1. In some embodiments, the antigen-binding moiety binds to Claudin 18.1 with at least 10 times weaker binding affinity than to Claudin 18.2.

Exemplary antigen-binding moieties include trastuzumab, rituximab, brentuximab, cetuximab, panitumumab, GC33 (or a humanized version thereof), anti-EGFR antibody mAb806 (or a humanized version thereof), anti-dPNAG antibody F598, and antigen-binding fragments thereof. In some embodiments, the antigen-binding moiety has at least 90%, 91%, 92%, 93%, 94%, 95%, 96%, 97%, 98%, or 99% identity to trastuzumab, rituximab, brentuximab, cetuximab, or panitumumab, GC33 (or a humanized version thereof), anti-EGFR antibody mAb806 (or a humanized version thereof), anti-dPNAG antibody F598, or a fragment thereof. In some embodiments, the antigen-binding moiety has an antibody heavy chain with at least 90%, 91%, 92%, 93%, 94%, 95%, 96%, 97%, 98%, or 99% identity to the antibody heavy chain of trastuzumab, rituximab, brentuximab, cetuximab, panitumumab, GC33 (or a humanized version thereof), anti-EGFR antibody mAb806 (or a humanized version thereof), anti-dPNAG antibody F598, or a fragment thereof. In some embodiments, the antigen-binding moiety has an antibody light chain with at least 90%, 91%, 92%, 93%, 94%, 95%, 96%, 97%, 98%, or 99% identity to the antibody light chain of trastuzumab, rituximab, brentuximab, cetuximab, panitumumab, GC33 (or a humanized version thereof), anti-EGFR antibody mAb806 (or a humanized version thereof), anti-dPNAG antibody F598, or a fragment thereof. The antigen-binding moiety is fused to an IL-2 agonist polypeptide. In some embodiments, the antigen-binding moiety comprises the six complementarity-determining regions (CDRs) of trastuzumab, rituximab, brentuximab, cetuximab, panitumumab, GC33, anti-EGFR antibody mAb806, or anti-dPNAG antibody F598.

A number of CDR delineations are known in the art and are encompassed herein. A person of skill in the art can readily determine a CDR for a given delineation based on the sequence of the heavy or light chain variable region. The "Kabat" CDRs are based on sequence variability and are the most commonly used (Kabat et al., *Sequences of Proteins of Immunological Interest*, 5th Ed. Public Health Service, National Institutes of Health, Bethesda, Md. (1991)). "Chothia" CDRs refer to the location of the structural loops (Chothia & Lesk, *J. Mol. Biol.* (1987) 196:901-917). The "AbM" CDRs represent a compromise between the Kabat CDRs and Chothia structural loops, and are used by Oxford Molecular's AbM antibody modeling software. The "Contact" CDRs are based on an analysis of the available complex crystal structures. The residues from each of these CDRs are noted below in Table 1, in reference to common antibody numbering schemes. Unless otherwise specified herein, amino acid numbers in antibodies refer to the Kabat numbering scheme as described in Kabat et al., supra, including when CDR delineations are made in reference to Kabat, Chothia, AbM, or Contact schemes. Using this numbering system, the actual linear amino acid sequence may contain fewer or additional amino acids corresponding to a shortening of, or insertion into, a framework region (FR) or CDR of the variable domain. For example, a heavy chain variable domain may include a single amino acid insert (residue 52a according to Kabat) after residue 52 of H2 and inserted residues (e.g., residues 82a, 82b, and 82c, etc. according to Kabat) after heavy chain FR residue 82. The Kabat numbering of residues may be determined for a given antibody by alignment at regions of homology of the sequence of the antibody with a "standard" Kabat numbered sequence.

TABLE 1

CDR Delineations According to Various Schemes

| CDR | Kabat | AbM | Chothia | Contact |
| --- | --- | --- | --- | --- |
| VL-CDR1 | L24-L34 | L24-L34 | L26-L32 | L30-L36 |
| VL-CDR2 | L50-L56 | L50-L56 | L50-L52 | L46-L55 |
| VL-CDR3 | L89-L97 | L89-L97 | L91-L96 | L89-L96 |
| VH-CDR1 (Kabat nos.) | H31-H35B | H26-H35B | H26-H32 | H30-H35B |
| VH-CDR1 (Chothia nos.) | H31-H35 | H26-H35 | H26-H32 | H30-H35 |
| VH-CDR2 | H50-H65 | H50-H58 | H53-H55 | H47-H58 |
| VH-CDR3 | H95-H102 | H95-H102 | H95-H101 | H93-H101 |

In some embodiments, the CDRs are "extended CDRs," and encompass a region that begins or terminates according to a different scheme. For example, an extended CDR can be as follows: L24-L36, L26-L34, or L26-L36 (VL-CDR1); L46-L52, L46-L56, or L50-L55 (VL-CDR2); L91-L97 (VL-CDR3); H47-H55, H47-H65, H50-H55, H53-H58, or H53-H65 (VH-CDR2); and/or H93-H102 (VH-CDR3).

In some embodiments, the antigen-binding moiety binds to HER2, and comprises a light chain having an amino acid sequence with at least 90%, 91%, 92%, 93%, 94%, 95%, 96%, 97%, 98%, or 99% identity to SEQ ID NO: 52, or a fragment thereof, and a heavy chain having an amino acid sequence with at least 90%, 91%, 92%, 93%, 94%, 95%, 96%, 97%, 98%, or 99% identity to SEQ ID NO: 53, or a fragment thereof. In some embodiments, the antigen-binding domain comprises CDR1, CDR2, and CDR3 from SEQ ID NO: 52, and CDR1, CDR2, and CDR3 from SEQ ID NO: 53.

In some embodiments, the antigen-binding moiety binds to CD20, and comprises a light chain having an amino acid sequence with at least 90%, 91%, 92%, 93%, 94%, 95%, 96%, 97%, 98%, or 99% identity to SEQ ID NO: 54, or a fragment thereof, and a heavy chain having an amino acid sequence with at least 90%, 91%, 92%, 93%, 94%, 95%, 96%, 97%, 98%, or 99% identity to SEQ ID NO: 55, or a fragment thereof. In some embodiments, the antigen-binding domain comprises CDR1, CDR2, and CDR3 from SEQ ID NO: 54, and CDR1, CDR2, and CDR3 from SEQ ID NO: 55.

In some embodiments, the antigen-binding moiety binds to CD30, and comprises a light chain having an amino acid sequence with at least 90%, 91%, 92%, 93%, 94%, 95%, 96%, 97%, 98%, or 99% identity to SEQ ID NO: 56, or a fragment thereof, and a heavy chain having an amino acid sequence with at least 90%, 91%, 92%, 93%, 94%, 95%, 96%, 97%, 98%, or 99% identity to SEQ ID NO: 57, or a fragment thereof. In some embodiments, the antigen-binding domain comprises CDR1, CDR2, and CDR3 from SEQ ID NO: 56, and CDR1, CDR2, and CDR3 from SEQ ID NO: 57.

In some embodiments, the antigen-binding moiety binds to EGFR, and comprises a light chain having an amino acid sequence with at least 90%, 91%, 92%, 93%, 94%, 95%, 96%, 97%, 98%, or 99% identity to SEQ ID NO: 58 or 60, or a fragment thereof, and a heavy chain having an amino acid sequence with at least 90%, 91%, 92%, 93%, 94%, 95%, 96%, 97%, 98%, or 99% identity to SEQ ID NO: 59 or 61, or a fragment thereof. In some embodiments, the antigen-binding domain comprises CDR1, CDR2, and CDR3 from SEQ ID NOs: 58 and 59, or CDR1, CDR2, and CDR3 from SEQ ID NOs: 60 and 61.

In some embodiments, the antigen-binding moiety binds to c-MET, and comprises a light chain having an amino acid sequence with at least 90%, 91%, 92%, 93%, 94%, 95%, 96%, 97%, 98%, or 99% identity to SEQ ID NO: 62, or a fragment thereof, and a heavy chain having an amino acid sequence with at least 90%, 91%, 92%, 93%, 94%, 95%, 96%, 97%, 98%, or 99% identity to SEQ ID NO: 63, or a fragment thereof. In some embodiments, the antigen-binding domain comprises CDR1, CDR2, and CDR3 from SEQ ID NO: 62, and CDR1, CDR2, and CDR3 from SEQ ID NO: 63.

In some embodiments, the antigen-binding moiety binds to GPC3, and comprises a light chain having an amino acid sequence with at least 90%, 91%, 92%, 93%, 94%, 95%, 96%, 97%, 98%, or 99% identity to SEQ ID NO: 64, or a fragment thereof, and a heavy chain having an amino acid sequence with at least 90%, 91%, 92%, 93%, 94%, 95%, 96%, 97%, 98%, or 99% identity to SEQ ID NO: 65, or a fragment thereof. In some embodiments, the antigen-binding domain comprises CDR1, CDR2, and CDR3 from SEQ ID NO: 64, and CDR1, CDR2, and CDR3 from SEQ ID NO: 65.

In some embodiments, the antigen-binding moiety binds to Claudin 18.2, and comprises a light chain having an amino acid sequence with at least 90%, 91%, 92%, 93%, 94%, 95%, 96%, 97%, 98%, or 99% identity to SEQ ID NO: 66, or a fragment thereof, and a heavy chain having an amino acid sequence with at least 90%, 91%, 92%, 93%, 94%, 95%, 96%, 97%, 98%, or 99% identity to SEQ ID NO: 67, or a fragment thereof. In some embodiments, the antigen-binding domain comprises CDR1, CDR2, and CDR3 from SEQ ID NO: 66, and CDR1, CDR2, and CDR3 from SEQ ID NO: 67.

In some embodiments, the antigen-binding moiety binds to FAP alpha, and comprises a light chain having an amino acid sequence with at least 90%, 91%, 92%, 93%, 94%, 95%, 96%, 97%, 98%, or 99% identity to SEQ ID NO: 80 or 81, or a fragment thereof, and a heavy chain having an amino acid sequence with at least 90%, 91%, 92%, 93%, 94%, 95%, 96%, 97%, 98%, or 99% identity to SEQ ID NO: 82, or a fragment thereof. In some embodiments, the antigen-binding domain comprises CDR1, CDR2, and CDR3 from SEQ ID NO: 80 or 81, and CDR1, CDR2, and CDR3 from SEQ ID NO: 82.

In some embodiments, the antigen-binding moiety binds to FAP alpha, and comprises a light chain variable domain having an amino acid sequence with at least 90%, 91%, 92%, 93%, 94%, 95%, 96%, 97%, 98%, or 99% identity to SEQ ID NO: 83, and a heavy chain variable domain having an amino acid sequence with at least 90%, 91%, 92%, 93%, 94%, 95%, 96%, 97%, 98%, or 99% identity to SEQ ID NO: 84. In some embodiments, the antigen-binding domain comprises CDR1, CDR2, and CDR3 from SEQ ID NO: 84, and CDR1, CDR2, and CDR3 from SEQ ID NO: 84.

In some embodiments, the antigen-binding moiety binds to PDL1, and comprises a light chain having an amino acid sequence with at least 90%, 91%, 92%, 93%, 94%, 95%, 96%, 97%, 98%, or 99% identity to SEQ ID NO: 89, or a fragment thereof, and a heavy chain having an amino acid sequence with at least 90%, 91%, 92%, 93%, 94%, 95%, 96%, 97%, 98%, or 99% identity to SEQ ID NO: 90, or a fragment thereof. In some embodiments, the antigen-binding domain comprises CDR1, CDR2, and CDR3 from SEQ ID NO: 89, and CDR1, CDR2, and CDR3 from SEQ ID NO: 90.

In some embodiments, the antigen-binding moiety binds to 5T4, and comprises a light chain variable domain having an amino acid sequence with at least 90%, 91%, 92%, 93%, 94%, 95%, 96%, 97%, 98%, or 99% identity to SEQ ID NO: 87 or 88, and a heavy chain variable domain having an amino acid sequence with at least 90%, 91%, 92%, 93%, 94%, 95%, 96%, 97%, 98%, or 99% identity to SEQ ID NO: 85 or 86, or a fragment thereof. In some embodiments, the antigen-binding domain comprises CDR1, CDR2, and CDR3 from SEQ ID NO: 87 or 88, and CDR1, CDR2, and CDR3 from SEQ ID NO: 85 or 86.

In some embodiments, the antigen-binding moiety binds to Trop-2, and comprises a light chain variable region comprising a CDR1 comprising an amino acid sequence of KASQDVSIAVA (SEQ ID NO: 68), a CDR2 comprising an amino acid sequence of SASYRYT (SEQ ID NO: 69), and a CDR3 comprising an amino acid sequence of QQHYITPLT (SEQ ID NO: 70); and a heavy chain variable region comprising a CDR1 comprising an amino acid sequence of NYGMN (SEQ ID NO: 71), a CDR2 comprising an amino acid sequence of WINTYTGEPTYTDDFKG (SEQ ID NO: 72), and a CDR3 comprising an amino acid sequence of GGFGSSYWYFDV (SEQ ID NO: 73).

In some embodiments, the antigen-binding moiety binds to mesothelin, and comprises light chain variable region comprising a CDR1 comprising an amino acid sequence of SASSSVSYMH (SEQ ID NO: 74), a CDR2 comprising an amino acid sequence of DTSKLAS (SEQ ID NO: 75), and a CDR3 comprising an amino acid sequence of QQWSGYPLT (SEQ ID NO: 76); and a heavy chain variable region comprising a CDR1 comprising an amino acid sequence of GYTMN (SEQ ID NO:77), a CDR2 comprising an amino acid sequence of LITPYNGASSYNQKFRG (SEQ ID NO: 78), and a CDR3 comprising an amino acid sequence of GGYDGRGFDY (SEQ ID NO: 79).

In some embodiments, the antigen-binding moiety binds to PD-1, and comprises a light chain having an amino acid sequence with at least 90%, 91%, 92%, 93%, 94%, 95%, 96%, 97%, 98%, or 99% identity to SEQ ID NO: 50, or a fragment thereof, and a heavy chain having an amino acid sequence with at least 90%, 91%, 92%, 93%, 94%, 95%, 96%, 97%, 98%, or 99% identity to SEQ ID NO: 91, or a fragment thereof. In some embodiments, the antigen-binding domain comprises CDR1, CDR2, and CDR3 from SEQ ID NO: 50, and CDR1, CDR2, and CDR3 from SEQ ID NO: 91.

In some embodiments, the antigen-binding moiety binds to PD-1, and comprises a light chain having an amino acid sequence with at least 90%, 91%, 92%, 93%, 94%, 95%, 96%, 97%, 98%, or 99% identity to SEQ ID NO: 92, or a fragment thereof, and a heavy chain having an amino acid sequence with at least 90%, 91%, 92%, 93%, 94%, 95%, 96%, 97%, 98%, or 99% identity to SEQ ID NO: 93, or a fragment thereof. In some embodiments, the antigen-binding domain comprises CDR1, CDR2, and CDR3 from SEQ ID NO: 92, and CDR1, CDR2, and CDR3 from SEQ ID NO: 93.

In some embodiments, the antigen-binding moiety comprises one, two or three antigen-binding domains. For example, the antigen-binding moiety is bispecific and binds to two different antigens selected from the group consisting of HER2, HER3, EGFR, 5T4, FAP alpha, Trop-2, GPC3, VEGFR2, Claudin 18.2 and PD-L1. In some embodiments, said bispecific antigen-binding moiety binds to two different epitopes of HER2.

2. Other Carrier Moieties

Other non-antigen-binding carrier moieties may be used for the present prodrugs. For example, an antibody Fc domain (e.g., a human IgG$_1$, IgG$_2$, IgG$_3$, or IgG$_4$ Fc), a polymer (e.g., PEG), an albumin (e.g., a human albumin) or a fragment thereof, or a nanoparticle can be used.

By way of example, the IL-21 agonist polypeptide and its antagonist may be fused to an antibody Fc domain, forming an Fc fusion protein. In some embodiments, the IL-21 agonist polypeptide is fused (directly or through a peptide linker) to the C-terminus or N-terminus of one of the Fc domain polypeptide chains, and the cytokine mask is fused to the corresponding C-terminus or N-terminus of the other Fc domain polypeptide chain through a cleavable peptide linker, wherein the two Fc domain polypeptide chains contain mutations that allow the specific pairing of the two different Fc chains. In some embodiments, the Fc domain comprises the holes-into-holes mutations described above. In further embodiments, the Fc domain may comprise also the YTE and/or LALA mutations described above.

The carrier moiety of the prodrug may comprise an albumin (e.g., human serum albumin) or a fragment thereof. In some embodiments, the carrier moiety comprises an albumin fragment (e.g., a human serum albumin fragment) that is about 10 or more, 20 or more, 30 or more 40 or more, 50 or more, 60 or more, 70 or more, 80 or more, 90 or more, 100 or more, 120 or more, 140 or more, 160 or more, 180 or more, 200 or more, 250 or more, 300 or more, 350 or more, 400 or more, 450 or more, 500 or more, or 550 or more amino acids in length. In some embodiments, the albumin fragment is between about 10 amino acids and about 584 amino acids in length (such as between about 10 and about 20, about 20 and about 40, about 40 and about 80, about 80 and about 160, about 160 and about 250, about 250 and about 350, about 350 and about 450, or about 450 and about 550 amino acids in length). In some embodiments, the albumin fragment includes the Sudlow I domain or a fragment thereof, or the Sudlow II domain or the fragment thereof.

D. Linker Components of the Prodrugs

The IL-21 agonist polypeptide may be fused to the carrier moiety with or without a peptide linker. The peptide linker may be noncleavable. In some embodiments, the peptide linker is selected from SEQ ID NOs: 29-33. In particular embodiments, the peptide linker comprise the amino acid sequence GGGGSGGGGSGGGGS (SEQ ID NO: 31).

The IL-21 mask may be fused to the cytokine moiety or to the carrier through a cleavable linker. The cleavable linker may contain one or more (e.g., two or three) cleavable moieties (CM). Each CM may be a substrate for an enzyme or protease selected from legumain, plasmin, TMPRSS-3/4, MMP2, MMP9, MT1-MMP, cathepsin, caspase, human neutrophil elastase, beta-secretase, uPA, and PSA. Examples of cleavable linkers include, without limitation, those comprising an amino acid sequence selected from SEQ ID NOs: 11-26. By way of example, a cleavable peptide linker is used to link the IL-21Rγ ECD to an IL-21 Rα-subunit ECD. Preferably, there is a cleavable peptide linker which links one IL-21Rα-subunit ECD to the other α-subunit ECD to form a dimer.

E. IL-21 Prodrugs with an Additional Effector Polypeptide

In specific embodiments, the IL-21 prodrugs further comprise a second effector polypeptide such as a second cytokine moiety. In such cases, the prodrugs may further comprise a second masking moiety that binds to and inhibits a biological activity of the second effector polypeptide.

By way of example, the IL-21 agonist polypeptide and its mask may be fused to separate Fc chains at one end of the Fc domain, while the second cytokine moiety and its mask may be fused to separate Fc chains at the other end of the Fc domain, wherein the masks are fused to the Fc chains through cleavable peptide linkers. In certain embodiments, the two Fc domain polypeptide chains contain mutations that allow the specific pairing of the two different Fc chains.

Examples of prodrugs comprising two effector polypeptides and two masking moieties include those comprising two polypeptide chains whose amino acid sequences respectively comprise (i) SEQ ID NOs: 42 and 44; (ii) SEQ ID NOs: 43 and 44; (iii) SEQ ID NOs: 45 and 47; or (iv) SEQ ID NOs: 46 and 47. The exemplary structure of an IL-21 prodrug that comprises an IL-2 agonist polypeptide (second effector polypeptide) and its corresponding mask is illustrated in FIG. 3A. The exemplary structure of an IL-21 prodrug that comprises an IL-15 agonist polypeptide, the sushi domain and its corresponding mask is illustrated in FIG. 3B.

In some embodiments, the IL-21 prodrugs further comprise one or more (e.g., two or three) copies of the ectodomains of the ligand of a tumor necrosis factor (TNF) superfamily member. In some embodiments, the TNF superfamily member is 4-1BB. The structure of an exemplary IL-21 prodrug further comprising two copies of a 4-1BB ligand (4-1BBL) ectodomain is illustrated in FIG. 4. The carrier of the IL-21 prodrug may be an antibody that binds to an antigen expressed in a tumor, for example, FAP or 5T4.

Specific, nonlimiting examples of IL-21 agonist polypeptides, cytokine masks, carriers, peptide linkers, and prodrugs are shown in the Sequences section below. Further, the prodrugs of the present disclosure may be made by well-known recombinant technology. For examples, one or more expression vectors comprising the coding sequences for the polypeptide chains of the prodrugs may be transfected into mammalian host cells (e.g., CHO cells), and the cells are cultured under conditions that allow the expression of the coding sequences and the assembly of the expressed polypeptides into the prodrug complex. In order for the prodrug to remain inactive, the host cells that express no or little uPA, MMP2 and/or MMP9 may be used. In some embodiments, the host cells may contain null mutations (knockout) of the genes that encode these proteases.

Pharmaceutical Compositions

Pharmaceutical compositions comprising the prodrugs and muteins (i.e., the active pharmaceutical ingredient or API) of the present disclosure may be prepared by mixing the API having the desired degree of purity with one or more optional pharmaceutically acceptable excipients (see, e.g., *Remington's Pharmaceutical Sciences,* 16th Edition., Osol, A. Ed. (1980)) in the form of lyophilized formulations or aqueous solutions. Pharmaceutically acceptable excipients (or carriers) are generally nontoxic to recipients at the dosages and concentrations employed, and include, but are not limited to: buffers containing, for example, phosphate, citrate, succinate, histidine, acetate, or another inorganic or organic acid or salt thereof; antioxidants including ascorbic acid and methionine; preservatives (such as octadecyldimethylbenzyl ammonium chloride; hexamethonium chloride; benzalkonium chloride; benzethonium chloride; phenol, butyl or benzyl alcohol; alkyl parabens such as methyl or propyl paraben; catechol; resorcinol; cyclohexanol; 3-pentanol; and m-cresol); low molecular weight (less than about 10 residues) polypeptides; proteins, such as serum albumin, gelatin, or immunoglobulins; hydrophilic polymers such as polyvinylpyrrolidone; amino acids such as glycine, glutamine, asparagine, histidine, arginine, or lysine; monosaccharides, disaccharides, and other carbohydrates including sucrose, glucose, mannose, or dextrins; chelating agents such as EDTA; sugars such as sucrose, mannitol, trehalose or sorbitol; salt-forming counter-ions such as sodium; metal complexes (e.g. Zn-protein complexes); and/or non-ionic surfactants such as polyethylene glycol (PEG).

Buffers are used to control the pH in a range which optimizes the therapeutic effectiveness, especially if stability is pH dependent. Buffers are preferably present at concentrations ranging from about 50 mM to about 250 mM. Suitable buffering agents for use with the present invention include both organic and inorganic acids and salts thereof, such as citrate, phosphate, succinate, tartrate, fumarate, gluconate, oxalate, lactate, and acetate. Additionally, buffers may comprise histidine and trimethylamine salts such as Tris.

Preservatives are added to retard microbial growth, and are typically present in a range from 0.2%-1.0% (w/v). Suitable preservatives for use with the present invention include octadecyldimethylbenzyl ammonium chloride; hexamethonium chloride; benzalkonium halides (e.g., chloride, bromide, iodide), benzethonium chloride; thimerosal, phenol, butyl or benzyl alcohol; alkyl parabens such as methyl or propyl paraben; catechol; resorcinol; cyclohexanol, 3-pentanol, and m-cresol.

Tonicity agents, sometimes known as "stabilizers" are present to adjust or maintain the tonicity of liquid in a composition. When used with large, charged biomolecules such as proteins and antibodies, they are often termed "stabilizers" because they can interact with the charged groups of the amino acid side chains, thereby lessening the potential for inter- and intra-molecular interactions. Tonicity agents can be present in any amount between 0.1% to 25% by weight, or more preferably between 1% to 5% by weight, taking into account the relative amounts of the other ingredients. Preferred tonicity agents include polyhydric sugar alcohols, preferably trihydric or higher sugar alcohols, such as glycerin, erythritol, arabitol, xylitol, sorbitol and mannitol.

Non-ionic surfactants or detergents (also known as "wetting agents") are present to help solubilize the therapeutic agent as well as to protect the therapeutic protein against agitation-induced aggregation, which also permits the formulation to be exposed to shear surface stress without causing denaturation of the active therapeutic protein or antibody. Non-ionic surfactants are present in a range of about 0.05 mg/ml to about 1.0 mg/ml, preferably about 0.07 mg/ml to about 0.2 mg/ml.

Suitable non-ionic surfactants include polysorbates (20, 40, 60, 65, 80, etc.), polyoxamers (184, 188, etc.), PLURONIC® polyols, TRITON®, polyoxyethylene sorbitan monoethers (TWEEN®-20, TWEEN®-80, etc.), lauromacrogol 400, polyoxyl 40 stearate, polyoxyethylene hydrogenated castor oil 10, 50 and 60, glycerol monostearate, sucrose fatty acid ester, methyl cellulose and carboxymethyl cellulose. Anionic detergents that can be used include sodium lauryl sulfate, dioctyle sodium sulfosuccinate and dioctyl sodium sulfonate. Cationic detergents include benzalkonium chloride or benzethonium chloride.

The choice of pharmaceutical carrier, excipient or diluent may be selected with regard to the intended route of administration and standard pharmaceutical practice. Pharmaceutical compositions may additionally comprise any suitable binder(s), lubricant(s), suspending agent(s), coating agent(s) or solubilizing agent(s).

There may be different composition/formulation requirements dependent on the different delivery systems. By way of example, pharmaceutical compositions useful in the present invention may be formulated to be administered using a mini-pump or by a mucosal route, for example, as a nasal spray or aerosol for inhalation or ingestible solution, or parenterally in which the composition is formulated by an injectable form, for delivery, by, for example, an intravenous, intramuscular or subcutaneous route.

In some embodiments, the pharmaceutical composition of the present disclosure is a lyophilized protein formulation. In other embodiments, the pharmaceutical composition may be an aqueous liquid formulation.

Methods of Treatment

The IL-21 prodrug can be used to treat a disease, depending on the antigen bound by the antigen-binding domain. In some embodiments, the IL-21 prodrug is used to treat cancer. In some embodiments, the IL-21 prodrug is used to treat an infection.

In some embodiments, a method of treating a disease (such as cancer, a parasitic infection, a viral infection, or a bacterial infection) in a subject comprises administering to the subject an effective amount of an IL-21 prodrug.

In some embodiments, the cancer is a solid cancer. In some embodiments, the cancer is a blood cancer or a solid tumor. Exemplary cancers that may be treated include, but are not limited to, leukemia, lymphoma, kidney cancer, bladder cancer, urinary tract cancer, cervical cancer, brain cancer, head and neck cancer, skin cancer, uterine cancer, testicular cancer, esophageal cancer, liver cancer, colorectal cancer, stomach cancer, squamous cell carcinoma, prostate cancer, pancreatic cancer, lung cancer such as non-small cell lung cancer, cholangiocarcinoma, breast cancer, and ovarian cancer.

In some embodiments, the IL-21 prodrug is used to treat a viral infection. In some embodiments, the virus causing the viral infection is hepatitis C virus (HCV), hepatitis B virus (HBV), human immunodeficiency virus (HIV), or human papilloma virus (HPV). In some embodiments, the antigen-binding moiety binds to a viral antigen.

In some embodiments, the IL-21 prodrug is used to treat a bacterial infection such as sepsis. In some embodiments, the bacteria causing the bacterial infection is drug-resistant bacteria. In some embodiments, the antigen-binding moiety binds to a bacterial antigen.

Generally, dosages and routes of administration of the present pharmaceutical compositions are determined according to the size and conditions of the subject, according to standard pharmaceutical practice. In some embodiments, the pharmaceutical composition is administered to a subject through any route, including orally, transdermally, by inhalation, intravenously, intra-arterially, intramuscularly, direct application to a wound site, application to a surgical site, intraperitoneally, by suppository, subcutaneously, intradermally, transcutaneously, by nebulization, intrapleurally, intraventricularly, intra-articularly, intraocularly, intracranially, or intraspinally. In some embodiments, the composition is administered to a subject intravenously.

In some embodiments, the dosage of the pharmaceutical composition is a single dose or a repeated dose. In some embodiments, the doses are given to a subject once per day, twice per day, three times per day, or four or more times per day. In some embodiments, about 1 or more (such as about 2, 3, 4, 5, 6, or 7 or more) doses are given in a week. In some embodiments, the pharmaceutical composition is administered weekly, once every 2 weeks, once every 3 weeks, once every 4 weeks, weekly for two weeks out of 3 weeks, or weekly for 3 weeks out of 4 weeks. In some embodiments, multiple doses are given over the course of days, weeks, months, or years. In some embodiments, a course of treatment is about 1 or more doses (such as about 2, 3, 4, 5, 7, 10, 15, or 20 or more doses).

Unless otherwise defined herein, scientific and technical terms used in connection with the present disclosure shall have the meanings that are commonly understood by those of ordinary skill in the art. Exemplary methods and materials are described below, although methods and materials similar or equivalent to those described herein can also be used in the practice or testing of the present disclosure. In case of conflict, the present specification, including definitions, will control. Generally, nomenclature used in connection with, and techniques of, cell and tissue culture, molecular biology, immunology, microbiology, genetics, analytical chemistry, synthetic organic chemistry, medicinal and pharmaceutical chemistry, and protein and nucleic acid chemistry and hybridization described herein are those well-known and commonly used in the art. Enzymatic reactions and purification techniques are performed according to manufacturer's specifications, as commonly accomplished in the art or as described herein. Further, unless otherwise required by context, singular terms shall include pluralities and plural terms shall include the singular. Throughout this specification and embodiments, the words "have" and "comprise," or variations such as "has," "having," "comprises," or "comprising," will be understood to imply the inclusion of a stated integer or group of integers but not the exclusion of any other integer or group of integers. It is understood that aspects and variations of the invention described herein include "consisting" and/or "consisting essentially of" aspects and variations. All publications and other references mentioned herein are incorporated by reference in their entirety. Although a number of documents are cited herein, this citation does not constitute an admission that any of these documents forms part of the common general knowledge in the art.

Exemplary Embodiments

Further particular embodiments of the present disclosure are described as follows. These embodiments are intended to illustrate the compositions and methods described in the present disclosure and are not intended to limit the scope of the present disclosure.

1. A Prodrug of IL-21 which comprises an IL-21 agonist polypeptide (A), a masking moiety (MM), a carrier (C), and at least one cleavable peptide linker; wherein:
    a) said IL-21 agonist polypeptide (A) has an amino acid sequence at least 95% identical to that of SEQ ID NO: 1;
    b) said masking moiety (MM) is selected from IL-21 receptor extracellular domain, its analog, and a fusion protein of the IL-21 receptor extracellular domain and the extracellular domain of the gamma chain;
    c) said carrier is selected from an albumin, an albumin fragment, a Fc, and an antibody; and
    d) said cleavable peptide linker links the said masking moiety (MM) to the carrier or to the IL-21 agonist polypeptide.

2. The prodrug of embodiment 1, wherein said IL-21 agonist polypeptide (A) is human IL-21 with amino acid sequence of SEQ ID NO: 1 or its analog, wherein said analog contains one or more mutations at D18, E109, K117, and or K119; and wherein said mutations are referred to according to the numbering of the human IL-21 with amino acid sequence of SEQ ID NO: 1.

3. The prodrug of embodiment 1, wherein said IL-21 agonist polypeptide (A) has an amino acid sequence selected from SEQ ID NOs: 2-5.

4. The prodrug of embodiments 1-3, wherein IL-21 receptor extracellular domain has an amino acid sequence at least 95%, at least 96%, at least 97%, at least 98%, at least 99% or 100% identical as that of SEQ ID NO: 6; and wherein said gamma chain has an amino acid as shown in SEQ ID NO: 7.

5. The prodrug of embodiments 1-4, wherein said cleavable peptide linker has an amino acid sequence selected from SEQ ID NOs: 11-26.

6. The prodrug of embodiments 1-5, wherein said carrier (C) is an albumin or a fragment thereof.

7. The prodrug of embodiments 1-5, wherein said carrier(C) is an Fc fragment.

8. The prodrug of embodiment 7, wherein said IL-21 agonist polypeptide is fused to the C-terminal of one Fc fragment, optionally through a peptide linker, and said masking moiety (MM) is fused to the C-terminal of the second Fc fragment through a cleavable peptide linker; and wherein the Fc-fusion proteins form a heterodimer through "knob-into-hole" mutations.

9. The prodrug of embodiment 7, wherein said IL-21 agonist polypeptide is fused to the N-terminal of one Fc fragment, optionally through a peptide linker, and said masking moiety (MM) is fused to the N-terminal of the second Fc fragment through a cleavable peptide linker; and wherein above said two Fc-fusion proteins form a heterodimer through "knob-into-hole" mutations.

10. The prodrug of embodiments 1-6, wherein said carrier (C) is an antibody.

11. The prodrug of embodiment 10, wherein said IL-21 agonist polypeptide is fused to the N-terminal of the heavy chains of said antibody, optionally through a peptide linker, and said masking moiety (MM) is fused to the N-terminal of the light chain through a cleavable peptide linker.

12. The prodrug of embodiment 10, wherein said IL-21 agonist polypeptide is fused to the C-terminal of one of the heavy chains of said antibody, optionally through a peptide linker, and said masking moiety (MM) is fused to the C-terminal of the $2^{nd}$ heavy chain through a cleavable peptide linker; and wherein above the heavy chain-fusion proteins form a heterodimer through "knob-into-hole" mutations.

13. The prodrug of embodiment 10, wherein said IL-21 agonist polypeptide is fused to the N-terminal of one of the heavy chains of said antibody, optionally through a peptide linker, and said masking moiety (MM) is fused to the N-terminal of the $2^{nd}$ heavy chain through a cleavable peptide linker; and wherein above said two heavy chain-fusion proteins form a heterodimer through "knob-into-hole" mutations.

14. The prodrug of embodiment 10, wherein one said IL-21 agonist polypeptide is fused to each of the C-terminals of the heavy chains of said antibody, optionally through a peptide linker, and said masking moiety (MM) is fused to the C-terminal of the IL-21 agonist polypeptide through a cleavable peptide linker.

15. The prodrug of embodiments 10-14, wherein said antibody binds to one or more antigens on a cancer cell.

16. The prodrug of embodiments 10-14, wherein said antibody is an antibody against human PD-L1 or CD47.

17. The prodrug of embodiments 10-14, wherein said antibody is selected from anti-CEA antibody PR1A3, humanized PR1A3, and anti-FAP-alpha antibody sibrotuzumab (BIBH1).

18. The prodrug of embodiments 10-14, wherein said antibody binds to one or more antigen selected from Guanyl cyclase C (GCC), carbohydrate antigen 19-9 (CA19-9), glycoprotein A33 (gpA33), mucin 1 (MUC1), carcinoembryonic antigen (CEA), insulin-like growth factor 1 receptor (IGF1-R), human epidermal growth factor receptor 2 (HER2), human epidermal growth factor receptor 3 (HER3), delta-like protein 3 (DLL3), delta-like protein 4 (DLL4), epidermal growth factor receptor (EGFR), glypican-3 (GPC3), c-MET, vascular endothelial growth factor receptor 1 (VEGFR1), vascular endothelial growth factor receptor 2 (VEGFR2), Nectin-4, Liv-1, glycoprotein NMB (GPNMB), prostate-specific membrane antigen (PSMA), Trop-2, carbonic anhydrase IX (CA9), endothelin B receptor (ETBR), six transmembrane epithelial antigen of the prostate 1 (STEAP1), folate receptor alpha (FR-α), SLIT and NTRK-like protein 6 (SLITRK6), carbonic anhydrase VI (CA6), ectonucleotide pyrophosphatase/phosphodiesterase family member 3 (ENPP3), mesothelin, trophoblast glycoprotein (TPBG), CD19, CD20, CD22, CD33, CD40, CD56, CD66e, CD70, CD74, CD79b, CD98, CD123, CD138, CD352, CD47, signal-regulatory protein alpha (SIRPα), PD1, Claudin 18.2, Claudin 6, and FAP-alpha., BCMA, and EPCAM, CD3, TGF-beta, LAG3, TIM3, TIGIT, and CTLA-4.

19. The prodrug of embodiments 10-18, wherein it further comprises a CCL19 polypeptide with an amino acid sequence at least 95% identical as that of SEQ ID NO: 27.

20. The prodrug of embodiments 1-19, wherein said cleavable peptide linker is cleavable by a protease or proteases found at a tumor site or its surrounding environment.

21. Prodrug of embodiments 1-19, wherein said prodrug is activated at the site of a tumor.

22. The prodrug of embodiment 16, wherein said antibody binds to PD-L1; wherein said PD-L1 antibody is selected from atezolizumab, durvalumab, avelumab.

23. Prodrug of embodiment 10-14, wherein said antibody binds to PD-1; wherein said anti-PD-1 antibody is selected from Nivolumab and Pembrolizumab.

24. A prodrug of IL-21, wherein its IL-21 activity is activatable or increase by at least 200% at the site of a tumor or its surrounding area, comprising:
   a) An antibody, which binds to PD-L1, comprising two identical light chains and a 1$^{st}$ heavy chain and a 2$^{nd}$ heavy chain; wherein said heavy chains contain "knob-and-hole" mutations;
   b) An IL-21 agonist polypeptide, wherein said IL-21 agonist polypeptide is fused to the C-terminal of the 1$^{st}$ heavy chain of said antibody, optionally through a peptide linker with amino acid sequence (GGGGS)$_n$, wherein n=1, 2, 3, and 4 (SEQ ID NO: 97);
   c) A masking moiety (MM), wherein said masking moiety comprises one or two extracellular domains of the IL-21 receptor extracellular domain; and;
   d) a cleavable peptide linker which links the said masking moiety (MM) to the C-terminal of the 2$^{nd}$ heavy chain of said antibody,
   wherein said IL-21 agonist polypeptide comprises an amino acid sequence selected from SEQ ID NO: 1-5; and wherein said IL-21 receptor beta subunit extracellular domain has an amino acid sequence as that of SEQ ID NO: 6.

25. A prodrug of IL-21, wherein its IL-21 activity is activatable or increase by at least 200% at the site of a tumor or its surrounding area, comprising:
   a) An antibody, which binds to CD47, comprising two identical light chains and a 1$^{st}$ heavy chain and a 2$^{nd}$ heavy chain; wherein said heavy chains contain "knob-and-hole" mutations;
   b) An IL-21 agonist polypeptide, wherein said IL-21 agonist polypeptide is fused to the C-terminal of the 1$^{st}$ heavy chain of said antibody, optionally through a peptide linker with amino acid sequence (GGGGS)$_n$, wherein n=1, 2, 3, and 4 (SEQ ID NO: 97);
   c) A masking moiety (MM), wherein said masking moiety comprises one or two extracellular domains of the IL-21 receptor extracellular domain; and;
   d) a cleavable peptide linker which links the said masking moiety (MM) to the C-terminal of the 2$^{nd}$ heavy chain of said antibody,
   wherein said IL-21 agonist polypeptide comprises an amino acid sequence selected from SEQ ID NO: 1-5; and wherein said IL-21 receptor beta subunit extracellular domain has an amino acid sequence as that of SEQ ID NO: 6.

26. Polynucleotides encoding the albumin fusion protein, the Fc fusion protein, the light chain fusion protein, or the heavy chain fusion protein of the prodrugs of embodiments 1-25.

27. An expression vector comprising the polynucleotide of embodiment 26.

28. A host cell transfected with the vector of embodiment 27.

29. A method of producing said prodrug of embodiments 1-25 comprising culturing the host cell of embodiment 28.

30. A pharmaceutical composition comprising as active ingredient the prodrug of embodiments 1-25.

31. A method of treating breast, lung, pancreatic, esophageal, medullary thyroid, ovarian, uterine, prostatic, testicular, colon, rectal or stomach cancer or infectious disease comprising administering to a human subject with breast, lung, pancreatic, esophageal, medullary thyroid, ovarian, uterine, prostatic, testicular, colon, rectal or stomach cancer, or an infectious disease comprising administration of said pharmaceutical composition of Embodiment 30.

32. The method of embodiment 31, wherein the dosage administrated is 0.1-18 mg/kg.

33. The method of embodiment 31, wherein the dosage is selected from the group consisting of 0.1 mg/kg, 0.2 mg/kg, 0.5 mg/kg, 1 mg/kg, 2 mg/kg, 3 mg/kg, 4 mg/kg, 5 mg/kg, 6 mg/kg, 8 mg/kg, 10 mg/kg, and 15 mg/kg.

34. The method of embodiment 33, wherein the dosage is administered to the human subject once or twice a week on a schedule with a cycle selected from the group consisting of: (i) weekly; (ii) every other week; (iii) one week of therapy followed by two, three or four weeks off; (iv) two weeks of therapy followed by one, two, three or four weeks off; (v) three weeks of therapy followed by one, two, three, four or five weeks off; (vi) four weeks of therapy followed by one, two, three, four or five weeks off; (vii) five weeks of therapy followed by one, two, three, four or five weeks off; and (viii) monthly.

In order that this invention may be better understood, the following examples are set forth. These examples are for purposes of illustration only and are not to be construed as limiting the scope of the invention in any manner.

EXAMPLES

Example 1

Transient Transfection of the IL-21 Prodrugs Using HEK293 Cells

Expression plasmids were co-transfected into 3×10⁶ cell/ml freestyle HEK293 cells at 2.5-3 µg/ml using PEI (polyethylenimine). For Fc-based IL-21 prodrugs (A and B), the Fc-IL-21 fusion polypeptide and the Fc-masking moiety fusion polypeptide were in a 1:2 ratio. For antibody-based IL-21 prodrugs, the knob heavy chain (containing IL-21 agonist polypeptide) and hole heavy chain (containing IL-21 masking moiety) and the light chain DNA were in a 2:1:2 molar ratio. The cell cultures were harvested 6 days after transfection by centrifuging at 9,000 rpm for 45 min followed by 0.22 µM filtration.

Two IL-21 Prodrugs (A and B) were expressed. Prodrug A consists of two polypeptides having SEQ ID NOs: 94 and 38, respectively. Prodrug B consist of two polypeptides having SEQ ID NOs: 95 and 38, respectively. Their corresponding controls, the Fc-IL-21 fusion molecules without the masking moiety, were also expressed. The sequence ID NOs are listed in Table 2.

TABLE 2

Sequence Information of the samples.

| Prodrug or Control Name | SEQ ID for Fc-IL-21 Fusion Polypeptide | SEQ ID for Fc-Masking Moiety Fusion Polypeptide | SEQ ID for the Fc Polypeptide |
| --- | --- | --- | --- |
| IL-21 Prodrug A | SEQ ID NO: 94 | SEQ ID NO: 38 | — |
| Fc-IL-21 Control 1 | SEQ ID NO: 94 | — | SEQ ID NO: 96 |
| IL-21 Prodrug B | SEQ ID NO: 95 | SEQ ID NO: 38 | — |
| Fc-IL-21 Control 2 | SEQ ID NO: 94 | — | SEQ ID NO: 96 |

Example 2

Purification of the Fc-Based IL-21 Prodrugs

The purifications of the proteins of the Fc-based IL-21 prodrugs A and B were carried out by using three chromatography steps: Protein A Affinity, Capto Adhere (Flow-through mode), and Capto SP ImpRes. Briefly, the supernatant of the transient expression cell culture was loaded onto a Protein A column, which was equilibrated with 25 mM Tris-HCl, 30 mM NaCl, pH 7.8 (buffer A) before applying the sample. The column was washed with 5-column volumes of buffer A and the bound protein was eluted with 50 mM acetic acid, pH 3.6. The pH of the eluted protein was adjusted to 5.2 using 1 M Tris-base and loaded onto a Capto Adhere column, which was equilibrated with 50 mM acetic acid, 30 mM NaCl, pH 5.2 (buffer B). The flow-through was collected and further loaded onto a buffer B equilibrated Capto SP ImpRes column. The column was washed with 5-column volumes of buffer B, and the bound protein was eluted with a 30-column volume gradient from 0% to 100% of 50 mM acetic acid, 1 M NaCl, pH 5.2 (buffer C). The eluted samples from each step were analyzed by HPLC-SEC. The fractions of the Capto SP ImpRes step with aggregation less than 10% were pooled for the further analyses.

Example 3

SEC-HPLC Analysis

SEC-HPLC was carried out using an Agilent 1100 Series of HPLC system with a TSKgel G3000SWXL column (7.8 mmIDX 30 cm, 5 µm particle size) ordered from Tosoh Bioscience. A sample of up to 100 µl was loaded. The column was run with a buffer containing 200 mM $K_3PO_4$, 250 mM KCl, pH 6.5. The flow rate was 0.5 ml/min. The column was run at room temperature. The protein elution was monitored both at 220 nm and 280 nm. The in-process pools of the IL-21 Prodrug A were analyzed by the SEC-HPLC. FIG. 5A shows the assay result for the Protein A column pool; FIG. 5B shows the assay result for the Capto Adhere column pool; and FIG. 5C shows the assay result for the Capto Sp ImpRes column pool. The data show that the Protein A column purified prodrug comprised a main peak with some aggregates (FIG. 5A). It had a main peak purity of about 80% as analyzed by SEC-HPLC. The aggregates were significantly reduced by the subsequent chromatography steps and the Capto SP Impres pool showed a product purity of over 98% as tested by SEC-HPLC (FIG. 5C).

Example 4

SDS-PAGE Analysis

10 µl of the culture supernatants or 10-20 µg of purified protein samples were mixed with Bolt™ LDS Sample Buffer (Novex) with or without reduce reagents. The samples were heated at 70° C. for 3 min and then loaded to a NuPAGE™ 4-12% BisTris Gel (Invitrogen). The gel was run in NuPAGE™ MOPS SDS Running buffer (Invitrogen) at 200 Volts for 40 min and then stained with Coomassie. The purified samples of Prodrugs A and B together with the ones treated with the protease MMP-2 (see below) were analyzed by the SDS-PAGE analysis, as shown in FIG. 6. The data show that the masking moieties of both Prodrug A and Prodrug B were completely removed by the protease digestion, and that the activated molecules migrated at the expected molecular weights.

Example 5

Proteolytic Treatment

The proteases, human MMP2, human MMP9, mouse MMP2 and mouse MMP9 were purchased from R&D systems. The protease digestion was carried out by incubating 10 µg-50 µg of prodrugs with 1 µg of human MMP2, human MMP9, mouse MMP2 or mouse MMP9 in the HBS buffer (20 mM HEPES, 150 mM $NaCl_2$, pH 7.4) containing 2 mM CaCl2 and 10 µM $ZnCl_2$ at 37° C. for 12 hours. The prodrugs prior to and after digestion were analyzed by SDS-PAGE (FIG. 6) and the cell-based activity assay (see below).

Example 6

Cell-Based Activity Assay

The prodrugs prior to and the protease digestion and the control samples were tested by the cell-based activity assay.

Briefly, NK92 cells were grown in the RPMI-1640 medium supplemented with L-glutamine, 10% fetal bovine serum, 10% non-essential amino acids, 10% sodium pyruvate, and 55 µM beta-mercaptoethanol. NK92 cells were non-adherent and maintained at $1\times10^5$ –$1\times10^6$ cells/ml in medium with 100 ng/ml of IL-2. Generally, cells were split twice per week. For bioassays, it was best to use cells no less than 48 hours after passage. IL-21 functional activity was determined by culturing NK92 cells at $5\times10^4$ cells/well with serial dilutions of the samples in the presence of a constant amount of IL-2 for 2 days. Supernatants were then assayed for interferon-γ by ELISA. The results are shown in FIGS. 7A and 7B. The data show that the bioassay activities of the prodrugs were significantly enhanced by the protease MMP2 treatment.

The protease-treated (or activated) prodrugs showed similar activities as those of the control Fc-IL-21 fusion molecules, even though the masking moiety, i.e., IL-21Rα ECD, was not removed from the protease-treated sample. Surprisingly, the presence of the masking moiety released by the protease digestion did not seem to interfere with the IL-21 bioassay, given that IL-21 binds to IL-21Rα with very high affinity (a $K_D$ of ~70 pM).

Example 7

Anti-PD-1 Antibody-IL-21 Prodrug Fusion Molecule

An Anti-PD-1 antibody-based IL-21 prodrug was constructed with two identical light chains (with an amino acid sequence as shown in SEQ ID NO: 50). A first heavy chain polypeptide chain (with an amino acid sequence as shown in SEQ ID NO: 48) and a second heavy chain polypeptide chain (with an amino acid sequence as shown SEQ ID NO: 49). The molecule was expressed and purified. As a control, the anti-PD-1 antibody-IL-21 fusion molecule without the mask was also expressed and purified. The cell-based activity assays for the cytokine prodrug prior to and after activation were tested using the same method as described above. The data are shown in FIG. 8. The results show that the IL-21 activity prior to activation was minimal. After activation, the IL-21 activity was similar as that of the IL-21 in the PD-1-IL-21 fusion molecule.

The activity of the anti-PD-1 antibody was also tested prior to and after the activation using the PD1/PD-L1 blockade reporter assay. The ability of anti-PD-1 antibody to block PD-L1 mediated PD1 signaling was measured using two engineered cell lines. The first was a CHO-K1 cell line (CHO-K1/TCRA/PD-L1, BPS Bioscience cat #60536) expressing both human PD-L1 and a T cell receptor activator. The second cell line (PD1/NFAT, BPS Bioscience cat #60535) was a Jurkat T cell line expressing PD-1 and an NFAT firefly luciferase reporter. The T cell receptor activator on the CHO-K1 cells would activate the Jurkat cells resulting in expression of the NFAT luciferase reporter. However, since the CHO-K1 cells also express PD-L1, signaling via PD-1 would result in inhibition of NFAT activation. Blocking the PD-L1/PD-1 interaction would restore NFAT activation and luciferase activity.

To carry out the assay, CHO-K1/TCRA/PD-L1 cells were seeded in 96-well flat bottom plates at 35,000 cells/well in 50 µL assay medium (RPMI-1640, 10% fetal bovine serum, non-essential amino acids, 2-mercaptoethanol, and gentamicin) in 96-well white walled, flat bottom plates. After overnight culture, the culture medium was removed and samples and standards were added at 2× concentration in 50 µL/well. Plates were incubated 20 minutes, and 40,000 PD1/NFAT cells were added to each well in 50 µL. Plates were incubated 6 hours at 37° C. Plates were cooled to room temperature for 5 minutes, and 100 µL/well luciferase reagent (Pierce Firefly Luc One-Step Glow Assay Kit, Thermo Scientific cat #16197) was added. Plates were incubated for 15 minutes, then luminescence was measured on a luminometer.

The assay results (FIG. 9) indicate that the anti-PD-1 antibodies in the fusion molecules had retained their biological functionality.

Example 8

In Vivo Efficacy Study with a Syngeneic Tumor Model

Six-week old Balb/c mice (Taconic Biosciences) are injected subcutaneously with $1\times10^6$ CT26/18.2 cells. After 7 days, tumors are measured using digital calipers and tumor volume was calculated (V=(ab2)p/6, where b is the shorter of 2 dimensions measured). Mice are then randomized into treatment groups such that all groups have approximately the same mean tumor size (~100 mm³). Mice are then treated with placebo or test article at 0.5-5 mg/kg in 100 µl via intraperitoneal injection. Dosing was performed on days 7, 9, 11, 13, 15 and 18. Tumors are measured every 2-3 days, and mice are sacrificed when tumors reach 2000 mm³.

The above non-limiting examples are provided for illustrative purposes only in order to facilitate a more complete understanding of the disclosed subject matter. These examples should not be construed to limit any of the embodiments described in the present specification, including those pertaining to the antibodies, pharmaceutical compositions, or methods and uses for treating cancer, a neurodegenerative or an infectious disease.

SEQUENCES

SEQ ID NO: 1 - human IL-21
QGQDRHMIRM RQLIDIVDQL KNYVNDLVPE FLPAPEDVET NCEWSAFSCF QKAQLKSANT

GNNERIINVS IKKLKRKPPS TNAGRRQKHR LTCPSCDSYE KKPPKEFLER FKSLLQKMIH

QHLSSRTHGS EDS

SEQ ID NO: 2 - IL-21 Mutein A
QGQDRHMIRM RQLIDIVAQL KNYVNDLVPE FLPAPEDVET NCEWSAFSCF QKAQLKSANT

GNNERIINVS IKKLKRKPPS TNAGRRQKHR LTCPSCDSYE KKPPKEFLER FKSLLQKMIH

QHLSSRTHGS EDS

SEQUENCES

SEQ ID NO: 3 - IL-21 Mutein B
QGQDRHMIRM RQLIDIVKQL KNYVNDLVPE FLPAPEDVET NCEWSAFSCF QKAQLKSANT

GNNERIINVS IKKLKRKPPS TNAGRRQKHR LTCPSCDSYE KKPPKEFLER FKSLLQKMIH

QHLSSRTHGS EDS

SEQ ID NO: 4 - IL-21 Mutein C
QGQDRHMIRM RQLIDIVDQL KNYVNDLVPE FLPAPEDVET NCEWSAFSCF QKAQLKSANT

GNNERIINVS IKKLKRKPPS TNAGRRQKHR LTCPSCDSYE KKPPKEFLRR FKSLLQKMIH

QHLSSRTHGS EDS

SEQ ID NO: 5 - IL-21 Mutein D
QGQDRHMIRM RQLIDIVKQL KNYVNDLVPE FLPAPEDVET NCEWSAFSCF QKAQLKSANT

GNNERIINVS IKKLKRKPPS TNAGRRQKHR LTCPSCDSYE KKPPKEFLRR FKSLLQKMIH

QHLSSRTHGS EDS

SEQ ID NO: 6 - IL-21 receptor ECD (source: uniprot.org/uniprot/Q9HBE5)
CPDLVCYTDY LQTVICILEM WNLHPSTLTL TWQDQYEELK DEATSCSLHR SAHNATHATY

TCHMDVFHFM ADDIFSVNIT DQSGNYSQEC GSFLLAESIK PAPPFNVTVT FSGQYNISWR

SDYEDPAFYM LKGKLQYELQ YRNRGDPWAV SPRRKLISVD SRSVSLLPLE FRKDSSYELQ

VRAGPMPGSS YQGTWSEWSD PVIFQTQSEE LKE

SEQ ID NO: 7 - Human IL-21 Rγ ECD
LNTTILTPNG NEDTTADFFL TTMPTDSLSV STLPLPEVQC FVFNVEYMNC TWNSSSEPQP

TNLTLHYWYK NSDNDKVQKC SHYLFSEEIT SGCQLQKKEI HLYQTFVVQL QDPREPRRQA

TQMLKLQNLV IPWAPENLTL HKLSESQLEL NWNNRFLNHC LEHLVQYRTD WDHSWTEQSV

DYRHKFSLPS VDGQKRYTFR VRSRFNPLCG SAQHWSEWSH PIHWGSNTSK ENPFLFALEA

SEQ ID NO: 8 - Human IL-2
APTSSSTKKT QLQLEHLLLD LQMILNGINN YKNPKLTRML TFKFYMPKKA TELKHLQCLE

EELKPLEEVL NLAQSKNFHL RPRDLISNIN VIVLELKGSE TTFMCEYADE TATIVEFLNR

WITFCQSIIS TLT

SEQ ID NO: 9 - Human IL-15
NWVNVISDLK KIEDLIQSMH IDATLYTESD VHPSCKVTAM KCFLLELQVI SLESGDASIH

DTVENLIILA NNSLSSNGNV TESGCKECEE LEEKNIKEFL QSFVHIVQMF INT

SEQ ID NO: 10 - Human IL-15 Rα sushi domain
ITCPPPMSVE HADIWVKSYS LYSRERYICN SGFKRKAGTS SLTECVLNKA TNVAHWTTPS

LKCIRDPALV HQRPA

SEQ ID NO: 11-17 - MMP2/MMP9 Cleavable peptide linkers
GPLGVR (SEQ ID NO: 11)

PLGMWSR (SEQ ID NO: 12)

PLGLWAR (SEQ ID NO: 13)

PQGIAGQR (SEQ ID NO: 14)

PLGLAG (SEQ ID NO: 15)

LALGPR (SEQ ID NO: 16)

GGPLGMLSQS (SEQ ID NO: 17)

SEQ ID NO: 18-26 - urokinase plasminogen activator (uPA) Cleavable peptide linkers
GGGGRRGGS (SEQ ID NO: 18)

TGRGPSWV (SEQ ID NO: 19)

| SEQUENCES |
| --- |

SARGPSRW (SEQ ID NO: 20)

TARGPSFK (SEQ ID NO: 21)

TARGPSW (SEQ ID NO: 22)

GGWHTGRN (SEQ ID NO: 23)

HTGRSGAL (SEQ ID NO: 24)

PLTGRSGG (SEQ ID NO: 25)

LTGRSGA (SEQ ID NO: 26)

SEQ ID NO: 27 - Human CCL19
TNDAEDCCLS VTQKPIPGYI VRNFHYLLIK DGCRVPAVVF TTLRGRQLCA PPDQPWVERI

IQRLQRTSAK MKRRSS

SEQ ID NO: 28 - Human IL-7
DCDIEGKDGK QYESVLMVSI DQLLDSMKEI GSNCLNNEFN FFKRHICDAN KEGMFLFRAA

RKLRQFLKMN STGDFDLHLL KVSEGTTILL NCTGQVKGRK PAALGEAQPT KSLEENKSLK

EQKKLNDLCF LKRLLQEIKT CWNKILMGTK EH

SEQ ID NO: 29-33 Peptide Linker
GGGGS (SEQ ID NO: 29)

GGGGSGGGGS (SEQ ID NO: 30)

GGGGSGGGGSGGGGS (SEQ ID NO: 31)

GGGGSGGGGXGGGGSGGGGS (SEQ ID NO: 32), X = A or N

GGGGSGGGGXGGGGYGGGGS (SEQ ID NO: 33), X = S, A or N, and Y = A or N

SEQ ID NO: 34 - IgG1 Fc
DKTHTCPPCP APELLGGPSV FLFPPKPKDT LMISRTPEVT CVVVDVSHED PEVKFNWYVD

GVEVHNAKTK PREEQYNSTY RVVSVLTVLH QDWLNGKEYK CKVSNKALPA PIEKTISKAK

GQPREPQVYT LPPSRDELTK NQVSLTCLVK GFYPSDIAVE WESNGQPENN YKTTPPVLDS

DGSFFLYSKL TVDKSRWQQG NVFSCSVMHE ALHNHYTQKS LSLSPGK

SEQ ID NO: 35 - IgG4 Fc
AESKYGPPCP PCPAPEAAGG PSVFLFPPKP KDTLMISRTP EVTCVVVDVS QEDPEVQFNW

YVDGVEVHNA KTKPREEQFN STYRVVSVLT VLHQDWLNGK EYKCKVSNKG LPSSIEKTIS

KAKGQPREPQ VYTLPPSQEE MTKNQVSLTC LVKGFYPSDI AVEWESNGQP ENNYKTTPPV

LDSDGSFFLY SRLTVDKSRW QEGNVFSCSV MHEALHNHYT QKSLSLSLGK

SEQ ID NO: 36 - Fc with knobs mutations - IL-21
DKTHTCPPCPAPEAAGGPSVFLFPPKPKDTLMISRTPEVTCVVVDVSHEDPEVKFNWYVDGVEVHNAKTK

PREEQYASTYRVVSVLTVLHQDWLNGKEYKCKVSNKALPAPIEKTISKAKGQPREPQVYTLPPCRDELTK

NQVSLWCLVKGFYPSDIAVEWESNGQPENNYKTTPPVLDSDGSFFLYSKLTVDKSRWQQGNVFSCSVMHE

ALHNHYTQKSLSLSPGA(GGGGS)ₙQGQDRHMIRMRQLIDIVDQLKNYVNDLVPEFLPAPEDVETNCEWSA

FSCFQKAQLKSANTGNNERIINVSIKKLKRKPPSTNAGRRQKHRLTCPSCDSYEKKPPKEFLERFKSLLQ

KMIHQHLSSRTHGSEDS; wherein n = 0, 1, 2, 3, 4, or 5.

SEQ ID NO: 37 - Fc with knobs mutations - IL-21 mutein
DKTHTCPPCPAPEAAGGPSVFLFPPKPKDTLMISRTPEVTCVVVDVSHEDPEVKFNWYVDGVEVHNAKTK

PREEQYASTYRVVSVLTVLHQDWLNGKEYKCKVSNKALPAPIEKTISKAKGQPREPQVYTLPPCRDELTK

NQVSLWCLVKGFYPSDIAVEWESNGQPENNYKTTPPVLDSDGSFFLYSKLTVDKSRWQQGNVFSCSVMHE

ALHNHYTQKSLSLSPGA(GGGGS)ₙQGQDRHMIRMRQLIDIVDKLKNYVNDLVPEFLPAPEDVETNCEWSA

SEQUENCES

FSCFQKAQLKSANTGNNERIINVSIKKLKRKPPSTNAGRRQKHRLTCPSCDSYEKKPPKEFLRRFKSLLQ
KMIHQHLSSRTHGSEDS; wherein n = 0, 1, 2, 3, 4, or 5.

SEQ ID NO: 38 - Fc with holes mutations - IL-21 Receptor ECD
DKTHTCPPCPAPEAAGGPSVFLFPPKPKDTLMISRTPEVTCVVVDVSHEDPEVKFNWYVDGVEVHNAKTK
PREEQYNSTYRVVSVLTVLHQDWLNGKEYKCKVSNKALPAPIEKTISKAKGQPREPQVCTLPPSRDELTK
NQVSLSCAVKGFYPSDIAVEWESNGQPENNYKTTPPVLDSDGSFFLVSKLTVDKSRWQQGNVFSCSVMHE
ALHNHYTQKSLSLSPGAGGGGSGGGGSGPLGVRGGGGSCPDLVCYTDYLQTVICILEMWNLHPSTLTLTW
QDQYEELKDEATSCSLHRSAHNATHATYTCHMDVFHFMADDIFSVNITDQSGNYSQECGSFLLAESIKPA
PPFNVTVTFSGQYNISWRSDYEDPAFYMLKGKLQYELQYRNRGDPWAVSPRRKLISVDSRSVSLLPLEFR
KDSSYELQVRAGPMPGSSYQGTWSEWSDPVIFQTQSEELKE SEQ ID NO: 39 - IL-21 - Fc with knobs mutations
QGQDRHMIRMRQLIDIVDQLKNYVNDLVPEFLPAPEDVETNCEWSAFSCFQKAQLKSANTGNNERIIINVS
IKKLKRKPPSTNAGRRQKHRLTCPSCDSYEKKPPKEFLERFKSLLQKMIHQHLSSRTHGSEDS(GGGGS)$_n$
DKTHTCPPCPAPELLGGPSVFLFPPKPKDTLMISRTPEVTCVVVDVSHEDPEVKFNWYVDGVEVHNAKTK
PREEQYASTYRVVSVLTVLHQDWLNGKEYKCKVSNKALPAPIEKTISKAKGQPREPQVYTLPPCRDELTK
NQVSLWCLVKGFYPSDIAVEWESNGQPENNYKTTPPVLDSDGSFFLYSKLTVDKSRWQQGNVFSCSVMHE
ALHNHYTQKSLSLSPGK; wherein n = 0, 1, 2, 3, 4, or 5.

SEQ ID NO: 40 - IL-2 mutein - Fc with knobs mutations
QGQDRHMIRMRQLIDIVDKLKNYVNDLVPEFLPAPEDVETNCEWSAFSCFQKAQLKSANTGNNERIIINVS
IKKLKRKPPSTNAGRRQKHRLTCPSCDSYEKKPPKEFLRRFKSLLQKMIHQHLSSRTHGSEDS(GGGGS)$_n$
DKTHTCPPCPAPELLGGPSVFLFPPKPKDTLMISRTPEVTCVVVDVSHEDPEVKFNWYVDGVEVHNAKTK
PREEQYASTYRVVSVLTVLHQDWLNGKEYKCKVSNKALPAPIEKTISKAKGQPREPQVYTLPPCRDELTK
NQVSLWCLVKGFYPSDIAVEWESNGQPENNYKTTPPVLDSDGSFFLYSKLTVDKSRWQQGNVFSCSVMHE
ALHNHYTQKSLSLSPGK; wherein n = 0, 1, 2, 3, 4, or 5.

SEQ ID NO: 41 - IL-21Rα ECD - Fc with holes mutations
CPDLVCYTDY LQTVICILEM WNLHPSTLTL TWQDQYEELK DEATSCSLHR SAHNATHATY
TCHMDVFHFM ADDIFSVNIT DQSGNYSQEC GSFLLAESIK PAPPFNVTVT FSGQYNISWR
SDYEDPAFYM LKGKLQYELQ YRNRGDPWAV SPRRKLISVD SRSVSLLPLE FRKDSSYELQ
VRAGPMPGSS YQGTWSEWSD PVIFQTQSEE LKEGGGGSGG GGSGPLGVRG GGGSDKTHTC
PPCPAPELLG GPSVFLFPPK PKDTLMISRT PEVTCVVVDV SHEDPEVKFN WYVDGVEVHN
AKTKPREEQY NSTYRVVSVL TVLHQDWLNG KEYKCKVSNK ALPAPIEKTI SKAKGQPREP
QVCTLPPSRD ELTKNQVSLS CAVKGFYPSD IAVEWESNGQ PENNYKTTPP VLDSDGSFFL
VSKLTVDKSR WQQGNVFSCS VMHEALHNHY TQKSLSLSPG K SEQ ID NO: 42 - IL-15-Sushi - Fc with knobs mutations - IL-21
NWVNVISDLKKIEDLIQSMHIDATLYTESDVHPSCKVTAMKCFLLELQVISLESGDASIHDTVENLIILA
NNSLSSNGNVTESGCKECEELEEKNIKEFLQSFVHIVQMFINT (GGGGS)$_{n1}$
ITCPPPMSVEHADIWVKSYSLYSRERYICNSGFKRKAGTSSLTECVLNKATNVAHWTTPSLKCIRDPALV
HQRPA(GGGGS)$_{n2}$DKTHTCPPCPAPEAAGGPSVFLFPPKPKDTLMISRTPEVTCVVVDVSHEDPEVKFNW
YVDGVEVHNAKTKPREEQYASTYRVVSVLTVLHQDWLNGKEYKCKVSNKALPAPIEKTISKAKGQPREPQ
VYTLPPCRDELTKNQVSLWCLVKGFYPSDIAVEWESNGQPENNYKTTPPVLDSDGSFFLYSKLTVDKSRW
QQGNVFSCSVMHEALHNHYTQKSLSLSPGA(GGGGS)$_{n3}$QGQDRHMIRMRQLIDIVDQLKNYVNDLVPEFL PAPEDVETNCEWSAFSCFQKAQLKSANTGNNERIINVSIKKLKRKPPSTNAGRRQKHRLTCPSCDSYEKK
PPKEFLERFKSLLQKMIHQHLSSRTHGSEDS; wherein n1 = 0, 1, 2, 3, 4, or 5; n2 = 0, 1, 2, 3, 4, or 5; and n3 = 0, 1, 2, 3, 4, or 5.

SEQ ID NO: 43 - IL-2 analog - Fc with knobs mutations - IL-21 mutein
APASSSTKKTQLQLEHLLLDLQMILNGINNYKNPKLTSMLTKKFAMPKKATELKHLQCLEEALKPLEEVL
NLTQSKNFHLRPRDLISNINVIVLELKGSETTFMCEYADETATIVEFLNRWITFSQSIISTLT
(GGGGS)$_{n1}$DKTHTCPPCPAPEAAGGPSVFLFPPKPKDTLMISRTPEVTCVVVDVSHEDPEVKFNWYVDGV
EVHNAKTKPREEQYASTYRVVSVLTVLHQDWLNGKEYKCKVSNKALPAPIEKTISKAKGQPREPQVYTLP
PCRDELTKNQVSLWCLVKGFYPSDIAVEWESNGQPENNYKTTPPVLDSDGSFFLYSKLTVDKSRWQQGNV
FSCSVMHEALHNHYTQKSLSLSPGA(GGGGS)$_{n2}$QGQDRHMIRMRQLIDIVDKLKNYVNDLVPEFLPAPED
VETNCEWSAFSCFQKAQLKSANTGNNERIINVSIKKLKRKPPSTNAGRRQKHRLTCPSCDSYEKKPPKEF
LRRFKSLLQKMIHQHLSSRTHGSEDS; wherein n1 = 0, 1, 2, 3, 4, or 5; and n2 = 0, 1, 2, 3, 4, or 5.

SEQ ID NO: 44 - IL-2Rβ ECD - Fc with holes mutations - IL-21Rα ECD
AVNGTSQFTCFYNSRANISCVWSQDGALQDTSCQVHAWPDRRRWNQTCELLPVSQASWACNLILGAPDSQ
KLTTVDIVTLRVLCREGVRWRVMAIQDFKPFENLRLMAPISLQVVHVETHRCNISWEISQASHYFERHLE
FEARTLSPGHTWEEAPLLTLKQKQEWICLETLTPDTQYEFQVRVKPLQGEFTTWSPWSQPLAFRTKPAAL
GKDTGGGGSGGGGSGPLGVRGGGGSDKTHTCPPCPAPEAAGGPSVFLFPPKPKDTLMISRTPEVTCVVVD
VSHEDPEVKFNWYVDGVEVHNAKTKPREEQYNSTYRVVSVLTVLHQDWLNGKEYKCKVSNKALPAPIEKT
ISKAKGQPREPQVCTLPPSRDELTKNQVSLSCAVKGFYPSDIAVEWESNGQPENNYKTTPPVLDSDGSFF
LVSKLTVDKSRWQQGNVFSCSVMHEALHNHYTQKSLSLSPGAGGGGSGGGGSGPLGVRGGGGSCPDLVCY
TDY LQTVICILEM WNLHPSTLTL TWQDQYEELK DEATSCSLHR SAHNATHATY TCHMDVFHFM
ADDIFSVNIT DQSGNYSQEC GSFLLAESIK PAPPFNVTVT FSGQYNISWR SDYEDPAFYM
LKGKLQYELQ YRNRGDPWAV SPRRKLISVD SRSVSLLPLE FRKDSSYELQ VRAGPMPGSS
YQGTWSEWSD PVIFQTQSEE LKE SEQ ID NO: 45 - IL-21 - Fc with knobs mutations - Sushi-IL-15
QGQDRHMIRM RQLIDIVDQL KNYVNDLVPE FLPAPEDVET NCEWSAFSCF QKAQLKSANT
GNNERIINVS IKKLKRKPPS TNAGRRQKHR LTCPSCDSYE KKPPKEFLER FKSLLQKMIH
QHLSSRTHGSEDS(GGGGS)$_{n1}$DKTHTCPPCPAPELLGGPSVFLFPPKPKDTLMISRTPEVTCVVVDVSHED
PEVKFNWYVDGVEVHNAKTKPREEQYASTYRVVSVLTVLHQDWLNGKEYKCKVSNKALPAPIEKTISKAK
GQPREPQVYTLPPCRDELTKNQVSLWCLVKGFYPSDIAVEWESNGQPENNYKTTPPVLDSDGSFFLYSKL
TVDKSRWQQGNVFSCSVMHEALHNHYTQKSLSLSPGA(GGGGS)$_{n2}$ITCPPPMSVE HADIWVKSYS
LYSRERYICNSGFKRKAGTSSLTECVLNKATNVAHWTTPSLKCIRDPALVHQRPA(GGGGS)$_{n3}$NWVNVIS
DLKKIEDLIQSMHIDATLYTESDVHPSCKVTAMKCFLLELQVISLESGDASIHDTVENLIILANNSLSSN
GNVTESGCKECEELEEKNIKEFLQSFVHIVQMFINT; wherein n1 = 0, 1, 2, 3, 4, or 5; n2 = 0, 1, 2, 3, 4, or 5; and n3 = 0, 1, 2, 3, 4, or 5.

SEQ ID NO: 46 - IL-21 mutein - Fc with knobs mutations - IL-2 analog
QGQDRHMIRM RQLIDIVDKL KNYVNDLVPE FLPAPEDVET NCEWSAFSCF QKAQLKSANT
GNNERIINVS IKKLKRKPPS TNAGRRQKHR LTCPSCDSYE KKPPKEFLRR FKSLLQKMIH
QHLSSRTHGSEDS(GGGGS)$_{n1}$DKTHTCPPCPAPELLGGPSVFLFPPKPKDTLMISRTPEVTCVVVDVSHE
DPEVKFNWYVDGVEVHNAKTKPREEQYASTYRVVSVLTVLHQDWLNGKEYKCKVSNKALPAPIEKTISKA -continued

SEQUENCES

KGQPREPQVYTLPPCRDELTKNQVSLWCLVKGFYPSDIAVEWESNGQPENNYKTTPPVLDSDGSFFLYSK

LTVDKSRWQQGNVFSCSVMHEALHNHYTQKSLSLSPGA(GGGGS)$_{n2}$APASSSTKKTQLQLEHLLLDLQMI

LNGINNYKNPKLTSMLTKKFAMPKKATELKHLQCLEEALKPLEEVLNLTQSKNFHLRPRDLISNINVIVL

ELKGSETTFMCEYADETATIVEFLNRWITFSQSIISTLT; wherein n1 = 0, 1, 2, 3, 4, or 5; and n2 = 0, 1, 2, 3, 4, or 5.

SEQ ID NO: 47 - IL-21Rα ECD - Fc with holes mutations - IL-2Rβ ECD
CPDLVCYTDY LQTVICILEM WNLHPSTLTL TWQDQYEELK DEATSCSLHR SAHNATHATY

TCHMDVFHFM ADDIFSVNIT DQSGNYSQEC GSFLLAESIK PAPPFNVTVT FSGQYNISWR

SDYEDPAFYM LKGKLQYELQ YRNRGDPWAV SPRRKLISVD SRSVSLLPLE FRKDSSYELQ

VRAGPMPGSSYQGTWSEWSDPVIFQTQSEELKEGGGGSGGGGSGPLGVRGGGGSDKTHTCPPCPAPELLG

GPSVFLFPPKPKDTLMISRTPEVTCVVVDVSHEDPEVKFNWYVDGVEVHNAKTKPREEQYNSTYRVVSVL

TVLHQDWLNGKEYKCKVSNKALPAPIEKTISKAKGQPREPQVCTLPPSRDELTKNQVSLSCAVKGFYPSD

IAVEWESNGQPENNYKTTPPVLDSDGSFFLVSKLTVDKSRWQQGNVFSCSVMHEALHNHYTQKSLSLSPG

AGGGGSGGGGSGPLGVRGGGGSAVNGTSQFTCFYNSRANISCVWSQDGALQDTSCQVHAWPDRRRWNQTC

ELLPVSQASWACNLILGAPDSQKLTTVDIVTLRVLCREGVRWRVMAIQDFKPFENLRLMAPISLQVVHVE

THRCNISWEISQASHYFERHLEFEARTLSPGHTWEEAPLLTLKQKQEWICLETLTPDTQYEFQVRVKPLQ

GEFTTWSPWSQPLAFRTKPAALGKDT

SEQ ID NO: 48 - PD1-HC with knob mutations - IL-21
QVQLVESGGGVVQPGRSLRLDCKASGITFSNSGMHWVRQAPGKGLEWVAVIWYDGSKRYYADSVKGRFTI

SRDNSKNTLFLQMNSLRAEDTAVYYCATNDDYWGQGTLVTVSSASTKGPSVFPLAPCSRSTSESTAALGC

LVKDYFPEPVTVSWNSGALTSGVHTFPAVLQSSGLYSLSSVVTVPSSSLGTKTYTCNVDHKPSNTKVDKR

VESKYGPPCPPCPAPEFLGGPSVFLFPPKPKDTLMISRTPEVTCVVVDVSQEDPEVQFNWYVDGVEVHNA

KTKPREEQFNSTYRVVSVLTVLHQDWLNGKEYKCKVSNKGLPSSIEKTISKAKGQPREPQVYTLPPCQEE

MTKNQVSLWCLVKGFYPSDIAVEWESNGQPENNYKTTPPVLDSDGSFFLYSRLTVDKSRWQEGNVFSCSV

MHEALHNHYTQKSLSLSLGAGGGGSGGGGSGGGGSQGQDRHMIRMRQLIDIVDQLKNYVNDLVPEFLPAP

EDVETNCEWSAFSCFQKAQLKSANTGNNERIINVSIKKLKRKPPSTNAGRRQKHRLTCPSCDSYEKKPPK

EFLERFKSLLQKMIHQHLSSRTHGSEDS

SEQ ID NO: 49 - PD1-HC with hole mutations - IL-21Rα ECD
QVQLVESGGGVVQPGRSLRLDCKASGITFSNSGMHWVRQAPGKGLEWVAVIWYDGSKRYYADSVKGRFTI

SRDNSKNTLFLQMNSLRAEDTAVYYCATNDDYWGQGTLVTVSSASTKGPSVFPLAPCSRSTSESTAALGC

LVKDYFPEPVTVSWNSGALTSGVHTFPAVLQSSGLYSLSSVVTVPSSSLGTKTYTCNVDHKPSNTKVDKR

VESKYGPPCPPCPAPEFLGGPSVFLFPPKPKDTLMISRTPEVTCVVVDVSQEDPEVQFNWYVDGVEVHNA

KTKPREEQFNSTYRVVSVLTVLHQDWLNGKEYKCKVSNKGLPSSIEKTISKAKGQPREPQVCTLPPSQEE

MTKNQVSLSCAVKGFYPSDIAVEWESNGQPENNYKTTPPVLDSDGSFFLVSRLTVDKSRWQEGNVFSCSV

MHEALHNHYTQKSLSLSLGAGGGGSGGGGSGPLGVRGGGGSCPDLVCYTDYLQTVICILEMWNLHPSTLT

LTWQDQYEELKDEATSCSLHRSAHNATHATYTCHMDVFHFMADDIFSVNITDQSGNYSQECGSFLLAESI

KPAPPFNVTVTFSGQYNISWRSDYEDPAFYMLKGKLQYELQYRNRGDPWAVSPRRKLISVDSRSVSLLPL

EFRKDSSYELQVRAGPMPGSSYQGTWSEWSDPVIFQTQSEELKE

SEQUENCES

SEQ ID NO: 50 - PD1-LC
EIVLTQSPATLSLSPGERATLSCRASQSVSSYLAWYQQKPGQAPRLLIYDASNRATGIPARFSGSGSGTD
FTLTISSLEPEDFAVYYCQQSSNWPRTFGQGTKVEIKRTVAAPSVFIFPPSDEQLKSGTASVVCLLNNFY
PREAKVQWKVDNALQSGNSQESVTEQDSKDSTYSLSSTLTLSKADYEKHKVYACEVTHQGLSSPVTKSFN
RGEC

SEQ ID NO: 51 - PD1-LC - IL-2 basal
EIVLTQSPATLSLSPGERATLSCRASQSVSSYLAWYQQKPGQAPRLLIYDASNRATGIPARFSGSGSGTD
FTLTISSLEPEDFAVYYCQQSSNWPRTFGQGTKVEIKRTVAAPSVFIFPPSDEQLKSGTASVVCLLNNFY
PREAKVQWKVDNALQSGNSQESVTEQDSKDSTYSLSSTLTLSKADYEKHKVYACEVTHQGLSSPVTKSFN
RGECGGGGSGGGGSGGGGSAPASSSTKKTQLQLEHLLLDLQMILNGINNYKNPKLTSMLTAKFAMPKKAT
ELKHLQCLEEALKPLEEVLNLAQSKNFHLRPRDLIS$X_{aa88}$INVIVLELKGSETTFMCEYADETATIVEFLN
RWITFS$X_{aa126}$SIISTLT; wherein $X_{aa88}$ is amino acid selected from N and A,
and $X_{aa126}$ is an amino acid selected from Q, H, W or A.

SEQ ID NO: 52 - trastuzumab light chain
DIQMTQSPSSLSASVGDRVTITCRASQDVNTAVAWYQQKPGKAPKLLIYSASFLYSGVPSRFSGSRSGTD
FTLTISSLQPEDFATYYCQQHYTTPPTFGQGTKVEIKRTVAAPSVFIFPPSDEQLKSGTASVVCLLNNFY
PREAKVQWKVDNALQSGNSQESVTEQDSKDSTYSLSSTLTLSKADYEKHKVYACEVTHQGLSSPVTKSFN
RGEC SEQ ID NO: 53 - trastuzumab heavy chain
EVQLVESGGGLVQPGGSLRLSCAASGFNIKDTYIHWVRQAPGKGLEWVARIYPTNGYTRYADSVKGRFTI
SADTSKNTAYLQMNSLRAEDTAVYYCSRWGGDGFYAMDYWGQGTLVTVSSASTKGPSVFPLAPSSKSTSG
GTAALGCLVKDYFPEPVTVSWNSGALTSGVHTFPAVLQSSGLYSLSSVVTVPSSSLGTQTYICNVNHKPS
NTKVDKKVEPPKSCDKTHTCPPCPAPELLGGPSVFLFPPKPKDTLMISRTPEVTCVVVDVSHEDPEVKFN
WYVDGVEVHNAKTKPREEQYNSTYRVVSVLTVLHQDWLNGKEYKCKVSNKALPAPIEKTISKAKGQPREP
QVYTLPPSRDELTKNQVSLTCLVKGFYPSDIAVEWESNGQPENNYKTTPPVLDSDGSFFLYSKLTVDKSR
WQQGNVFSCSVMHEALHNHYTQKSLSLSPGK SEQ ID NO: 54 - rituximab light chain
QIVLSQSPAILSASPGEKVTMTCRASSSVSYIHWFQQKPGSSPKPWIYATSNLASGVPVRFSGSGSGTSY
SLTISRVEAEDAATYYCQQWTSNPPTFGGGTKLEIKRTVAAPSVFIFPPSDEQLKSGTASVVCLLNNFYP
REAKVQWKVDNALQSGNSQESVTEQDSKDSTYSLSSTLTLSKADYEKHKVYACEVTHQGLSSPVTKSFNR
GEC SEQ ID NO: 55 - rituximab heavy chain
QVQLQQPGAELVKPGASVKMSCKASGYTFTSYNMHWVKQTPGRGLEWIGAIYPGNGDTSYNQKFKGKATL
TADKSSSTAYMQLSSLTSEDSAVYYCARSTYYGGDWYFNVWGAGTTVTVSAASTKGPSVFPLAPSSKSTS
GGTAALGCLVKDYFPEPVTVSWNSGALTSGVHTFPAVLQSSGLYSLSSVVTVPSSSLGTQTYICNVNHKP
SNTKVDKKAEPKSCDKTHTCPPCPAPELLGGPSVFLFPPKPKDTLMISRTPEVTCVVVDVSHEDPEVKFN
WYVDGVEVHNAKTKPREEQYNSTYRVVSVLTVLHQDWLNGKEYKCKVSNKALPAPIEKTISKAKGQPREP
QVYTLPPSRDELTKNQVSLTCLVKGFYPSDIAVEWESNGQPENNYKTTPPVLDSDGSFFLYSKLTVDKSR
WQQGNVFSCSVMHEALHNHYTQKSLSLSPGK SEQ ID NO: 56 - brentuximab light chain
DIVLTQSPASLAVSLGQRATISCKASQSVDFDGDSYMNWYQQKPGQPPKVLIYAASNLESGIPARFSGSG
SGTDFTLNIHPVEEEDAATYYCQQSNEDPWTFGGGTKLEIKRTVAAPSVFIFPPSDEQLKSGTASVVCLL

NNFYPREAKVQWKVDNALQSGNSQESVTEQDSKDSTYSLSSTLTLSKADYEKHKVYACEVTHQGLSSPVT

KSFNRGEC

SEQ ID NO: 57 - brentuximab heavy chain
QIQLQQSGPEVVKPGASVKISCKASGYTFTDYYITWVKQKPGQGLEWIGWIYPGSGMTKYNEKFKGKATL

TVDTSSSTAFMQLSSLTSEDTAVYFCANYGNYWFAYWGQGTQVTVSAASTKGPSVFPLAPSSKSTSGGTA

ALGCLVKDYFPEPVTVSWNSGALTSGVHTFPAVLQSSGLYSLSSVVTVPSSSLGTQTYICNVNHKPSNTK

VDKKVEPKSCDKTHTCPPCPAPELLGGPSVFLFPPKPKDTLMISRTPEVTCVVVDVSHEDPEVKFNWYVD

GVEVHNAKTKPREEQYNSTYRVVSVLTVLHQDWLNGKEYKCKVSNKALPAPIEKTISKAKGQPREPQVYT

LPPSRDELTKNQVSLTCLVKGFYPSDIAVEWESNGQPENNYKTTPPVLDSDGSFFLYSKLTVDKSRWQQG

NVFSCSVMHEALHNHYTQKSLSLSPG

SEQ ID NO: 58 - cetuximab light chain
DILLTQSPVILSVSPGERVSFSCRASQSIGTNIHWYQQRTNGSPRLLIKYASESISGIPSRFSGSGSGTD

FTLSINSVESEDIADYYCQQNNNWPTTFGAGTKLELKRTVAAPSVFIFPPSDEQLKSGTASVVCLLNNFY

PREAKVQWKVDNALQSGNSQESVTEQDSKDSTYSLSSTLTLSKADYEKHKVYACEVTHQGLSSPVTKSFN

RGEC

SEQ ID NO: 59 - cetuximab heavy chain
QVQLKQSGPGLVQPSQSLSITCTVSGFSLTNYGVHWVRQSPGKGLEWLGVIWSGGNTDYNTPFTSRLSIN

KDNSKSQVFFKMNSLQSNDTAIYYCARALTYYDYEFAYWGQGTLVTVSAASTKGPSVFPLAPSSKSTSGG

TAALGCLVKDYFPEPVTVSWNSGALTSGVHTFPAVLQSSGLYSLSSVVTVPSSSLGTQTYICNVNHKPSN

TKVDKKVEPKSCDKTHTCPPCPAPELLGGPSVFLFPPKPKDTLMISRTPEVTCVVVDVSHEDPEVKFNWY

VDGVEVHNAKTKPREEQYNSTYRVVSVLTVLHQDWLNGKEYKCKVSNKALPAPIEKTISKAKGQPREPQV

YTLPPSRDELTKNQVSLTCLVKGFYPSDIAVEWESNGQPENNYKTTPPVLDSDGSFFLYSKLTVDKSRWQ

QGNVFSCSVMHEALHNHYTQKSLSLSPGK

SEQ ID NO: 60 - panitumumab light chain
DIQMTQSPSSLSASVGDRVTITCQASQDISNYLNWYQQKPGKAPKLLIYDASNLETGVPSRFSGSGSGTD

FTFTISSLQPEDIATYFCQHFDHLPLAFGGGTKVEIKRTVAAPSVFIFPPSDEQLKSGTASVVCLLNNFY

PREAKVQWKVDNALQSGNSQESVTEQDSKDSTYSLSSTLTLSKADYEKHKVYACEVTHQGLSSPVTKSFN

RGEC

SEQ ID NO: 61 - panitumumab heavy chain
GHIYYSGNTNYNPSLKSRLTISIDTSKTQFSLKLSSVTAADTAIYYCVRDRVTGAFDIWGQGTMVTVSSA

STKGPSVFPLAPCSRSTSESTAALGCLVKDYFPEPVTVSWNSGALTSGVHTFPAVLQSSGLYSLSSVVTV

PSSNFGTQTYTCNVDHKPSNTKVDERKCCVECPAGPSVFLFPPKPKDTLMISRTPEVTCVVVDVSHEDPE

VQFNWYVDGVEVHNAKTKPREEQFNSTFRVVSVLTVVHQDWLNGKEYKCKVSNKGLPAPIEKTISKTKGQ

PREPQVYTLPPSREEMTKNQVSLTCLVKGFYPSDIAVEWESNGQPENNYKTTPPMLDSDGSFFLYSKLTV

DKSRWQQGNVFSCSVMHEALHNHYTQKSLSLSPGK

SEQ ID NO: 62 - anti-c-MET antibody light chain
DIVMTQAAPSVPVTPGESVSISCRSSKSLLHSNGNTYLYWFLQRPGQSPQVLIYRMSNLASGVPDRFSGS

GSGTAFTLRIRRVEAEDVGVYYCMQNLEYPFTFGGGTKLEIKRTVAAPSVFIFPPSDEQLKSGTASVVCL

LNNFYPREAKVQWKVDNALQSGNSQESVTEQDSKDSTYSLSSTLTLSKADYEKHKVYACEVTHQGLSSPV

TKSFNRGEC

| SEQUENCES |
|---|

SEQ ID NO: 63 - anti-c-MET antibody heavy chain
QVQLQQSGPELVKSGASVKMSCKASGNTLKDDHVHWVKQRPGQGLEWIGWIYPGGGRTRYNEKFKGKTTL
TADKPSSTVNMLLSSLTSEDSAIYFCTNLVFDVWGAGTTVTVSSASTKGPSVFPLAPSSKSTSGGTAALG
CLVKDYFPEPVTVSWNSGALTSGVHTFPAVLQSSGLYSLSSVVTVPSSSLGTQTYICNVNHKPSNTKVDK
KVEPKSCDKTHTCPPCPAPELLGGPSVFLFPPKPKDTLMISRTPEVTCVVVDVSHEDPEVKFNWYVDGVE
VHNAKTKPREEQYNSTYRVVSVLTVLHQDWLNGKEYKCKVSNKALPAPIEKTISKAKGQPREPQVYTLPP
SREEMTKNQVSLTCLVKGFYPSDIAVEWESNGQPENNYKTTPPVLDSDGSFFLYSKLTVDKSRWQQGNVF
SCSVMHEALHNHYTQKSLSLSPGK SEQ ID NO: 64 - anti-GPC3 antibody light chain
DVVMTQSPLSLPVTPGEPASISCRSSQSLVHSNANTYLHWYLQKPGQSPQLLIYKVSNRFSGVPDRFSGS
GSGTDFTLKISRVEAEDVGVYYCSQNTHVPPTFGQGTKLEIKRTVAAPSVFIFPPSDEQLKSGTASVVCL
LNNFYPREAKVQWKVDNALQSGNSQESVTEQDSKDSTYSLSSTLTLSKADYEKHKVYACEVTHQGLSSPV
TKSFNRGEC SEQ ID NO: 65 - anti-GPC3 antibody heavy chain
QVQLVQSGAEVKKPGASVKVSCKASGYTFTDYEMHWVRQAPGQGLEWMGALDPKTGDTAYSQKFKGRVTL
TADKSTSTAYMELSSLTSEDTAVYYCTRFYSYTYWGQGTLVTVSSASTKGPSVFPLAPSSKSTSGGTAAL
GCLVKDYFPEPVTVSWNSGALTSGVHTFPAVLQSSGLYSLSSVVTVPSSSLGTQTYICNVNHKPSNTKVD
KKVEPKSCDKTHTCPPCPAPELLGGPSVFLFPPKPKDTLMISRTPEVTCVVVDVSHEDPEVKFNWYVDGV
EVHNAKTKPREEQYNSTYRVVSVLTVLHQDWLNGKEYKCKVSNKALPAPIEKTISKAKGQPREPQVYTLP
PSREEMTKNQVSLTCLVKGFYPSDIAVEWESNGQPENNYKTTPPVLDSDGSFFLYSKLTVDKSRWQQGNV
FSCSVMHEALHNHYTQKSLSLSPGK SEQ ID NO: 66 - anti-Claudin 18.2 antibody light chain
DIVMTQSPSSLTVTAGEKVTMSCKSSQSLLNSGNQKNYLTWYQQKPGQPPKLLIYWASTRESGVPDRFTG
SGSGTDFTLTISSVQAEDLAVYYCQNDYSYPFTFGSGTKLEIKRTVAAPSVFIFPPSDEQLKSGTASVVC
LLNNFYPREAKVQWKVDNALQSGNSQESVTEQDSKDSTYSLSSTLTLSKADYEKHKVYACEVTHQGLSSP
VTKSFNRGEC SEQ ID NO: 67 - anti-Claudin 18.2 antibody heavy chain
QVQLQQPGAELVRPGASVKLSCKASGYTFTSYWINWVKQRPGQGLEWIGNIYPSDSYTNYNQKFKDKATL
TVDKSSSTAYMQLSSPTSEDSAVYYCTRSWRGNSFDYWGQGTTLTVSSASTKGPSVFPLAPSSKSTSGGT
AALGCLVKDYFPEPVTVSWNSGALTSGVHTFPAVLQSSGLYSLSSVVTVPSSSLGTQTYICNVNHKPSNT
KVDKKVEPKSCDKTHTCPPCPAPELLGGPSVFLFPPKPKDTLMISRTPEVTCVVVDVSHEDPEVKFNWYV
DGVEVHNAKTKPREEQYNSTYRVVSVLTVLHQDWLNGKEYKCKVSNKALPAPIEKTISKAKGQPREPQVY
TLPPSRDELTKNQVSLTCLVKGFYPSDIAVEWESNGQPENNYKTTPPVLDSDGSFFLYSKLTVDKSRWQQ
GNVFSCSVMHEALHNHYTQKSLSLSPGK SEQ ID NO: 68 - anti-Trop-2 antibody light chain CDR1
KASQDVSIAVA SEQ ID NO: 69 - anti-Trop-2 antibody light chain CDR2
SASYRYT SEQ ID NO: 70 - anti-Trop-2 antibody light chain CDR3
QQHYITPLT SEQ ID NO: 71 - anti-Trop-2 antibody heavy chain CDR1
NYGMN

| SEQUENCES |
|---|

SEQ ID NO: 72 - anti-Trop-2 antibody heavy chain CDR2
WINTYTGEPTYTDDFKG

SEQ ID NO: 73 - anti-Trop-2 antibody heavy chain CDR3
GGFGSSYWYFDV

SEQ ID NO: 74 - anti-mesothelin antibody light chain CDR1
SASSSVSYMH

SEQ ID NO: 75 - anti-mesothelin antibody light chain CDR2
DTSKLAS

SEQ ID NO: 76 - anti-mesothelin antibody light chain CDR3
QQWSGYPLT

SEQ ID NO: 77 - anti-mesothelin antibody heavy chain CDR1
GYTMN

SEQ ID NO: 78 - anti-mesothelin antibody heavy chain CDR2
LITPYNGASSYNQKFRG

SEQ ID NO: 79 - anti-mesothelin antibody heavy chain CDR3
GGYDGRGFDY

SEQ ID NO: 80 - Anti-FAP version 1 LC
QIVLTQSPATLSLSPGERATLSCSASSGVNFMHWYQQKPGQAPRRLIFDTSKLASGIPARFSGSGSGTDY

TLTISSLEPEDFAVYYCQQWSFNPPTFGQGTKVEIKRTVAAPSVFIFPPSDEQLKSGTASVVCLLNNFYP

REAKVQWKVDNALQSGNSQESVTEQDSKDSTYSLSSTLTLSKADYEKHKVYACEVTHQGLSSPVTKSFNR

GEC

SEQ ID NO: 81 -Anti-FAP LC version 2
QIVLTQSPATLSLSPGERATLSCSASSGVNFMHWYQQKPGQAPKRLIFDTSKLASGVPARFSGSGSGTDY

TLTISSLEPEDFAVYYCQQWSFNPPTFGQGTKVEIKRTVAAPSVFIFPPSDEQLKSGTASVVCLLNNFYP

REAKVQWKVDNALQSGNSQESVTEQDSKDSTYSLSSTLTLSKADYEKHKVYACEVTHQGLSSPVTKSFNR

GEC

SEQ ID NO: 82 - Anti-FAP VH
QVQLVQSGAEVKKPGASVKVSCKASGYTFTNNGINWLRQAPGQGLEWMGEIYPRSTNTLYAQKFQGRVTI

TADRSSNTAYMELSSLRSEDTAVYFCARTLTAPFAFWGQGTLVTVSSASTKGPSVFPLAPSSKSTSGGTA

ALGCLVKDYFPEPVTVSWNSGALTSGVHTFPAVLQSSGLYSLSSVVTVPSSSLGTQTYICNVNHKPSNTK

VDKKVEPKSCDKTHTCPPCPAPELLGGPSVFLFPPKPKDTLMISRTPEVTCVVVDVSHEDPEVKFNWYVD

GVEVHNAKTKPREEQYNSTYRVVSVLTVLHQDWLNGKEYKCKVSNKALPAPIEKTISKAKGQPREPQVYT

LPPSRDELTKNQVSLTCLVKGFYPSDIAVEWESNGQPENNYKTTPPVLDSDGSFFLYSKLTVDKSRWQQG

NVFSCSVMHEALHNHYTQKSLSLSPGK

SEQ ID NO: 83 - Humanized Light Chain variable domain of FAPalpha
antibody BIBH1
DIVMTQSPDS LAVSLGERAT INCKSSQSLL YSRNQKNYLA WYQQKPGQPP KLLIFWASTR

ESGVPDRFSG SGFGTDFTLT ISSLQAEDVA VYYCQQYFSY PLTFGQGTKV EIK

SEQ ID NO: 84 - Humanized Heavy Chain variable domain FAPalpha
antibody BIBH1
QVQLVQSGAE VKKPGASVK VSCKTSRYTFT EYTIHWVRQA PGQRLEWIGG INPNNGIPNY

NQKFKGRVTI TVDTSASTAY MELSSLRSED TAVYYCARRR IAYGYDEGHA MDYWGQGTLV TVSS

SEQ ID NO: 85 - Humanized H8 anti-5T4 version 1 VH
QVQLVQSGAEVKKPGASVKVSCKASGYSFTGYYMHWVKQSPGQGLEWIGRINPNNGV

TLYNQKFKDRVTMTRDTSISTAYMELSRLRSDDTAVYYCARSTMITNYVMDYWGQGT

LWTVSS

| SEQUENCES |
| --- |
| SEQ ID NO: 86 - Humanized H8 anti-5T4 VH version 2<br>QVQLVQSGAEVKKPGASVKVSCKASGYSFTGYYMHWVRQAPGQGLEWMGRINPNNGVTLYNQKFKDRVTM<br><br>TRDTSISTAYMELSRLRSDDTAVYYCARSTMITNYVMDYWGQGTLVTVSS<br><br>SEQ ID NO:87 - Humanized H8 anti-5T4 version 1 VL<br>DIVMTQSPDSLAVSLGERATINCKASQSVSNDVAWYQQKPGQSPKLLISYTSSRYAG<br><br>VPDRFSGSGSGTDFTLTISSLQAEDVAVYFCQQDYNSPPTFGGGTKLEIK<br><br>SEQ ID NO: 88 - Humanized H8 anti-5T4 VL version 2<br>DIVMTQSPDSLAVSLGERATINCKASQSVSNDVAWYQQKPGQPPKLLIYYTSSRYAG<br><br>VPDRFSGSGSGTDFTLTISSLQAEDVAVYYCQQDYNSPPTFGGGTKLEIK<br><br>SEQ ID NO: 89 - Anti-PDL1 atezolizumab LC<br>DIQMTQSPSSLSASVGDRVTITCRASQDVSTAVAWYQQKPGKAPKLLIYSASFLYSGVPS<br><br>RFSGSGSGTDFTLTISSLQPEDFATYYCQQYLYHPATFGQGTKVEIKRTVAAPSVFIFPP<br><br>SDEQLKSGTASVVCLLNNFYPREAKVQWKVDNALQSGNSQESVTEQDSKDSTYSLSSTLTLSKADYEKHK<br><br>VYACEVTHQGLSSPVTKSFNRGEC<br><br>SEQ ID NO: 90 - Anti-PDL1 atezolizumab HC<br>EVQLVESGGGLVQPGGSLRLSCAASGFTFSDSWIHWVRQAPGKGLEWVAWISPYGGSTYYADSVKGRFTI<br><br>SADTSKNTAYLQMNSLRAEDTAVYYCARRHWPGGFDYWGQGTLVTVSSASTKGPSVFPLAPSSKSTSGGT<br><br>AALGCLVKDYFPEPVTVSWNSGALTSGVHTFPAVLQSSGLYSLSSVVTVPSSSLGTQTYICNVNHKPSNT<br><br>KVDKKVEPKSCDKTHTCPPCPAPELLGGPSVFLFPPKPKDTLMISRTPEVTCVVVDVSHEDPEVKFNWYV<br><br>DGVEVHNAKTKPREEQYASTYRVVSVLTVLHQDWLNGKEYKCKVSNKALPAPIEKTISKAKGQPREPQVY<br><br>TLPPSREEMTKNQVSLTCLVKGFYPSDIAVEWESNGQPENNYKTTPPVLDSDGSFFLYSKLTVDKSRWQQ<br><br>GNVFSCSVMHEALHNHYTQKSLSLSPGK<br><br>SEQ ID NO: 91 - Anti-PD-1 Nivolumab HC<br>QVQLVESGGGVVQPGRSLRLDCKASGITFSNSGMHWVRQAPGKGLEWVAVIWYDGSKRYYADSVKGRFTI<br><br>SRDNSKNTLFLQMNSLRAEDTAVYYCATNDDYWGQGTLVTVSSASTKGPSVFPLAPCSRSTSESTAALGC<br><br>LVKDYFPEPVTVSWNSGALTSGVHTFPAVLQSSGLYSLSSVVTVPSSSLGTKTYTCNVDHKPSNTKVDKR<br><br>VESKYGPPCPPCPAPEFLGGPSVFLFPPKPKDTLMISRTPEVTCVVVDVSQEDPEVQFNWYVDGVEVHNA<br><br>KTKPREEQFNSTYRVVSVLTVLHQDWLNGKEYKCKVSNKGLPSSIEKTISKAKGQPREPQVYTLPPSQEE<br><br>MTKNQVSLTCLVKGFYPSDIAVEWESNGQPENNYKTTPPVLDSDGSFFLYSRLTVDKSRWQEGNVFSCSV<br><br>MHEALHNHYTQKSLSLSLGK<br><br>SEQ ID NO: 92 - Anti-PD-1 Pembrolizumab LC<br>EIVLTQSPATLSLSPGERATLSCRASKGVSTSGYSYLHWYQQKPGQAPRLLIYLASYLESGVPARFSGSG<br><br>SGTDFTLTISSLEPEDFAVYYCQHSRDLPLTFGGGTKVEIKRTVAAPSVFIFPPSDEQLKSGTASVVCLL<br><br>NNFYPREAKVQWKVDNALQSGNSQESVTEQDSKDSTYSLSSTLTLSKADYEKHKVYACEVTHQGLSSPVT<br><br>KSFNRGEC<br><br>SEQ ID NO: 93 - Anti-PD-1 Pembrolizumab HC<br>QVQLVQSGVEVKKPGASVKVSCKASGYTFTNYYMYWVRQAPGQGLEWMGGINPSNGGTNFNEKFKNRVTL<br><br>TTDSSTTTAYMELKSLQFDDTAVYYCARRDYRFDMGFDYWGQGTTVTVSSASTKGPSVFPLAPCSRSTSE<br><br>STAALGCLVKDYFPEPVTVSWNSGALTSGVHTFPAVLQSSGLYSLSSVVTVPSSSLGTKTYTCNVDHKPS<br><br>NTKVDKRVESKYGPPCPPCPAPEFLGGPSVFLFPPKPKDTLMISRTPEVTCVVVDVSQEDPEVQFNWYVD<br><br>GVEVHNAKTKPREEQFNSTYRVVSVLTVLHQDWLNGKEYKCKVSNKGLPSSIEKTISKAKGQPREPQVYT<br><br>LPPSQEEMTKNQVSLTCLVKGFYPSDIAVEWESNGQPENNYKTTPPVLDSDGSFFLYSRLTVDKSRWQEG<br><br>NVFSCSVMHEALHNHYTQKSLSLSLGK |

-continued

| SEQUENCES |
|---|

SEQ ID NO: 94 - Fc with knobs mutations - IL-21
DKTHTCPPCPAPELLGGPSVFLFPPKPKDTLMISRTPEVTCVVVDVSHEDPEVKFNWYVDGVEVHNAKTK

PREEQYASTYRVVSVLTVLHQDWLNGKEYKCKVSNKALPAPIEKTISKAKGQPREPQVYTLPPCRDELTK

NQVSLWCLVKGFYPSDIAVEWESNGQPENNYKTTPPVLDSDGSFFLYSKLTVDKSRWQQGNVFSCSVMHE

ALHNHYTQKSLSLSPGAGGGGSGGGGSGGGGSQGQDRHMIRMRQLIDIVDQLKNYVNDLVPEFLPAPEDV

ETNCEWSAFSCFQKAQLKSANTGNNERIINVSIKKLKRKPPSTNAGRRQKHRLTCPSCDSYEKKPPKEFL

ERFKSLLQKMIHQHLSSRTHGSEDS

SEQ ID NO: 95 - Fc with knob mutations - IL-21 mutein Q19K/E109R
DKTHTCPPCPAPELLGGPSVFLFPPKPKDTLMISRTPEVTCVVVDVSHEDPEVKFNWYVDGVEVHNAKTK

PREEQYASTYRVVSVLTVLHQDWLNGKEYKCKVSNKALPAPIEKTISKAKGQPREPQVYTLPPCRDELTK

NQVSLWCLVKGFYPSDIAVEWESNGQPENNYKTTPPVLDSDGSFFLYSKLTVDKERWQQGNVFSCSVMHE

ALHNHYTQKSLSLSPGAGGGGSGGGGSGGGGSQGQDRHMIRMRQLIDIVDKLKNYVNDLVPEFLPAPEDV

ETNCEWSAFSCFQKAQLKSANTGNNERIINVSIKKLKRKPPSTNAGRRQKHRLTCPSCDSYEKKPPKEFL

RRFKSLLQKMIHQHLSSRTHGSEDS

SEQ ID NO: 96 - IgG1 Fc with holes mutations
DKTHTCPPCPAPEAAGGPSVFLFPPKPKDTLMISRTPEVTCVVVDVSHEDPEVKFNWYVDGVEVHNAKTK

PREEQYNSTYRVVSVLTVLHQDWLNGKEYKCKVSNKALPAPIEKTISKAKGQPREPQVCTLPPSRDELTK

NQVSLSCAVKGFYPSDIAVEWESNGQPENNYKTTPPVLDSDGEFFLVSKLTVDKSRWQQGNVFSCSVMHE

ALHNHYTQKSLSLSPGK

SEQ ID NO: 97 - Peptide linker
(GGGGS)$_n$, wherein n = 1, 2, 3, and 4

| SEQUENCE LISTING |
|---|

<160> NUMBER OF SEQ ID NOS: 97

<210> SEQ ID NO 1
<211> LENGTH: 133
<212> TYPE: PRT
<213> ORGANISM: Homo sapiens

<400> SEQUENCE: 1

Gln Gly Gln Asp Arg His Met Ile Arg Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Arg Lys Pro Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu Ser Ser Arg Thr His

Gly Ser Glu Asp Ser
    130

<210> SEQ ID NO 2
<211> LENGTH: 133
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 2

Gln Gly Gln Asp Arg His Met Ile Arg Met Arg Gln Leu Ile Asp Ile
1               5                   10                  15

Val Ala Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Arg Lys Pro Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu Ser Ser Arg Thr His
        115                 120                 125

Gly Ser Glu Asp Ser
    130

<210> SEQ ID NO 3
<211> LENGTH: 133
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 3

Gln Gly Gln Asp Arg His Met Ile Arg Met Arg Gln Leu Ile Asp Ile
1               5                   10                  15

Val Lys Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Arg Lys Pro Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu Ser Ser Arg Thr His
        115                 120                 125

Gly Ser Glu Asp Ser
    130

<210> SEQ ID NO 4
<211> LENGTH: 133
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 4

Gln Gly Gln Asp Arg His Met Ile Arg Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Arg Lys Pro Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Arg Arg Phe Lys
            100                 105                 110

Ser Leu Leu Gln Lys Met Ile His Gln His Leu Ser Ser Arg Thr His
        115                 120                 125

Gly Ser Glu Asp Ser
    130

<210> SEQ ID NO 5
<211> LENGTH: 133
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 5

Gln Gly Gln Asp Arg His Met Ile Arg Met Arg Gln Leu Ile Asp Ile
1               5                   10                  15

Val Asp Lys Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Arg Lys Pro Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Arg Arg Phe Lys
            100                 105                 110

Ser Leu Leu Gln Lys Met Ile His Gln His Leu Ser Ser Arg Thr His
        115                 120                 125

Gly Ser Glu Asp Ser
    130

<210> SEQ ID NO 6
<211> LENGTH: 213
<212> TYPE: PRT
<213> ORGANISM: Homo sapiens

<400> SEQUENCE: 6

Cys Pro Asp Leu Val Cys Tyr Thr Asp Tyr Leu Gln Thr Val Ile Cys
1               5                   10                  15

Ile Leu Glu Met Trp Asn Leu His Pro Ser Thr Leu Thr Leu Thr Trp
            20                  25                  30

Gln Asp Gln Tyr Glu Glu Leu Lys Asp Glu Ala Thr Ser Cys Ser Leu
        35                  40                  45

His Arg Ser Ala His Asn Ala Thr His Ala Thr Tyr Thr Cys His Met
    50                  55                  60

Asp Val Phe His Phe Met Ala Asp Asp Ile Phe Ser Val Asn Ile Thr
65                  70                  75                  80

Asp Gln Ser Gly Asn Tyr Ser Gln Glu Cys Gly Ser Phe Leu Leu Ala
                85                  90                  95

Glu Ser Ile Lys Pro Ala Pro Pro Phe Asn Val Thr Val Thr Phe Ser
            100                 105                 110

Gly Gln Tyr Asn Ile Ser Trp Arg Ser Asp Tyr Glu Asp Pro Ala Phe
        115                 120                 125

Tyr Met Leu Lys Gly Lys Leu Gln Tyr Glu Leu Gln Tyr Arg Asn Arg
    130                 135                 140

Gly Asp Pro Trp Ala Val Ser Pro Arg Arg Lys Leu Ile Ser Val Asp
145                 150                 155                 160

Ser Arg Ser Val Ser Leu Leu Pro Leu Glu Phe Arg Lys Asp Ser Ser
                165                 170                 175

Tyr Glu Leu Gln Val Arg Ala Gly Pro Met Pro Gly Ser Ser Tyr Gln
            180                 185                 190

Gly Thr Trp Ser Glu Trp Ser Asp Pro Val Ile Phe Gln Thr Gln Ser
        195                 200                 205

Glu Glu Leu Lys Glu
    210

<210> SEQ ID NO 7
<211> LENGTH: 240
<212> TYPE: PRT
<213> ORGANISM: Homo sapiens

<400> SEQUENCE: 7

Leu Asn Thr Thr Ile Leu Thr Pro Asn Gly Asn Glu Asp Thr Thr Ala
1               5                   10                  15

Asp Phe Phe Leu Thr Thr Met Pro Thr Asp Ser Leu Ser Val Ser Thr
            20                  25                  30

Leu Pro Leu Pro Glu Val Gln Cys Phe Val Phe Asn Val Glu Tyr Met
        35                  40                  45

Asn Cys Thr Trp Asn Ser Ser Ser Glu Pro Gln Pro Thr Asn Leu Thr
    50                  55                  60

Leu His Tyr Trp Tyr Lys Asn Ser Asp Asn Asp Lys Val Gln Lys Cys
65                  70                  75                  80

Ser His Tyr Leu Phe Ser Glu Glu Ile Thr Ser Gly Cys Gln Leu Gln
                85                  90                  95

```
Lys Lys Glu Ile His Leu Tyr Gln Thr Phe Val Val Gln Leu Gln Asp
                100                 105                 110

Pro Arg Glu Pro Arg Arg Gln Ala Thr Gln Met Leu Lys Leu Gln Asn
            115                 120                 125

Leu Val Ile Pro Trp Ala Pro Glu Asn Leu Thr Leu His Lys Leu Ser
        130                 135                 140

Glu Ser Gln Leu Glu Leu Asn Trp Asn Asn Arg Phe Leu Asn His Cys
145                 150                 155                 160

Leu Glu His Leu Val Gln Tyr Arg Thr Asp Trp Asp His Ser Trp Thr
                165                 170                 175

Glu Gln Ser Val Asp Tyr Arg His Lys Phe Ser Leu Pro Ser Val Asp
            180                 185                 190

Gly Gln Lys Arg Tyr Thr Phe Arg Val Arg Ser Arg Phe Asn Pro Leu
        195                 200                 205

Cys Gly Ser Ala Gln His Trp Ser Glu Trp Ser His Pro Ile His Trp
210                 215                 220

Gly Ser Asn Thr Ser Lys Glu Asn Pro Phe Leu Phe Ala Leu Glu Ala
225                 230                 235                 240

<210> SEQ ID NO 8
<211> LENGTH: 133
<212> TYPE: PRT
<213> ORGANISM: Homo sapiens

<400> SEQUENCE: 8

Ala Pro Thr Ser Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Arg Met Leu Thr Phe Lys Phe Tyr Met Pro Lys
            35                  40                  45

Lys Ala Thr Glu Leu Lys His Leu Gln Cys Leu Glu Glu Glu Leu Lys
        50                  55                  60

Pro Leu Glu Glu Val Leu Asn Leu Ala Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
            100                 105                 110

Thr Ile Val Glu Phe Leu Asn Arg Trp Ile Thr Phe Cys Gln Ser Ile
        115                 120                 125

Ile Ser Thr Leu Thr
        130

<210> SEQ ID NO 9
<211> LENGTH: 113
<212> TYPE: PRT
<213> ORGANISM: Homo sapiens

<400> SEQUENCE: 9

Asn Trp Val Asn Val Ile Ser Asp Leu Lys Lys Ile Glu Asp Leu Ile
1               5                   10                  15

Gln Ser Met His Ile Asp Ala Thr Leu Tyr Thr Glu Ser Asp Val His
                20                  25                  30

Pro Ser Cys Lys Val Thr Ala Met Lys Cys Phe Leu Leu Glu Leu Gln
            35                  40                  45
```

```
Val Ile Ser Leu Glu Ser Gly Asp Ala Ser Ile His Asp Thr Val Glu
 50                  55                  60

Asn Leu Ile Ile Leu Ala Asn Asn Ser Leu Ser Ser Asn Gly Asn Val
 65                  70                  75                  80

Thr Glu Ser Gly Cys Lys Glu Cys Glu Glu Leu Glu Glu Lys Asn Ile
                 85                  90                  95

Lys Glu Phe Leu Gln Ser Phe Val His Ile Val Gln Met Phe Ile Asn
            100                 105                 110

Thr

<210> SEQ ID NO 10
<211> LENGTH: 75
<212> TYPE: PRT
<213> ORGANISM: Homo sapiens

<400> SEQUENCE: 10

Ile Thr Cys Pro Pro Met Ser Val Glu His Ala Asp Ile Trp Val
 1               5                  10                  15

Lys Ser Tyr Ser Leu Tyr Ser Arg Glu Arg Tyr Ile Cys Asn Ser Gly
             20                  25                  30

Phe Lys Arg Lys Ala Gly Thr Ser Ser Leu Thr Glu Cys Val Leu Asn
         35                  40                  45

Lys Ala Thr Asn Val Ala His Trp Thr Thr Pro Ser Leu Lys Cys Ile
 50                  55                  60

Arg Asp Pro Ala Leu Val His Gln Arg Pro Ala
 65                  70                  75

<210> SEQ ID NO 11
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 11

Gly Pro Leu Gly Val Arg
 1               5

<210> SEQ ID NO 12
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 12

Pro Leu Gly Met Trp Ser Arg
 1               5

<210> SEQ ID NO 13
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 13
```

Pro Leu Gly Leu Trp Ala Arg
1               5

<210> SEQ ID NO 14
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 14

Pro Gln Gly Ile Ala Gly Gln Arg
1               5

<210> SEQ ID NO 15
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 15

Pro Leu Gly Leu Ala Gly
1               5

<210> SEQ ID NO 16
<211> LENGTH: 6
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 16

Leu Ala Leu Gly Pro Arg
1               5

<210> SEQ ID NO 17
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 17

Gly Gly Pro Leu Gly Met Leu Ser Gln Ser
1               5                   10

<210> SEQ ID NO 18
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 18

Gly Gly Gly Gly Arg Arg Gly Gly Ser
1               5

```
<210> SEQ ID NO 19
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 19

Thr Gly Arg Gly Pro Ser Trp Val
1               5

<210> SEQ ID NO 20
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 20

Ser Ala Arg Gly Pro Ser Arg Trp
1               5

<210> SEQ ID NO 21
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 21

Thr Ala Arg Gly Pro Ser Phe Lys
1               5

<210> SEQ ID NO 22
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 22

Thr Ala Arg Gly Pro Ser Trp
1               5

<210> SEQ ID NO 23
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 23

Gly Gly Trp His Thr Gly Arg Asn
1               5

<210> SEQ ID NO 24
<211> LENGTH: 8
<212> TYPE: PRT
<213> ORGANISM: Artificial Sequence
```

-continued

```
<220> FEATURE:
<221> NAME/KEY: source
<223> OTHER INFORMATION: /note="Description of Artificial Sequence:
      Synthetic peptide"

<400> SEQUENCE: 24

His Thr Gly Arg Ser Gly Ala Leu
1               5

<210> SEQ ID NO 25
<211> LENGTH: 8
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 25

Pro Leu Thr Gly Arg Ser Gly Gly
1               5

<210> SEQ ID NO 26
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 26

Leu Thr Gly Arg Ser Gly Ala
1               5

<210> SEQ ID NO 27
<211> LENGTH: 76
<212> TYPE: PRT
<213> ORGANISM: Homo sapiens

<400> SEQUENCE: 27

Thr Asn Asp Ala Glu Asp Cys Cys Leu Ser Val Thr Gln Lys Pro Ile
1               5                   10                  15

Pro Gly Tyr Ile Val Arg Asn Phe His Tyr Leu Leu Ile Lys Asp Gly
                20                  25                  30

Cys Arg Val Pro Ala Val Val Phe Thr Thr Leu Arg Gly Arg Gln Leu
            35                  40                  45

Cys Ala Pro Pro Asp Gln Pro Trp Val Glu Arg Ile Ile Gln Arg Leu
        50                  55                  60

Gln Arg Thr Ser Ala Lys Met Lys Arg Arg Ser Ser
65                  70                  75

<210> SEQ ID NO 28
<211> LENGTH: 152
<212> TYPE: PRT
<213> ORGANISM: Homo sapiens

<400> SEQUENCE: 28

Asp Cys Asp Ile Glu Gly Lys Asp Gly Lys Gln Tyr Glu Ser Val Leu
1               5                   10                  15

Met Val Ser Ile Asp Gln Leu Leu Asp Ser Met Lys Glu Ile Gly Ser
                20                  25                  30

Asn Cys Leu Asn Asn Glu Phe Asn Phe Phe Lys Arg His Ile Cys Asp
            35                  40                  45
```

```
Ala Asn Lys Glu Gly Met Phe Leu Phe Arg Ala Ala Arg Lys Leu Arg
    50                  55                  60

Gln Phe Leu Lys Met Asn Ser Thr Gly Asp Phe Asp Leu His Leu Leu
65                  70                  75                  80

Lys Val Ser Glu Gly Thr Thr Ile Leu Leu Asn Cys Thr Gly Gln Val
                85                  90                  95

Lys Gly Arg Lys Pro Ala Ala Leu Gly Glu Ala Gln Pro Thr Lys Ser
                100                 105                 110

Leu Glu Glu Asn Lys Ser Leu Lys Gly Gln Lys Lys Leu Asn Asp Leu
            115                 120                 125

Cys Phe Leu Lys Arg Leu Leu Gln Glu Ile Lys Thr Cys Trp Asn Lys
    130                 135                 140

Ile Leu Met Gly Thr Lys Glu His
145                 150

<210> SEQ ID NO 29
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 29

Gly Gly Gly Gly Ser
1               5

<210> SEQ ID NO 30
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 30

Gly Gly Gly Gly Ser Gly Gly Gly Gly Ser
1               5                   10

<210> SEQ ID NO 31
<211> LENGTH: 15
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 31

Gly Gly Gly Gly Ser Gly Gly Gly Gly Ser Gly Gly Gly Gly Ser
1               5                   10                  15

<210> SEQ ID NO 32
<211> LENGTH: 20
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: VARIANT
<222> LOCATION: (10)..(10)
```

```
<223> OTHER INFORMATION: /replace="Asn"
<220> FEATURE:
<221> NAME/KEY: SITE
<222> LOCATION: (1)..(20)
<223> OTHER INFORMATION: /note="Variant residues given in the sequence
      have no preference with respect to those in the annotations
      for variant positions"

<400> SEQUENCE: 32

Gly Gly Gly Gly Ser Gly Gly Gly Ala Gly Gly Gly Gly Ser Gly
1               5                   10                  15

Gly Gly Gly Ser
            20

<210> SEQ ID NO 33
<211> LENGTH: 20
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: VARIANT
<222> LOCATION: (10)..(10)
<223> OTHER INFORMATION: /replace="Ala" or "Asn"
<220> FEATURE:
<221> NAME/KEY: VARIANT
<222> LOCATION: (15)..(15)
<223> OTHER INFORMATION: /replace="Asn"
<220> FEATURE:
<221> NAME/KEY: SITE
<222> LOCATION: (1)..(20)
<223> OTHER INFORMATION: /note="Variant residues given in the sequence
      have no preference with respect to those in the annotations
      for variant positions"

<400> SEQUENCE: 33

Gly Gly Gly Gly Ser Gly Gly Gly Ser Gly Gly Gly Gly Ala Gly
1               5                   10                  15

Gly Gly Gly Ser
            20

<210> SEQ ID NO 34
<211> LENGTH: 227
<212> TYPE: PRT
<213> ORGANISM: Unknown
<220> FEATURE:
<221> NAME/KEY: source
<223> OTHER INFORMATION: /note="Description of Unknown:
      IgG1 Fc sequence"

<400> SEQUENCE: 34

Asp Lys Thr His Thr Cys Pro Pro Cys Pro Ala Pro Glu Leu Leu Gly
1               5                   10                  15

Gly Pro Ser Val Phe Leu Phe Pro Pro Lys Pro Lys Asp Thr Leu Met
                20                  25                  30

Ile Ser Arg Thr Pro Glu Val Thr Cys Val Val Val Asp Val Ser His
            35                  40                  45

Glu Asp Pro Glu Val Lys Phe Asn Trp Tyr Val Asp Gly Val Glu Val
        50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
```

```
            100                 105                 110
Glu Lys Thr Ile Ser Lys Ala Lys Gly Gln Pro Arg Glu Pro Gln Val
            115                 120                 125

Tyr Thr Leu Pro Pro Ser Arg Asp Glu Leu Thr Lys Asn Gln Val Ser
            130                 135                 140

Leu Thr Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
                180                 185                 190

Asp Lys Ser Arg Trp Gln Gln Gly Asn Val Phe Ser Cys Ser Val Met
                195                 200                 205

His Glu Ala Leu His Asn His Tyr Thr Gln Lys Ser Leu Ser Leu Ser
            210                 215                 220

Pro Gly Lys
225

<210> SEQ ID NO 35
<211> LENGTH: 230
<212> TYPE: PRT
<213> ORGANISM: Unknown
<220> FEATURE:
<221> NAME/KEY: source
<223> OTHER INFORMATION: /note="Description of Unknown:
      IgG4 Fc sequence"

<400> SEQUENCE: 35

Ala Glu Ser Lys Tyr Gly Pro Pro Cys Pro Pro Cys Pro Ala Pro Glu
1               5                   10                  15

Ala Ala Gly Gly Pro Ser Val Phe Leu Phe Pro Pro Lys Pro Lys Asp
                20                  25                  30

Thr Leu Met Ile Ser Arg Thr Pro Glu Val Thr Cys Val Val Val Asp
            35                  40                  45

Val Ser Gln Glu Asp Pro Glu Val Gln Phe Asn Trp Tyr Val Asp Gly
50              55                  60

Val Glu Val His Asn Ala Lys Thr Lys Pro Arg Glu Glu Gln Phe Asn
65                  70                  75                  80

Ser Thr Tyr Arg Val Val Ser Val Leu Thr Val Leu His Gln Asp Trp
                85                  90                  95

Leu Asn Gly Lys Glu Tyr Lys Cys Lys Val Ser Asn Lys Gly Leu Pro
            100                 105                 110

Ser Ser Ile Glu Lys Thr Ile Ser Lys Ala Lys Gly Gln Pro Arg Glu
            115                 120                 125

Pro Gln Val Tyr Thr Leu Pro Pro Ser Gln Glu Glu Met Thr Lys Asn
            130                 135                 140

Gln Val Ser Leu Thr Cys Leu Val Lys Gly Phe Tyr Pro Ser Asp Ile
145                 150                 155                 160

Ala Val Glu Trp Glu Ser Asn Gly Gln Pro Glu Asn Asn Tyr Lys Thr
                165                 170                 175

Thr Pro Pro Val Leu Asp Ser Asp Gly Ser Phe Phe Leu Tyr Ser Arg
                180                 185                 190

Leu Thr Val Asp Lys Ser Arg Trp Gln Glu Gly Asn Val Phe Ser Cys
                195                 200                 205

Ser Val Met His Glu Ala Leu His Asn His Tyr Thr Gln Lys Ser Leu
            210                 215                 220
```

```
Ser Leu Ser Leu Gly Lys
225                 230

<210> SEQ ID NO 36
<211> LENGTH: 385
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"
<220> FEATURE:
<221> NAME/KEY: SITE
<222> LOCATION: (228)..(252)
<223> OTHER INFORMATION: /note="This region may encompass 0-5 'Gly Gly
      Gly Gly Ser' repeating units"

<400> SEQUENCE: 36

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Ala Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Cys Arg Asp Glu Leu Thr Lys Asn Gln Val Ser
    130                 135                 140

Leu Trp Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Ala Gly Gly Gly Gly Ser Gly Gly Gly Gly Ser Gly Gly Gly
225                 230                 235                 240

Gly Ser Gly Gly Gly Gly Ser Gly Gly Gly Gly Ser Gln Gly Gln Asp
                245                 250                 255

Arg His Met Ile Arg Met Arg Gln Leu Ile Asp Ile Val Asp Gln Leu
            260                 265                 270

Lys Asn Tyr Val Asn Asp Leu Val Pro Glu Phe Leu Pro Ala Pro Glu
        275                 280                 285

Asp Val Glu Thr Asn Cys Glu Trp Ser Ala Phe Ser Cys Phe Gln Lys
    290                 295                 300

Ala Gln Leu Lys Ser Ala Asn Thr Gly Asn Asn Glu Arg Ile Ile Asn
```

```
305                 310                 315                 320
Val Ser Ile Lys Lys Leu Lys Arg Lys Pro Ser Thr Asn Ala Gly
            325                 330                 335

Arg Arg Gln Lys His Arg Leu Thr Cys Pro Ser Cys Asp Ser Tyr Glu
            340                 345                 350

Lys Lys Pro Pro Lys Glu Phe Leu Glu Arg Phe Lys Ser Leu Leu Gln
            355                 360                 365

Lys Met Ile His Gln His Leu Ser Ser Arg Thr His Gly Ser Glu Asp
370                 375                 380

Ser
385

<210> SEQ ID NO 37
<211> LENGTH: 385
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"
<220> FEATURE:
<221> NAME/KEY: SITE
<222> LOCATION: (228)..(252)
<223> OTHER INFORMATION: /note="This region may encompass 0-5 'Gly Gly
      Gly Gly Ser' repeating units"

<400> SEQUENCE: 37

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
50                  55                  60

His Asn Ala Lys Thr Lys Pro Arg Glu Glu Gln Tyr Ala Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Cys Arg Asp Glu Leu Thr Lys Asn Gln Val Ser
130                 135                 140

Leu Trp Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
210                 215                 220

Pro Gly Ala Gly Gly Gly Ser Gly Gly Gly Ser Gly Gly Gly
225                 230                 235                 240
```

Gly Ser Gly Gly Gly Ser Gly Gly Gly Ser Gln Gly Gln Asp
            245                 250                 255

Arg His Met Ile Arg Met Arg Gln Leu Ile Asp Ile Val Asp Lys Leu
            260                 265                 270

Lys Asn Tyr Val Asn Asp Leu Val Pro Glu Phe Leu Pro Ala Pro Glu
            275                 280                 285

Asp Val Glu Thr Asn Cys Glu Trp Ser Ala Phe Ser Cys Phe Gln Lys
290                 295                 300

Ala Gln Leu Lys Ser Ala Asn Thr Gly Asn Asn Glu Arg Ile Ile Asn
305                 310                 315                 320

Val Ser Ile Lys Lys Leu Lys Arg Lys Pro Pro Ser Thr Asn Ala Gly
                325                 330                 335

Arg Arg Gln Lys His Arg Leu Thr Cys Pro Ser Cys Asp Ser Tyr Glu
            340                 345                 350

Lys Lys Pro Pro Lys Glu Phe Leu Arg Arg Phe Lys Ser Leu Leu Gln
            355                 360                 365

Lys Met Ile His Gln His Leu Ser Ser Arg Thr His Gly Ser Glu Asp
            370                 375                 380

Ser
385

<210> SEQ ID NO 38
<211> LENGTH: 461
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic polypeptide"

<400> SEQUENCE: 38

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Asn Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Cys Thr Leu Pro Pro Ser Arg Asp Glu Leu Thr Lys Asn Gln Val Ser
    130                 135                 140

Leu Ser Cys Ala Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Val Ser Lys Leu Thr Val
            180                 185                 190

Asp Lys Ser Arg Trp Gln Gln Gly Asn Val Phe Ser Cys Ser Val Met

```
                195                 200                 205
His Glu Ala Leu His Asn His Tyr Thr Gln Lys Ser Leu Ser Leu Ser
            210                 215                 220

Pro Gly Ala Gly Gly Gly Ser Gly Gly Gly Ser Gly Pro Leu
225                 230                 235                 240

Gly Val Arg Gly Gly Gly Ser Cys Pro Asp Leu Val Cys Tyr Thr
                245                 250                 255

Asp Tyr Leu Gln Thr Val Ile Cys Ile Leu Glu Met Trp Asn Leu His
            260                 265                 270

Pro Ser Thr Leu Thr Leu Thr Trp Gln Asp Gln Tyr Glu Glu Leu Lys
        275                 280                 285

Asp Glu Ala Thr Ser Cys Ser Leu His Arg Ser Ala His Asn Ala Thr
    290                 295                 300

His Ala Thr Tyr Thr Cys His Met Asp Val Phe His Phe Met Ala Asp
305                 310                 315                 320

Asp Ile Phe Ser Val Asn Ile Thr Asp Gln Ser Gly Asn Tyr Ser Gln
                325                 330                 335

Glu Cys Gly Ser Phe Leu Leu Ala Glu Ser Ile Lys Pro Ala Pro Pro
            340                 345                 350

Phe Asn Val Thr Val Thr Phe Ser Gly Gln Tyr Asn Ile Ser Trp Arg
        355                 360                 365

Ser Asp Tyr Glu Asp Pro Ala Phe Tyr Met Leu Lys Gly Lys Leu Gln
    370                 375                 380

Tyr Glu Leu Gln Tyr Arg Asn Arg Gly Asp Pro Trp Ala Val Ser Pro
385                 390                 395                 400

Arg Arg Lys Leu Ile Ser Val Asp Ser Arg Ser Val Ser Leu Leu Pro
                405                 410                 415

Leu Glu Phe Arg Lys Asp Ser Ser Tyr Glu Leu Gln Val Arg Ala Gly
            420                 425                 430

Pro Met Pro Gly Ser Ser Tyr Gln Gly Thr Trp Ser Glu Trp Ser Asp
        435                 440                 445

Pro Val Ile Phe Gln Thr Gln Ser Glu Glu Leu Lys Glu
    450                 455                 460

<210> SEQ ID NO 39
<211> LENGTH: 385
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"
<220> FEATURE:
<221> NAME/KEY: SITE
<222> LOCATION: (134)..(158)
<223> OTHER INFORMATION: /note="This region may encompass 0-5 'Gly Gly
      Gly Gly Ser' repeating units"

<400> SEQUENCE: 39

Gln Gly Gln Asp Arg His Met Ile Arg Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60
```

```
Arg Ile Ile Asn Val Ser Ile Lys Lys Leu Lys Arg Lys Pro Pro Ser
 65                  70                  75                  80

Thr Asn Ala Gly Arg Arg Gln Lys His Arg Leu Thr Cys Pro Ser Cys
                 85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu Ser Ser Arg Thr His
        115                 120                 125

Gly Ser Glu Asp Ser Gly Gly Gly Ser Gly Gly Gly Ser Gly
130                 135                 140

Gly Gly Gly Ser Gly Gly Gly Ser Gly Gly Gly Ser Asp Lys
145                 150                 155                 160

Thr His Thr Cys Pro Pro Cys Pro Ala Pro Glu Leu Leu Gly Gly Pro
                165                 170                 175

Ser Val Phe Leu Phe Pro Pro Lys Pro Lys Asp Thr Leu Met Ile Ser
            180                 185                 190

Arg Thr Pro Glu Val Thr Cys Val Val Val Asp Val Ser His Glu Asp
        195                 200                 205

Pro Glu Val Lys Phe Asn Trp Tyr Val Asp Gly Val Glu Val His Asn
210                 215                 220

Ala Lys Thr Lys Pro Arg Glu Glu Gln Tyr Ala Ser Thr Tyr Arg Val
225                 230                 235                 240

Val Ser Val Leu Thr Val Leu His Gln Asp Trp Leu Asn Gly Lys Glu
                245                 250                 255

Tyr Lys Cys Lys Val Ser Asn Lys Ala Leu Pro Ala Pro Ile Glu Lys
            260                 265                 270

Thr Ile Ser Lys Ala Lys Gly Gln Pro Arg Glu Pro Gln Val Tyr Thr
        275                 280                 285

Leu Pro Pro Cys Arg Asp Glu Leu Thr Lys Asn Gln Val Ser Leu Trp
290                 295                 300

Cys Leu Val Lys Gly Phe Tyr Pro Ser Asp Ile Ala Val Glu Trp Glu
305                 310                 315                 320

Ser Asn Gly Gln Pro Glu Asn Asn Tyr Lys Thr Thr Pro Pro Val Leu
                325                 330                 335

Asp Ser Asp Gly Ser Phe Phe Leu Tyr Ser Lys Leu Thr Val Asp Lys
            340                 345                 350

Ser Arg Trp Gln Gln Gly Asn Val Phe Ser Cys Ser Val Met His Glu
        355                 360                 365

Ala Leu His Asn His Tyr Thr Gln Lys Ser Leu Ser Leu Ser Pro Gly
    370                 375                 380

Lys
385

<210> SEQ ID NO 40
<211> LENGTH: 385
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"
<220> FEATURE:
<221> NAME/KEY: SITE
<222> LOCATION: (134)..(158)
<223> OTHER INFORMATION: /note="This region may encompass 0-5 'Gly Gly
      Gly Gly Ser' repeating units"

<400> SEQUENCE: 40
```

Gln Gly Gln Asp Arg His Met Ile Arg Met Arg Gln Leu Ile Asp Ile
1               5                   10                  15

Val Asp Lys Leu Lys Asn Tyr Val Asn Asp Leu Val Pro Glu Phe Leu
                20                  25                  30

Pro Ala Pro Glu Asp Val Glu Thr Asn Cys Glu Trp Ser Ala Phe Ser
            35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Arg Lys Pro Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Arg Arg Phe Lys
            100                 105                 110

Ser Leu Leu Gln Lys Met Ile His Gln His Leu Ser Ser Arg Thr His
    115                 120                 125

Gly Ser Glu Asp Ser Gly Gly Gly Ser Gly Gly Gly Ser Gly
            130                 135                 140

Gly Gly Gly Ser Gly Gly Gly Ser Gly Gly Gly Ser Asp Lys
145                 150                 155                 160

Thr His Thr Cys Pro Pro Cys Pro Ala Pro Glu Leu Leu Gly Gly Pro
                165                 170                 175

Ser Val Phe Leu Phe Pro Pro Lys Pro Lys Asp Thr Leu Met Ile Ser
            180                 185                 190

Arg Thr Pro Glu Val Thr Cys Val Val Val Asp Val Ser His Glu Asp
                195                 200                 205

Pro Glu Val Lys Phe Asn Trp Tyr Val Asp Gly Val Glu Val His Asn
            210                 215                 220

Ala Lys Thr Lys Pro Arg Glu Glu Gln Tyr Ala Ser Thr Tyr Arg Val
225                 230                 235                 240

Val Ser Val Leu Thr Val Leu His Gln Asp Trp Leu Asn Gly Lys Glu
                245                 250                 255

Tyr Lys Cys Lys Val Ser Asn Lys Ala Leu Pro Ala Pro Ile Glu Lys
            260                 265                 270

Thr Ile Ser Lys Ala Lys Gly Gln Pro Arg Glu Pro Gln Val Tyr Thr
            275                 280                 285

Leu Pro Pro Cys Arg Asp Glu Leu Thr Lys Asn Gln Val Ser Leu Trp
    290                 295                 300

Cys Leu Val Lys Gly Phe Tyr Pro Ser Asp Ile Ala Val Glu Trp Glu
305                 310                 315                 320

Ser Asn Gly Gln Pro Glu Asn Asn Tyr Lys Thr Thr Pro Pro Val Leu
            325                 330                 335

Asp Ser Asp Gly Ser Phe Phe Leu Tyr Ser Lys Leu Thr Val Asp Lys
            340                 345                 350

Ser Arg Trp Gln Gln Gly Asn Val Phe Ser Cys Ser Val Met His Glu
    355                 360                 365

Ala Leu His Asn His Tyr Thr Gln Lys Ser Leu Ser Leu Ser Pro Gly
    370                 375                 380

Lys
385

<210> SEQ ID NO 41
<211> LENGTH: 461

```
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 41
```

Cys Pro Asp Leu Val Cys Tyr Thr Asp Tyr Leu Gln Thr Val Ile Cys
1               5                   10                  15

Ile Leu Glu Met Trp Asn Leu His Pro Ser Thr Leu Thr Leu Thr Trp
            20                  25                  30

Gln Asp Gln Tyr Glu Glu Leu Lys Asp Glu Ala Thr Ser Cys Ser Leu
        35                  40                  45

His Arg Ser Ala His Asn Ala Thr His Ala Thr Tyr Thr Cys His Met
    50                  55                  60

Asp Val Phe His Phe Met Ala Asp Asp Ile Phe Ser Val Asn Ile Thr
65              70                  75                  80

Asp Gln Ser Gly Asn Tyr Ser Gln Glu Cys Gly Ser Phe Leu Leu Ala
            85                  90                  95

Glu Ser Ile Lys Pro Ala Pro Pro Phe Asn Val Thr Val Thr Phe Ser
        100                 105                 110

Gly Gln Tyr Asn Ile Ser Trp Arg Ser Asp Tyr Glu Asp Pro Ala Phe
    115                 120                 125

Tyr Met Leu Lys Gly Lys Leu Gln Tyr Glu Leu Gln Tyr Arg Asn Arg
130             135                 140

Gly Asp Pro Trp Ala Val Ser Pro Arg Arg Lys Leu Ile Ser Val Asp
145             150                 155                 160

Ser Arg Ser Val Ser Leu Leu Pro Leu Glu Phe Arg Lys Asp Ser Ser
            165                 170                 175

Tyr Glu Leu Gln Val Arg Ala Gly Pro Met Pro Gly Ser Ser Tyr Gln
        180                 185                 190

Gly Thr Trp Ser Glu Trp Ser Asp Pro Val Ile Phe Gln Thr Gln Ser
    195                 200                 205

Glu Glu Leu Lys Glu Gly Gly Gly Ser Gly Gly Gly Ser Gly
210                 215                 220

Pro Leu Gly Val Arg Gly Gly Gly Ser Asp Lys Thr His Thr Cys
225             230                 235                 240

Pro Pro Cys Pro Ala Pro Glu Leu Leu Gly Gly Pro Ser Val Phe Leu
            245                 250                 255

Phe Pro Pro Lys Pro Lys Asp Thr Leu Met Ile Ser Arg Thr Pro Glu
        260                 265                 270

Val Thr Cys Val Val Val Asp Val Ser His Glu Asp Pro Glu Val Lys
    275                 280                 285

Phe Asn Trp Tyr Val Asp Gly Val Glu Val His Asn Ala Lys Thr Lys
290             295                 300

Pro Arg Glu Glu Gln Tyr Asn Ser Thr Tyr Arg Val Val Ser Val Leu
305             310                 315                 320

Thr Val Leu His Gln Asp Trp Leu Asn Gly Lys Glu Tyr Lys Cys Lys
            325                 330                 335

Val Ser Asn Lys Ala Leu Pro Ala Pro Ile Glu Lys Thr Ile Ser Lys
        340                 345                 350

Ala Lys Gly Gln Pro Arg Glu Pro Gln Val Cys Thr Leu Pro Pro Ser
    355                 360                 365

Arg Asp Glu Leu Thr Lys Asn Gln Val Ser Leu Ser Cys Ala Val Lys

```
                   370                 375                 380
Gly Phe Tyr Pro Ser Asp Ile Ala Val Glu Trp Glu Ser Asn Gly Gln
385                 390                 395                 400

Pro Glu Asn Asn Tyr Lys Thr Thr Pro Pro Val Leu Asp Ser Asp Gly
                405                 410                 415

Ser Phe Phe Leu Val Ser Lys Leu Thr Val Asp Lys Ser Arg Trp Gln
                420                 425                 430

Gln Gly Asn Val Phe Ser Cys Ser Val Met His Glu Ala Leu His Asn
            435                 440                 445

His Tyr Thr Gln Lys Ser Leu Ser Leu Ser Pro Gly Lys
        450                 455                 460

<210> SEQ ID NO 42
<211> LENGTH: 623
<212> TYPE: PRT
<213> ORGANISM: Artificial Sequence
<220> FEATURE:
<223> OTHER INFORMATION: Description of Artificial Sequence:
      Synthetic polypeptide
<220> FEATURE:
<221> NAME/KEY: source
<223> OTHER INFORMATION: /note="Description of Artificial Sequence:
      Synthetic polypeptide"
<220> FEATURE:
<221> NAME/KEY: SITE
<222> LOCATION: (114)..(138)
<223> OTHER INFORMATION: /note="This region may encompass 0-5 'Gly Gly
      Gly Gly Ser' repeating units"
<220> FEATURE:
<221> NAME/KEY: SITE
<222> LOCATION: (214)..(238)
<223> OTHER INFORMATION: /note="This region may encompass 0-5 'Gly Gly
      Gly Gly Ser' repeating units"
<220> FEATURE:
<221> NAME/KEY: SITE
<222> LOCATION: (466)..(490)
<223> OTHER INFORMATION: /note="This region may encompass 0-5 'Gly Gly
      Gly Gly Ser' repeating units"

<400> SEQUENCE: 42

Asn Trp Val Asn Val Ile Ser Asp Leu Lys Lys Ile Glu Asp Leu Ile
1               5                   10                  15

Gln Ser Met His Ile Asp Ala Thr Leu Tyr Thr Glu Ser Asp Val His
                20                  25                  30

Pro Ser Cys Lys Val Thr Ala Met Lys Cys Phe Leu Leu Glu Leu Gln
            35                  40                  45

Val Ile Ser Leu Glu Ser Gly Asp Ala Ser Ile His Asp Thr Val Glu
        50                  55                  60

Asn Leu Ile Ile Leu Ala Asn Asn Ser Leu Ser Ser Asn Gly Asn Val
65                  70                  75                  80

Thr Glu Ser Gly Cys Lys Glu Cys Glu Glu Leu Glu Glu Lys Asn Ile
                85                  90                  95

Lys Glu Phe Leu Gln Ser Phe Val His Ile Val Gln Met Phe Ile Asn
                100                 105                 110

Thr Gly Gly Gly Gly Ser Gly Gly Gly Ser Gly Gly Gly Gly Ser
            115                 120                 125

Gly Gly Gly Gly Ser Gly Gly Gly Ser Ile Thr Cys Pro Pro
        130                 135                 140

Met Ser Val Glu His Ala Asp Ile Trp Val Lys Ser Tyr Ser Leu Tyr
145                 150                 155                 160

Ser Arg Glu Arg Tyr Ile Cys Asn Ser Gly Phe Lys Arg Lys Ala Gly
                165                 170                 175
```

```
Thr Ser Ser Leu Thr Glu Cys Val Leu Asn Lys Ala Thr Asn Val Ala
            180                 185                 190

His Trp Thr Thr Pro Ser Leu Lys Cys Ile Arg Asp Pro Ala Leu Val
            195                 200                 205

His Gln Arg Pro Ala Gly Gly Gly Ser Gly Gly Gly Ser Gly
    210                 215                 220

Gly Gly Gly Ser Gly Gly Gly Ser Gly Gly Gly Ser Asp Lys
225                 230                 235                 240

Thr His Thr Cys Pro Pro Cys Pro Ala Pro Glu Ala Ala Gly Gly Pro
            245                 250                 255

Ser Val Phe Leu Phe Pro Pro Lys Pro Lys Asp Thr Leu Met Ile Ser
            260                 265                 270

Arg Thr Pro Glu Val Thr Cys Val Val Val Asp Val Ser His Glu Asp
            275                 280                 285

Pro Glu Val Lys Phe Asn Trp Tyr Val Asp Gly Val Glu Val His Asn
            290                 295                 300

Ala Lys Thr Lys Pro Arg Glu Glu Gln Tyr Ala Ser Thr Tyr Arg Val
305                 310                 315                 320

Val Ser Val Leu Thr Val Leu His Gln Asp Trp Leu Asn Gly Lys Glu
            325                 330                 335

Tyr Lys Cys Lys Val Ser Asn Lys Ala Leu Pro Ala Pro Ile Glu Lys
            340                 345                 350

Thr Ile Ser Lys Ala Lys Gly Gln Pro Arg Glu Pro Gln Val Tyr Thr
            355                 360                 365

Leu Pro Pro Cys Arg Asp Glu Leu Thr Lys Asn Gln Val Ser Leu Trp
            370                 375                 380

Cys Leu Val Lys Gly Phe Tyr Pro Ser Asp Ile Ala Val Glu Trp Glu
385                 390                 395                 400

Ser Asn Gly Gln Pro Glu Asn Asn Tyr Lys Thr Thr Pro Pro Val Leu
            405                 410                 415

Asp Ser Asp Gly Ser Phe Phe Leu Tyr Ser Lys Leu Thr Val Asp Lys
            420                 425                 430

Ser Arg Trp Gln Gln Gly Asn Val Phe Ser Cys Ser Val Met His Glu
            435                 440                 445

Ala Leu His Asn His Tyr Thr Gln Lys Ser Leu Ser Leu Ser Pro Gly
            450                 455                 460

Ala Gly Gly Gly Gly Ser Gly Gly Gly Gly Ser Gly Gly Gly Gly Ser
465                 470                 475                 480

Gly Gly Gly Gly Ser Gly Gly Gly Ser Gln Gly Gln Asp Arg His
            485                 490                 495

Met Ile Arg Met Arg Gln Leu Ile Asp Ile Val Asp Gln Leu Lys Asn
            500                 505                 510

Tyr Val Asn Asp Leu Val Pro Glu Phe Leu Pro Ala Pro Glu Asp Val
            515                 520                 525

Glu Thr Asn Cys Glu Trp Ser Ala Phe Ser Cys Phe Gln Lys Ala Gln
            530                 535                 540

Leu Lys Ser Ala Asn Thr Gly Asn Asn Glu Arg Ile Ile Asn Val Ser
545                 550                 555                 560

Ile Lys Lys Leu Lys Arg Lys Pro Pro Ser Thr Asn Ala Gly Arg Arg
            565                 570                 575

Gln Lys His Arg Leu Thr Cys Pro Ser Cys Asp Ser Tyr Glu Lys Lys
            580                 585                 590
```

```
Pro Pro Lys Glu Phe Leu Glu Arg Phe Lys Ser Leu Leu Gln Lys Met
            595                 600                 605

Ile His Gln His Leu Ser Ser Arg Thr His Gly Ser Glu Asp Ser
    610                 615                 620
```

<210> SEQ ID NO 43
<211> LENGTH: 543
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"
<220> FEATURE:
<221> NAME/KEY: SITE
<222> LOCATION: (134)..(158)
<223> OTHER INFORMATION: /note="This region may encompass 0-5 'Gly Gly Gly Gly Ser' repeating units"
<220> FEATURE:
<221> NAME/KEY: SITE
<222> LOCATION: (386)..(410)
<223> OTHER INFORMATION: /note="This region may encompass 0-5 'Gly Gly Gly Gly Ser' repeating units"

<400> SEQUENCE: 43

```
Ala Pro Ala Ser Ser Thr Lys Lys Thr Gln Leu Gln Leu Glu His
1               5                   10                  15

Leu Leu Leu Asp Leu Gln Met Ile Leu Asn Gly Ile Asn Asn Tyr Lys
                20                  25                  30

Asn Pro Lys Leu Thr Ser Met Leu Thr Lys Phe Ala Met Pro Lys
            35                  40                  45

Lys Ala Thr Glu Leu Lys His Leu Gln Cys Leu Glu Glu Ala Leu Lys
50                  55                  60

Pro Leu Glu Glu Val Leu Asn Leu Thr Gln Ser Lys Asn Phe His Leu
65                  70                  75                  80

Arg Pro Arg Asp Leu Ile Ser Asn Ile Asn Val Ile Val Leu Glu Leu
                85                  90                  95

Lys Gly Ser Glu Thr Thr Phe Met Cys Glu Tyr Ala Asp Glu Thr Ala
                100                 105                 110

Thr Ile Val Glu Phe Leu Asn Arg Trp Ile Thr Phe Ser Gln Ser Ile
            115                 120                 125

Ile Ser Thr Leu Thr Gly Gly Gly Gly Ser Gly Gly Gly Gly Ser Gly
130                 135                 140

Gly Gly Ser Gly Gly Gly Gly Ser Gly Gly Gly Gly Ser Asp Lys
145                 150                 155                 160

Thr His Thr Cys Pro Pro Cys Pro Ala Pro Glu Ala Ala Gly Gly Pro
            165                 170                 175

Ser Val Phe Leu Phe Pro Pro Lys Pro Lys Asp Thr Leu Met Ile Ser
                180                 185                 190

Arg Thr Pro Glu Val Thr Cys Val Val Val Asp Val Ser His Glu Asp
            195                 200                 205

Pro Glu Val Lys Phe Asn Trp Tyr Val Asp Gly Val Glu Val His Asn
            210                 215                 220

Ala Lys Thr Lys Pro Arg Glu Glu Gln Tyr Ala Ser Thr Tyr Arg Val
225                 230                 235                 240

Val Ser Val Leu Thr Val Leu His Gln Asp Trp Leu Asn Gly Lys Glu
                245                 250                 255

Tyr Lys Cys Lys Val Ser Asn Lys Ala Leu Pro Ala Pro Ile Glu Lys
            260                 265                 270
```

```
Thr Ile Ser Lys Ala Lys Gly Gln Pro Arg Glu Pro Gln Val Tyr Thr
            275                 280                 285

Leu Pro Pro Cys Arg Asp Glu Leu Thr Lys Asn Gln Val Ser Leu Trp
290                 295                 300

Cys Leu Val Lys Gly Phe Tyr Pro Ser Asp Ile Ala Val Glu Trp Glu
305                 310                 315                 320

Ser Asn Gly Gln Pro Glu Asn Asn Tyr Lys Thr Thr Pro Pro Val Leu
                325                 330                 335

Asp Ser Asp Gly Ser Phe Phe Leu Tyr Ser Lys Leu Thr Val Asp Lys
            340                 345                 350

Ser Arg Trp Gln Gln Gly Asn Val Phe Ser Cys Ser Val Met His Glu
355                 360                 365

Ala Leu His Asn His Tyr Thr Gln Lys Ser Leu Ser Leu Ser Pro Gly
370                 375                 380

Ala Gly Gly Gly Ser Gly Gly Gly Gly Ser Gly Gly Gly Gly Gly Ser
385                 390                 395                 400

Gly Gly Gly Gly Ser Gly Gly Gly Ser Gln Gly Gln Asp Arg His
            405                 410                 415

Met Ile Arg Met Arg Gln Leu Ile Asp Ile Val Asp Lys Leu Lys Asn
            420                 425                 430

Tyr Val Asn Asp Leu Val Pro Glu Phe Leu Pro Ala Pro Glu Asp Val
            435                 440                 445

Glu Thr Asn Cys Glu Trp Ser Ala Phe Ser Cys Phe Gln Lys Ala Gln
            450                 455                 460

Leu Lys Ser Ala Asn Thr Gly Asn Asn Glu Arg Ile Ile Asn Val Ser
465                 470                 475                 480

Ile Lys Lys Leu Lys Arg Lys Pro Pro Ser Thr Asn Ala Gly Arg Arg
                485                 490                 495

Gln Lys His Arg Leu Thr Cys Pro Ser Cys Asp Ser Tyr Glu Lys Lys
            500                 505                 510

Pro Pro Lys Glu Phe Leu Arg Arg Phe Lys Ser Leu Leu Gln Lys Met
            515                 520                 525

Ile His Gln His Leu Ser Ser Arg Thr His Gly Ser Glu Asp Ser
530                 535                 540
```

<210> SEQ ID NO 44
<211> LENGTH: 696
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 44

```
Ala Val Asn Gly Thr Ser Gln Phe Thr Cys Phe Tyr Asn Ser Arg Ala
1               5                   10                  15

Asn Ile Ser Cys Val Trp Ser Gln Asp Gly Ala Leu Gln Asp Thr Ser
            20                  25                  30

Cys Gln Val His Ala Trp Pro Asp Arg Arg Arg Trp Asn Gln Thr Cys
            35                  40                  45

Glu Leu Leu Pro Val Ser Gln Ala Ser Trp Ala Cys Asn Leu Ile Leu
50                  55                  60

Gly Ala Pro Asp Ser Gln Lys Leu Thr Thr Val Asp Ile Val Thr Leu
65                  70                  75                  80

Arg Val Leu Cys Arg Glu Gly Val Arg Trp Arg Val Met Ala Ile Gln
```

```
                85                  90                  95
Asp Phe Lys Pro Phe Glu Asn Leu Arg Leu Met Ala Pro Ile Ser Leu
            100                 105                 110
Gln Val His Val Glu Thr His Arg Cys Asn Ile Ser Trp Glu Ile
            115                 120                 125
Ser Gln Ala Ser His Tyr Phe Glu Arg His Leu Glu Phe Glu Ala Arg
            130                 135                 140
Thr Leu Ser Pro Gly His Thr Trp Glu Glu Ala Pro Leu Leu Thr Leu
145                 150                 155                 160
Lys Gln Lys Gln Glu Trp Ile Cys Leu Glu Thr Leu Thr Pro Asp Thr
                165                 170                 175
Gln Tyr Glu Phe Gln Val Arg Val Lys Pro Leu Gln Gly Glu Phe Thr
            180                 185                 190
Thr Trp Ser Pro Trp Ser Gln Pro Leu Ala Phe Arg Thr Lys Pro Ala
            195                 200                 205
Ala Leu Gly Lys Asp Thr Gly Gly Gly Ser Gly Gly Gly Ser
            210                 215                 220
Gly Pro Leu Gly Val Arg Gly Gly Gly Ser Asp Lys Thr His Thr
225                 230                 235                 240
Cys Pro Pro Cys Pro Ala Pro Glu Ala Ala Gly Gly Pro Ser Val Phe
                245                 250                 255
Leu Phe Pro Pro Lys Pro Lys Asp Thr Leu Met Ile Ser Arg Thr Pro
            260                 265                 270
Glu Val Thr Cys Val Val Val Asp Val Ser His Glu Asp Pro Glu Val
            275                 280                 285
Lys Phe Asn Trp Tyr Val Asp Gly Val Glu Val His Asn Ala Lys Thr
            290                 295                 300
Lys Pro Arg Glu Glu Gln Tyr Asn Ser Thr Tyr Arg Val Val Ser Val
305                 310                 315                 320
Leu Thr Val Leu His Gln Asp Trp Leu Asn Gly Lys Glu Tyr Lys Cys
                325                 330                 335
Lys Val Ser Asn Lys Ala Leu Pro Ala Pro Ile Glu Lys Thr Ile Ser
            340                 345                 350
Lys Ala Lys Gly Gln Pro Arg Glu Pro Gln Val Cys Thr Leu Pro Pro
            355                 360                 365
Ser Arg Asp Glu Leu Thr Lys Asn Gln Val Ser Leu Ser Cys Ala Val
            370                 375                 380
Lys Gly Phe Tyr Pro Ser Asp Ile Ala Val Glu Trp Glu Ser Asn Gly
385                 390                 395                 400
Gln Pro Glu Asn Asn Tyr Lys Thr Thr Pro Pro Val Leu Asp Ser Asp
                405                 410                 415
Gly Ser Phe Phe Leu Val Ser Lys Leu Thr Val Asp Lys Ser Arg Trp
            420                 425                 430
Gln Gln Gly Asn Val Phe Ser Cys Ser Val Met His Glu Ala Leu His
            435                 440                 445
Asn His Tyr Thr Gln Lys Ser Leu Ser Leu Ser Pro Gly Ala Gly Gly
            450                 455                 460
Gly Gly Ser Gly Gly Gly Gly Ser Gly Pro Leu Gly Val Arg Gly Gly
465                 470                 475                 480
Gly Gly Ser Cys Pro Asp Leu Val Cys Tyr Thr Asp Tyr Leu Gln Thr
                485                 490                 495
Val Ile Cys Ile Leu Glu Met Trp Asn Leu His Pro Ser Thr Leu Thr
            500                 505                 510
```

Leu Thr Trp Gln Asp Gln Tyr Glu Glu Leu Lys Asp Glu Ala Thr Ser
            515                 520                 525

Cys Ser Leu His Arg Ser Ala His Asn Ala Thr His Ala Thr Tyr Thr
    530                 535                 540

Cys His Met Asp Val Phe His Phe Met Ala Asp Ile Phe Ser Val
545                 550                 555                 560

Asn Ile Thr Asp Gln Ser Gly Asn Tyr Ser Gln Glu Cys Gly Ser Phe
                565                 570                 575

Leu Leu Ala Glu Ser Ile Lys Pro Ala Pro Pro Phe Asn Val Thr Val
            580                 585                 590

Thr Phe Ser Gly Gln Tyr Asn Ile Ser Trp Arg Ser Asp Tyr Glu Asp
        595                 600                 605

Pro Ala Phe Tyr Met Leu Lys Gly Lys Leu Gln Tyr Glu Leu Gln Tyr
    610                 615                 620

Arg Asn Arg Gly Asp Pro Trp Ala Val Ser Pro Arg Arg Lys Leu Ile
625                 630                 635                 640

Ser Val Asp Ser Arg Ser Val Ser Leu Leu Pro Leu Glu Phe Arg Lys
                645                 650                 655

Asp Ser Ser Tyr Glu Leu Gln Val Arg Ala Gly Pro Met Pro Gly Ser
            660                 665                 670

Ser Tyr Gln Gly Thr Trp Ser Glu Trp Ser Asp Pro Val Ile Phe Gln
        675                 680                 685

Thr Gln Ser Glu Glu Leu Lys Glu
    690                 695

<210> SEQ ID NO 45
<211> LENGTH: 623
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"
<220> FEATURE:
<221> NAME/KEY: SITE
<222> LOCATION: (134)..(158)
<223> OTHER INFORMATION: /note="This region may encompass 0-5 'Gly Gly
      Gly Gly Ser' repeating units"
<220> FEATURE:
<221> NAME/KEY: SITE
<222> LOCATION: (386)..(410)
<223> OTHER INFORMATION: /note="This region may encompass 0-5 'Gly Gly
      Gly Gly Ser' repeating units"
<220> FEATURE:
<221> NAME/KEY: SITE
<222> LOCATION: (486)..(510)
<223> OTHER INFORMATION: /note="This region may encompass 0-5 'Gly Gly
      Gly Gly Ser' repeating units"

<400> SEQUENCE: 45

Gln Gly Gln Asp Arg His Met Ile Arg Met Arg Gln Leu Ile Asp Ile
1               5                   10                  15

Val Asp Gln Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Arg Lys Pro Pro Ser
65                  70                  75                  80

```
Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Glu Arg Phe Lys
            100                 105                 110

Ser Leu Leu Gln Lys Met Ile His Gln His Leu Ser Ser Arg Thr His
        115                 120                 125

Gly Ser Glu Asp Ser Gly Gly Gly Ser Gly Gly Gly Ser Gly
130                 135                 140

Gly Gly Gly Ser Gly Gly Gly Ser Gly Gly Gly Ser Asp Lys
145                 150                 155                 160

Thr His Thr Cys Pro Pro Cys Pro Ala Pro Glu Leu Leu Gly Gly Pro
                165                 170                 175

Ser Val Phe Leu Phe Pro Pro Lys Pro Lys Asp Thr Leu Met Ile Ser
            180                 185                 190

Arg Thr Pro Glu Val Thr Cys Val Val Val Asp Val Ser His Glu Asp
        195                 200                 205

Pro Glu Val Lys Phe Asn Trp Tyr Val Asp Gly Val Glu Val His Asn
    210                 215                 220

Ala Lys Thr Lys Pro Arg Glu Glu Gln Tyr Ala Ser Thr Tyr Arg Val
225                 230                 235                 240

Val Ser Val Leu Thr Val Leu His Gln Asp Trp Leu Asn Gly Lys Glu
                245                 250                 255

Tyr Lys Cys Lys Val Ser Asn Lys Ala Leu Pro Ala Pro Ile Glu Lys
            260                 265                 270

Thr Ile Ser Lys Ala Lys Gly Gln Pro Arg Glu Pro Gln Val Tyr Thr
        275                 280                 285

Leu Pro Pro Cys Arg Asp Glu Leu Thr Lys Asn Gln Val Ser Leu Trp
    290                 295                 300

Cys Leu Val Lys Gly Phe Tyr Pro Ser Asp Ile Ala Val Glu Trp Glu
305                 310                 315                 320

Ser Asn Gly Gln Pro Glu Asn Asn Tyr Lys Thr Thr Pro Pro Val Leu
                325                 330                 335

Asp Ser Asp Gly Ser Phe Phe Leu Tyr Ser Lys Leu Thr Val Asp Lys
            340                 345                 350

Ser Arg Trp Gln Gln Gly Asn Val Phe Ser Cys Ser Val Met His Glu
        355                 360                 365

Ala Leu His Asn His Tyr Thr Gln Lys Ser Leu Ser Leu Ser Pro Gly
    370                 375                 380

Ala Gly Gly Gly Ser Gly Gly Gly Ser Gly Gly Gly Ser
385                 390                 395                 400

Gly Gly Gly Gly Ser Gly Gly Gly Ser Ile Thr Cys Pro Pro
                405                 410                 415

Met Ser Val Glu His Ala Asp Ile Trp Val Lys Ser Tyr Ser Leu Tyr
                420                 425                 430

Ser Arg Glu Arg Tyr Ile Cys Asn Ser Gly Phe Lys Arg Lys Ala Gly
            435                 440                 445

Thr Ser Ser Leu Thr Glu Cys Val Leu Asn Lys Ala Thr Asn Val Ala
        450                 455                 460

His Trp Thr Thr Pro Ser Leu Lys Cys Ile Arg Asp Pro Ala Leu Val
465                 470                 475                 480

His Gln Arg Pro Ala Gly Gly Gly Ser Gly Gly Gly Ser Gly
                485                 490                 495

Gly Gly Ser Gly Gly Gly Gly Ser Gly Gly Gly Gly Ser Asn Trp
```

```
                500             505             510
Val Asn Val Ile Ser Asp Leu Lys Lys Ile Glu Asp Leu Ile Gln Ser
            515                 520                 525

Met His Ile Asp Ala Thr Leu Tyr Thr Glu Ser Asp Val His Pro Ser
            530                 535                 540

Cys Lys Val Thr Ala Met Lys Cys Phe Leu Leu Glu Leu Gln Val Ile
545                 550                 555                 560

Ser Leu Glu Ser Gly Asp Ala Ser Ile His Asp Thr Val Glu Asn Leu
                565                 570                 575

Ile Ile Leu Ala Asn Asn Ser Leu Ser Ser Asn Gly Asn Val Thr Glu
            580                 585                 590

Ser Gly Cys Lys Glu Cys Glu Glu Leu Glu Glu Lys Asn Ile Lys Glu
            595                 600                 605

Phe Leu Gln Ser Phe Val His Ile Val Gln Met Phe Ile Asn Thr
            610                 615                 620

<210> SEQ ID NO 46
<211> LENGTH: 543
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"
<220> FEATURE:
<221> NAME/KEY: SITE
<222> LOCATION: (134)..(158)
<223> OTHER INFORMATION: /note="This region may encompass 0-5 'Gly Gly
      Gly Gly Ser' repeating units"
<220> FEATURE:
<221> NAME/KEY: SITE
<222> LOCATION: (386)..(410)
<223> OTHER INFORMATION: /note="This region may encompass 0-5 'Gly Gly
      Gly Gly Ser' repeating units"

<400> SEQUENCE: 46

Gln Gly Gln Asp Arg His Met Ile Arg Met Arg Gln Leu Ile Asp Ile
1               5                   10                  15

Val Asp Lys Leu Lys Asn Tyr Val Asn Asp Leu Val Pro Glu Phe Leu
            20                  25                  30

Pro Ala Pro Glu Asp Val Glu Thr Asn Cys Glu Trp Ser Ala Phe Ser
        35                  40                  45

Cys Phe Gln Lys Ala Gln Leu Lys Ser Ala Asn Thr Gly Asn Asn Glu
    50                  55                  60

Arg Ile Ile Asn Val Ser Ile Lys Lys Leu Lys Arg Lys Pro Pro Ser
65                  70                  75                  80

Thr Asn Ala Gly Arg Arg Gln Lys His Arg Leu Thr Cys Pro Ser Cys
                85                  90                  95

Asp Ser Tyr Glu Lys Lys Pro Pro Lys Glu Phe Leu Arg Arg Phe Lys
            100                 105                 110

Ser Leu Leu Gln Lys Met Ile His Gln His Leu Ser Ser Arg Thr His
        115                 120                 125

Gly Ser Glu Asp Ser Gly Gly Gly Ser Gly Gly Gly Ser Gly
    130                 135                 140

Gly Gly Gly Ser Gly Gly Gly Gly Ser Gly Gly Gly Ser Asp Lys
145                 150                 155                 160

Thr His Thr Cys Pro Pro Cys Pro Ala Pro Glu Leu Leu Gly Gly Pro
                165                 170                 175

Ser Val Phe Leu Phe Pro Pro Lys Pro Lys Asp Thr Leu Met Ile Ser
```

```
            180                 185                 190
Arg Thr Pro Glu Val Thr Cys Val Val Asp Val Ser His Glu Asp
            195                 200                 205
Pro Glu Val Lys Phe Asn Trp Tyr Val Asp Gly Val Glu Val His Asn
            210                 215                 220
Ala Lys Thr Lys Pro Arg Glu Glu Gln Tyr Ala Ser Thr Tyr Arg Val
225                 230                 235                 240
Val Ser Val Leu Thr Val Leu His Gln Asp Trp Leu Asn Gly Lys Glu
            245                 250                 255
Tyr Lys Cys Lys Val Ser Asn Lys Ala Leu Pro Ala Pro Ile Glu Lys
            260                 265                 270
Thr Ile Ser Lys Ala Lys Gly Gln Pro Arg Glu Pro Gln Val Tyr Thr
            275                 280                 285
Leu Pro Pro Cys Arg Asp Glu Leu Thr Lys Asn Gln Val Ser Leu Trp
            290                 295                 300
Cys Leu Val Lys Gly Phe Tyr Pro Ser Asp Ile Ala Val Glu Trp Glu
305                 310                 315                 320
Ser Asn Gly Gln Pro Glu Asn Asn Tyr Lys Thr Thr Pro Pro Val Leu
            325                 330                 335
Asp Ser Asp Gly Ser Phe Phe Leu Tyr Ser Lys Leu Thr Val Asp Lys
            340                 345                 350
Ser Arg Trp Gln Gln Gly Asn Val Phe Ser Cys Ser Val Met His Glu
            355                 360                 365
Ala Leu His Asn His Tyr Thr Gln Lys Ser Leu Ser Leu Ser Pro Gly
            370                 375                 380
Ala Gly Gly Gly Gly Ser Gly Gly Gly Gly Ser Gly Gly Gly Gly Ser
385                 390                 395                 400
Gly Gly Gly Gly Ser Gly Gly Gly Ser Ala Pro Ala Ser Ser Ser
            405                 410                 415
Thr Lys Lys Thr Gln Leu Gln Leu Glu His Leu Leu Leu Asp Leu Gln
            420                 425                 430
Met Ile Leu Asn Gly Ile Asn Asn Tyr Lys Asn Pro Lys Leu Thr Ser
            435                 440                 445
Met Leu Thr Lys Lys Phe Ala Met Pro Lys Lys Ala Thr Glu Leu Lys
            450                 455                 460
His Leu Gln Cys Leu Glu Glu Ala Leu Lys Pro Leu Glu Glu Val Leu
465                 470                 475                 480
Asn Leu Thr Gln Ser Lys Asn Phe His Leu Arg Pro Arg Asp Leu Ile
            485                 490                 495
Ser Asn Ile Asn Val Ile Val Leu Glu Leu Lys Gly Ser Glu Thr Thr
            500                 505                 510
Phe Met Cys Glu Tyr Ala Asp Glu Thr Ala Thr Ile Val Glu Phe Leu
            515                 520                 525
Asn Arg Trp Ile Thr Phe Ser Gln Ser Ile Ile Ser Thr Leu Thr
            530                 535                 540

<210> SEQ ID NO 47
<211> LENGTH: 696
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 47
```

```
Cys Pro Asp Leu Val Cys Tyr Thr Asp Tyr Leu Gln Thr Val Ile Cys
1               5                   10                  15

Ile Leu Glu Met Trp Asn Leu His Pro Ser Thr Leu Thr Leu Thr Trp
            20                  25                  30

Gln Asp Gln Tyr Glu Glu Leu Lys Asp Glu Ala Thr Ser Cys Ser Leu
        35                  40                  45

His Arg Ser Ala His Asn Ala Thr His Ala Thr Tyr Thr Cys His Met
    50                  55                  60

Asp Val Phe His Phe Met Ala Asp Asp Ile Phe Ser Val Asn Ile Thr
65                  70                  75                  80

Asp Gln Ser Gly Asn Tyr Ser Gln Glu Cys Gly Ser Phe Leu Leu Ala
                85                  90                  95

Glu Ser Ile Lys Pro Ala Pro Pro Phe Asn Val Thr Val Thr Phe Ser
            100                 105                 110

Gly Gln Tyr Asn Ile Ser Trp Arg Ser Asp Tyr Glu Asp Pro Ala Phe
        115                 120                 125

Tyr Met Leu Lys Gly Lys Leu Gln Tyr Glu Leu Gln Tyr Arg Asn Arg
    130                 135                 140

Gly Asp Pro Trp Ala Val Ser Pro Arg Arg Lys Leu Ile Ser Val Asp
145                 150                 155                 160

Ser Arg Ser Val Ser Leu Leu Pro Leu Glu Phe Arg Lys Asp Ser Ser
                165                 170                 175

Tyr Glu Leu Gln Val Arg Ala Gly Pro Met Pro Gly Ser Ser Tyr Gln
            180                 185                 190

Gly Thr Trp Ser Glu Trp Ser Asp Pro Val Ile Phe Gln Thr Gln Ser
        195                 200                 205

Glu Glu Leu Lys Glu Gly Gly Gly Ser Gly Gly Gly Ser Gly
    210                 215                 220

Pro Leu Gly Val Arg Gly Gly Gly Ser Asp Lys Thr His Thr Cys
225                 230                 235                 240

Pro Pro Cys Pro Ala Pro Glu Leu Leu Gly Gly Pro Ser Val Phe Leu
            245                 250                 255

Phe Pro Pro Lys Pro Lys Asp Thr Leu Met Ile Ser Arg Thr Pro Glu
        260                 265                 270

Val Thr Cys Val Val Val Asp Val Ser His Glu Asp Pro Glu Val Lys
    275                 280                 285

Phe Asn Trp Tyr Val Asp Gly Val Glu Val His Asn Ala Lys Thr Lys
290                 295                 300

Pro Arg Glu Glu Gln Tyr Asn Ser Thr Tyr Arg Val Val Ser Val Leu
305                 310                 315                 320

Thr Val Leu His Gln Asp Trp Leu Asn Gly Lys Glu Tyr Lys Cys Lys
            325                 330                 335

Val Ser Asn Lys Ala Leu Pro Ala Pro Ile Glu Lys Thr Ile Ser Lys
        340                 345                 350

Ala Lys Gly Gln Pro Arg Glu Pro Gln Val Cys Thr Leu Pro Pro Ser
    355                 360                 365

Arg Asp Glu Leu Thr Lys Asn Gln Val Ser Leu Ser Cys Ala Val Lys
370                 375                 380

Gly Phe Tyr Pro Ser Asp Ile Ala Val Glu Trp Glu Ser Asn Gly Gln
385                 390                 395                 400

Pro Glu Asn Asn Tyr Lys Thr Thr Pro Pro Val Leu Asp Ser Asp Gly
            405                 410                 415
```

```
Ser Phe Phe Leu Val Ser Lys Leu Thr Val Asp Lys Ser Arg Trp Gln
            420                 425                 430

Gln Gly Asn Val Phe Ser Cys Ser Val Met His Glu Ala Leu His Asn
        435                 440                 445

His Tyr Thr Gln Lys Ser Leu Ser Leu Ser Pro Gly Ala Gly Gly Gly
    450                 455                 460

Gly Ser Gly Gly Gly Ser Gly Pro Leu Gly Val Arg Gly Gly
465                 470                 475                 480

Gly Ser Ala Val Asn Gly Thr Ser Gln Phe Thr Cys Phe Tyr Asn Ser
                485                 490                 495

Arg Ala Asn Ile Ser Cys Val Trp Ser Gln Asp Gly Ala Leu Gln Asp
            500                 505                 510

Thr Ser Cys Gln Val His Ala Trp Pro Asp Arg Arg Trp Asn Gln
        515                 520                 525

Thr Cys Glu Leu Leu Pro Val Ser Gln Ala Ser Trp Ala Cys Asn Leu
    530                 535                 540

Ile Leu Gly Ala Pro Asp Ser Gln Lys Leu Thr Thr Val Asp Ile Val
545                 550                 555                 560

Thr Leu Arg Val Leu Cys Arg Glu Gly Val Arg Trp Arg Val Met Ala
                565                 570                 575

Ile Gln Asp Phe Lys Pro Phe Glu Asn Leu Arg Leu Met Ala Pro Ile
            580                 585                 590

Ser Leu Gln Val Val His Val Glu Thr His Arg Cys Asn Ile Ser Trp
        595                 600                 605

Glu Ile Ser Gln Ala Ser His Tyr Phe Glu Arg His Leu Glu Phe Glu
    610                 615                 620

Ala Arg Thr Leu Ser Pro Gly His Thr Trp Glu Glu Ala Pro Leu Leu
625                 630                 635                 640

Thr Leu Lys Gln Lys Gln Glu Trp Ile Cys Leu Glu Thr Leu Thr Pro
                645                 650                 655

Asp Thr Gln Tyr Glu Phe Gln Val Arg Val Lys Pro Leu Gln Gly Glu
            660                 665                 670

Phe Thr Thr Trp Ser Pro Trp Ser Gln Pro Leu Ala Phe Arg Thr Lys
        675                 680                 685

Pro Ala Ala Leu Gly Lys Asp Thr
    690                 695

<210> SEQ ID NO 48
<211> LENGTH: 588
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 48

Gln Val Gln Leu Val Glu Ser Gly Gly Gly Val Val Gln Pro Gly Arg
1               5                   10                  15

Ser Leu Arg Leu Asp Cys Lys Ala Ser Gly Ile Thr Phe Ser Asn Ser
            20                  25                  30

Gly Met His Trp Val Arg Gln Ala Pro Gly Lys Gly Leu Glu Trp Val
        35                  40                  45

Ala Val Ile Trp Tyr Asp Gly Ser Lys Arg Tyr Tyr Ala Asp Ser Val
    50                  55                  60

Lys Gly Arg Phe Thr Ile Ser Arg Asp Asn Ser Lys Asn Thr Leu Phe
```

```
                65                  70                  75                  80
Leu Gln Met Asn Ser Leu Arg Ala Glu Asp Thr Ala Val Tyr Tyr Cys
                    85                  90                  95

Ala Thr Asn Asp Asp Tyr Trp Gly Gln Gly Thr Leu Val Thr Val Ser
                100                 105                 110

Ser Ala Ser Thr Lys Gly Pro Ser Val Phe Pro Leu Ala Pro Cys Ser
                115                 120                 125

Arg Ser Thr Ser Glu Ser Thr Ala Ala Leu Gly Cys Leu Val Lys Asp
            130                 135                 140

Tyr Phe Pro Glu Pro Val Thr Val Ser Trp Asn Ser Gly Ala Leu Thr
145                 150                 155                 160

Ser Gly Val His Thr Phe Pro Ala Val Leu Gln Ser Ser Gly Leu Tyr
                165                 170                 175

Ser Leu Ser Ser Val Val Thr Val Pro Ser Ser Ser Leu Gly Thr Lys
                180                 185                 190

Thr Tyr Thr Cys Asn Val Asp His Lys Pro Ser Asn Thr Lys Val Asp
            195                 200                 205

Lys Arg Val Glu Ser Lys Tyr Gly Pro Pro Cys Pro Pro Cys Pro Ala
210                 215                 220

Pro Glu Phe Leu Gly Gly Pro Ser Val Phe Leu Phe Pro Pro Lys Pro
225                 230                 235                 240

Lys Asp Thr Leu Met Ile Ser Arg Thr Pro Glu Val Thr Cys Val Val
                245                 250                 255

Val Asp Val Ser Gln Glu Asp Pro Glu Val Gln Phe Asn Trp Tyr Val
                260                 265                 270

Asp Gly Val Glu Val His Asn Ala Lys Thr Lys Pro Arg Glu Glu Gln
            275                 280                 285

Phe Asn Ser Thr Tyr Arg Val Val Ser Val Leu Thr Val Leu His Gln
                290                 295                 300

Asp Trp Leu Asn Gly Lys Glu Tyr Lys Cys Lys Val Ser Asn Lys Gly
305                 310                 315                 320

Leu Pro Ser Ser Ile Glu Lys Thr Ile Ser Lys Ala Lys Gly Gln Pro
                325                 330                 335

Arg Glu Pro Gln Val Tyr Thr Leu Pro Pro Cys Gln Glu Glu Met Thr
                340                 345                 350

Lys Asn Gln Val Ser Leu Trp Cys Leu Val Lys Gly Phe Tyr Pro Ser
            355                 360                 365

Asp Ile Ala Val Glu Trp Glu Ser Asn Gly Gln Pro Glu Asn Asn Tyr
370                 375                 380

Lys Thr Thr Pro Pro Val Leu Asp Ser Asp Gly Ser Phe Phe Leu Tyr
385                 390                 395                 400

Ser Arg Leu Thr Val Asp Lys Ser Arg Trp Gln Glu Gly Asn Val Phe
                405                 410                 415

Ser Cys Ser Val Met His Glu Ala Leu His Asn His Tyr Thr Gln Lys
                420                 425                 430

Ser Leu Ser Leu Ser Leu Gly Ala Gly Gly Gly Ser Gly Gly Gly
            435                 440                 445

Gly Ser Gly Gly Gly Ser Gln Gly Gln Asp Arg His Met Ile Arg
                450                 455                 460

Met Arg Gln Leu Ile Asp Ile Val Asp Gln Leu Lys Asn Tyr Val Asn
465                 470                 475                 480

Asp Leu Val Pro Glu Phe Leu Pro Ala Pro Glu Asp Val Glu Thr Asn
                485                 490                 495
```

```
Cys Glu Trp Ser Ala Phe Ser Cys Phe Gln Lys Ala Gln Leu Lys Ser
            500                 505                 510

Ala Asn Thr Gly Asn Asn Glu Arg Ile Ile Asn Val Ser Ile Lys Lys
            515                 520                 525

Leu Lys Arg Lys Pro Pro Ser Thr Asn Ala Gly Arg Arg Gln Lys His
            530                 535                 540

Arg Leu Thr Cys Pro Ser Cys Asp Ser Tyr Glu Lys Lys Pro Pro Lys
545                 550                 555                 560

Glu Phe Leu Glu Arg Phe Lys Ser Leu Leu Gln Lys Met Ile His Gln
                565                 570                 575

His Leu Ser Ser Arg Thr His Gly Ser Glu Asp Ser
            580                 585
```

<210> SEQ ID NO 49
<211> LENGTH: 674
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 49

```
Gln Val Gln Leu Val Glu Ser Gly Gly Gly Val Val Gln Pro Gly Arg
1               5                   10                  15

Ser Leu Arg Leu Asp Cys Lys Ala Ser Gly Ile Thr Phe Ser Asn Ser
            20                  25                  30

Gly Met His Trp Val Arg Gln Ala Pro Gly Lys Gly Leu Glu Trp Val
        35                  40                  45

Ala Val Ile Trp Tyr Asp Gly Ser Lys Arg Tyr Tyr Ala Asp Ser Val
    50                  55                  60

Lys Gly Arg Phe Thr Ile Ser Arg Asp Asn Ser Lys Asn Thr Leu Phe
65                  70                  75                  80

Leu Gln Met Asn Ser Leu Arg Ala Glu Asp Thr Ala Val Tyr Tyr Cys
                85                  90                  95

Ala Thr Asn Asp Asp Tyr Trp Gly Gln Gly Thr Leu Val Thr Val Ser
            100                 105                 110

Ser Ala Ser Thr Lys Gly Pro Ser Val Phe Pro Leu Ala Pro Cys Ser
        115                 120                 125

Arg Ser Thr Ser Glu Ser Thr Ala Ala Leu Gly Cys Leu Val Lys Asp
    130                 135                 140

Tyr Phe Pro Glu Pro Val Thr Val Ser Trp Asn Ser Gly Ala Leu Thr
145                 150                 155                 160

Ser Gly Val His Thr Phe Pro Ala Val Leu Gln Ser Ser Gly Leu Tyr
                165                 170                 175

Ser Leu Ser Ser Val Val Thr Val Pro Ser Ser Ser Leu Gly Thr Lys
            180                 185                 190

Thr Tyr Thr Cys Asn Val Asp His Lys Pro Ser Asn Thr Lys Val Asp
        195                 200                 205

Lys Arg Val Glu Ser Lys Tyr Gly Pro Pro Cys Pro Pro Cys Pro Ala
    210                 215                 220

Pro Glu Phe Leu Gly Gly Pro Ser Val Phe Leu Phe Pro Pro Lys Pro
225                 230                 235                 240

Lys Asp Thr Leu Met Ile Ser Arg Thr Pro Glu Val Thr Cys Val Val
                245                 250                 255
```

```
Val Asp Val Ser Gln Glu Asp Pro Glu Val Gln Phe Asn Trp Tyr Val
            260                 265                 270

Asp Gly Val Glu Val His Asn Ala Lys Thr Lys Pro Arg Glu Glu Gln
        275                 280                 285

Phe Asn Ser Thr Tyr Arg Val Val Ser Val Leu Thr Val Leu His Gln
    290                 295                 300

Asp Trp Leu Asn Gly Lys Glu Tyr Lys Cys Lys Val Ser Asn Lys Gly
305                 310                 315                 320

Leu Pro Ser Ser Ile Glu Lys Thr Ile Ser Lys Ala Lys Gly Gln Pro
                325                 330                 335

Arg Glu Pro Gln Val Cys Thr Leu Pro Pro Ser Gln Glu Glu Met Thr
            340                 345                 350

Lys Asn Gln Val Ser Leu Ser Cys Ala Val Lys Gly Phe Tyr Pro Ser
        355                 360                 365

Asp Ile Ala Val Glu Trp Glu Ser Asn Gly Gln Pro Glu Asn Asn Tyr
    370                 375                 380

Lys Thr Thr Pro Pro Val Leu Asp Ser Asp Gly Ser Phe Phe Leu Val
385                 390                 395                 400

Ser Arg Leu Thr Val Asp Lys Ser Arg Trp Gln Glu Gly Asn Val Phe
                405                 410                 415

Ser Cys Ser Val Met His Glu Ala Leu His Asn His Tyr Thr Gln Lys
            420                 425                 430

Ser Leu Ser Leu Ser Leu Gly Ala Gly Gly Gly Ser Gly Gly Gly
        435                 440                 445

Gly Ser Gly Pro Leu Gly Val Arg Gly Gly Gly Ser Cys Pro Asp
450                 455                 460

Leu Val Cys Tyr Thr Asp Tyr Leu Gln Thr Val Ile Cys Ile Leu Glu
465                 470                 475                 480

Met Trp Asn Leu His Pro Ser Thr Leu Thr Leu Thr Trp Gln Asp Gln
                485                 490                 495

Tyr Glu Glu Leu Lys Asp Glu Ala Thr Ser Cys Ser Leu His Arg Ser
            500                 505                 510

Ala His Asn Ala Thr His Ala Thr Tyr Thr Cys His Met Asp Val Phe
        515                 520                 525

His Phe Met Ala Asp Asp Ile Phe Ser Val Asn Ile Thr Asp Gln Ser
    530                 535                 540

Gly Asn Tyr Ser Gln Glu Cys Gly Ser Phe Leu Leu Ala Glu Ser Ile
545                 550                 555                 560

Lys Pro Ala Pro Pro Phe Asn Val Thr Val Thr Phe Ser Gly Gln Tyr
                565                 570                 575

Asn Ile Ser Trp Arg Ser Asp Tyr Glu Asp Pro Ala Phe Tyr Met Leu
            580                 585                 590

Lys Gly Lys Leu Gln Tyr Glu Leu Gln Tyr Arg Asn Arg Gly Asp Pro
        595                 600                 605

Trp Ala Val Ser Pro Arg Arg Lys Leu Ile Ser Val Asp Ser Arg Ser
    610                 615                 620

Val Ser Leu Leu Pro Leu Glu Phe Arg Lys Asp Ser Ser Tyr Glu Leu
625                 630                 635                 640

Gln Val Arg Ala Gly Pro Met Pro Gly Ser Ser Tyr Gln Gly Thr Trp
                645                 650                 655

Ser Glu Trp Ser Asp Pro Val Ile Phe Gln Thr Gln Ser Glu Glu Leu
            660                 665                 670

Lys Glu
```

<210> SEQ ID NO 50
<211> LENGTH: 214
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 50

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Gln Ser Val Ser Ser Tyr
            20                  25                  30

Leu Ala Trp Tyr Gln Gln Lys Pro Gly Gln Ala Pro Arg Leu Leu Ile
        35                  40                  45

Tyr Asp Ala Ser Asn Arg Ala Thr Gly Ile Pro Ala Arg Phe Ser Gly
50                  55                  60

Ser Gly Ser Gly Thr Asp Phe Thr Leu Thr Ile Ser Ser Leu Glu Pro
65                  70                  75                  80

Glu Asp Phe Ala Val Tyr Tyr Cys Gln Gln Ser Ser Asn Trp Pro Arg
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 51
<211> LENGTH: 362
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"
<220> FEATURE:
<221> NAME/KEY: VARIANT
<222> LOCATION: (317)..(317)
<223> OTHER INFORMATION: /replace="Ala"
<220> FEATURE:
<221> NAME/KEY: VARIANT
<222> LOCATION: (355)..(355)
<223> OTHER INFORMATION: /replace="His" or "Trp" or "Ala"
<220> FEATURE:
<221> NAME/KEY: SITE
<222> LOCATION: (1)..(362)
<223> OTHER INFORMATION: /note="Variant residues given in the sequence have no preference with respect to those in the annotations for variant positions"

<400> SEQUENCE: 51

| | | | | | | | | | | | | | | | |
|---|---|---|---|---|---|---|---|---|---|---|---|---|---|---|---|
|Glu|Ile|Val|Leu|Thr|Gln|Ser|Pro|Ala|Thr|Leu|Ser|Leu|Ser|Pro|Gly|
|1| | | |5| | | | |10| | | | |15| |
|Glu|Arg|Ala|Thr|Leu|Ser|Cys|Arg|Ala|Ser|Gln|Ser|Val|Ser|Ser|Tyr|
| | | |20| | | | |25| | | | |30| | |
|Leu|Ala|Trp|Tyr|Gln|Gln|Lys|Pro|Gly|Gln|Ala|Pro|Arg|Leu|Leu|Ile|
| | |35| | | | |40| | | | |45| | | |
|Tyr|Asp|Ala|Ser|Asn|Arg|Ala|Thr|Gly|Ile|Pro|Ala|Arg|Phe|Ser|Gly|
| |50| | | | |55| | | | |60| | | | |
|Ser|Gly|Ser|Gly|Thr|Asp|Phe|Thr|Leu|Thr|Ile|Ser|Ser|Leu|Glu|Pro|
|65| | | | |70| | | | |75| | | | |80|
|Glu|Asp|Phe|Ala|Val|Tyr|Tyr|Cys|Gln|Gln|Ser|Ser|Asn|Trp|Pro|Arg|
| | | | |85| | | | |90| | | | |95| |
|Thr|Phe|Gly|Gln|Gly|Thr|Lys|Val|Glu|Ile|Lys|Arg|Thr|Val|Ala|Ala|
| | | |100| | | | |105| | | | |110| | |
|Pro|Ser|Val|Phe|Ile|Phe|Pro|Pro|Ser|Asp|Glu|Gln|Leu|Lys|Ser|Gly|
| | |115| | | | |120| | | | |125| | | |
|Thr|Ala|Ser|Val|Val|Cys|Leu|Leu|Asn|Asn|Phe|Tyr|Pro|Arg|Glu|Ala|
| |130| | | | |135| | | | |140| | | | |
|Lys|Val|Gln|Trp|Lys|Val|Asp|Asn|Ala|Leu|Gln|Ser|Gly|Asn|Ser|Gln|
|145| | | | |150| | | | |155| | | | |160|
|Glu|Ser|Val|Thr|Glu|Gln|Asp|Ser|Lys|Asp|Ser|Thr|Tyr|Ser|Leu|Ser|
| | | | |165| | | | |170| | | | |175| |
|Ser|Thr|Leu|Thr|Leu|Ser|Lys|Ala|Asp|Tyr|Glu|Lys|His|Lys|Val|Tyr|
| | | |180| | | | |185| | | | |190| | |
|Ala|Cys|Glu|Val|Thr|His|Gln|Gly|Leu|Ser|Ser|Pro|Val|Thr|Lys|Ser|
| | |195| | | | |200| | | | |205| | | |
|Phe|Asn|Arg|Gly|Glu|Cys|Gly|Gly|Gly|Ser|Gly|Gly|Gly|Gly|Ser|
| |210| | | | |215| | | | |220| | | | |
|Gly|Gly|Gly|Gly|Ser|Ala|Pro|Ala|Ser|Ser|Ser|Thr|Lys|Lys|Thr|Gln|
|225| | | | |230| | | | |235| | | | |240|
|Leu|Gln|Leu|Glu|His|Leu|Leu|Leu|Asp|Leu|Gln|Met|Ile|Leu|Asn|Gly|
| | | | |245| | | | |250| | | | |255| |
|Ile|Asn|Asn|Tyr|Lys|Asn|Pro|Lys|Leu|Thr|Ser|Met|Leu|Thr|Ala|Lys|
| | | |260| | | | |265| | | | |270| | |
|Phe|Ala|Met|Pro|Lys|Lys|Ala|Thr|Glu|Leu|Lys|His|Leu|Gln|Cys|Leu|
| | |275| | | | |280| | | | |285| | | |
|Glu|Glu|Ala|Leu|Lys|Pro|Leu|Glu|Glu|Val|Leu|Asn|Leu|Ala|Gln|Ser|
| |290| | | | |295| | | | |300| | | | |
|Lys|Asn|Phe|His|Leu|Arg|Pro|Arg|Asp|Leu|Ile|Ser|Asn|Ile|Asn|Val|
|305| | | | |310| | | | |315| | | | |320|
|Ile|Val|Leu|Glu|Leu|Lys|Gly|Ser|Glu|Thr|Thr|Phe|Met|Cys|Glu|Tyr|
| | | | |325| | | | |330| | | | |335| |
|Ala|Asp|Glu|Thr|Ala|Thr|Ile|Val|Glu|Phe|Leu|Asn|Arg|Trp|Ile|Thr|
| | | |340| | | | |345| | | | |350| | |
|Phe|Ser|Gln|Ser|Ile|Ile|Ser|Thr|Leu|Thr|
| | |355| | | | |360| | |

<210> SEQ ID NO 52
<211> LENGTH: 214
<212> TYPE: PRT
<213> ORGANISM: Artificial Sequence
<220> FEATURE:
<221> NAME/KEY: source
<223> OTHER INFORMATION: /note="Description of Artificial Sequence:

-continued

Synthetic polypeptide"

<400> SEQUENCE: 52

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Asn Thr Ala
            20                  25                  30

Val Ala Trp Tyr Gln Gln Lys Pro Gly Lys Ala Pro Lys Leu Leu Ile
        35                  40                  45

Tyr Ser Ala Ser Phe Leu Tyr Ser Gly Val Pro Ser Arg Phe Ser Gly
    50                  55                  60

Ser Arg Ser Gly Thr Asp Phe Thr Leu Thr Ile Ser Ser Leu Gln Pro
65                  70                  75                  80

Glu Asp Phe Ala Thr Tyr Tyr Cys Gln Gln His Tyr Thr Thr Pro Pro
                85                  90                  95

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 53
<211> LENGTH: 451
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 53

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Asn Ile Lys Asp Thr
            20                  25                  30

Tyr Ile His Trp Val Arg Gln Ala Pro Gly Lys Gly Leu Glu Trp Val
        35                  40                  45

Ala Arg Ile Tyr Pro Thr Asn Gly Tyr Thr Arg Tyr Ala Asp Ser Val
    50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
                85                  90                  95

Ser Arg Trp Gly Gly Asp Gly Phe Tyr Ala Met Asp Tyr Trp Gly Gln
            100                 105                 110

```
Gly Thr Leu Val Thr Val Ser Ser Ala Ser Thr Lys Gly Pro Ser Val
            115                 120                 125

Phe Pro Leu Ala Pro Ser Ser Lys Ser Thr Ser Gly Gly Thr Ala Ala
        130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175

Leu Gln Ser Ser Gly Leu Tyr Ser Leu Ser Ser Val Val Thr Val Pro
            180                 185                 190

Ser Ser Ser Leu Gly Thr Gln Thr Tyr Ile Cys Asn Val Asn His Lys
        195                 200                 205

Pro Ser Asn Thr Lys Val Asp Lys Lys Val Glu Pro Pro Lys Ser Cys
210                 215                 220

Asp Lys Thr His Thr Cys Pro Pro Cys Pro Ala Pro Glu Leu Leu Gly
                225                 230                 235                 240

Gly Pro Ser Val Phe Leu Phe Pro Pro Lys Pro Lys Asp Thr Leu Met
            245                 250                 255

Ile Ser Arg Thr Pro Glu Val Thr Cys Val Val Val Asp Val Ser His
        260                 265                 270

Glu Asp Pro Glu Val Lys Phe Asn Trp Tyr Val Asp Gly Val Glu Val
275                 280                 285

His Asn Ala Lys Thr Lys Pro Arg Glu Glu Gln Tyr Asn Ser Thr Tyr
                290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Ala Leu Pro Ala Pro Ile
                325                 330                 335

Glu Lys Thr Ile Ser Lys Ala Lys Gly Gln Pro Arg Glu Pro Gln Val
            340                 345                 350

Tyr Thr Leu Pro Pro Ser Arg Asp Glu Leu Thr Lys Asn Gln Val Ser
        355                 360                 365

Leu Thr Cys Leu Val Lys Gly Phe Tyr Pro Ser Asp Ile Ala Val Glu
370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Tyr Ser Lys Leu Thr Val
                405                 410                 415

Asp Lys Ser Arg Trp Gln Gln Gly Asn Val Phe Ser Cys Ser Val Met
            420                 425                 430

His Glu Ala Leu His Asn His Tyr Thr Gln Lys Ser Leu Ser Leu Ser
        435                 440                 445

Pro Gly Lys
    450

<210> SEQ ID NO 54
<211> LENGTH: 213
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 54

Gln Ile Val Leu Ser Gln Ser Pro Ala Ile Leu Ser Ala Ser Pro Gly
```

```
              1               5                  10                 15
        Glu Lys Val Thr Met Thr Cys Arg Ala Ser Ser Val Ser Tyr Ile
                        20                  25                  30
        His Trp Phe Gln Gln Lys Pro Gly Ser Ser Lys Pro Trp Ile Tyr
                        35                  40                  45
        Ala Thr Ser Asn Leu Ala Ser Gly Val Pro Val Arg Phe Ser Gly Ser
                  50                  55                  60
        Gly Ser Gly Thr Ser Tyr Ser Leu Thr Ile Ser Arg Val Glu Ala Glu
        65                  70                  75                  80
        Asp Ala Ala Thr Tyr Tyr Cys Gln Gln Trp Thr Ser Asn Pro Pro Thr
                        85                  90                  95
        Phe Gly Gly Gly Thr Lys Leu Glu Ile Lys Arg Thr Val Ala Ala Pro
                        100                 105                 110
        Ser Val Phe Ile Phe Pro Pro Ser Asp Glu Gln Leu Lys Ser Gly Thr
                        115                 120                 125
        Ala Ser Val Val Cys Leu Leu Asn Asn Phe Tyr Pro Arg Glu Ala Lys
                  130                 135                 140
        Val Gln Trp Lys Val Asp Asn Ala Leu Gln Ser Gly Asn Ser Gln Glu
        145                 150                 155                 160
        Ser Val Thr Glu Gln Asp Ser Lys Asp Ser Thr Tyr Ser Leu Ser Ser
                        165                 170                 175
        Thr Leu Thr Leu Ser Lys Ala Asp Tyr Glu Lys His Lys Val Tyr Ala
                        180                 185                 190
        Cys Glu Val Thr His Gln Gly Leu Ser Ser Pro Val Thr Lys Ser Phe
                        195                 200                 205
        Asn Arg Gly Glu Cys
                        210

<210> SEQ ID NO 55
<211> LENGTH: 451
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 55

Gln Val Gln Leu Gln Gln Pro Gly Ala Glu Leu Val Lys Pro Gly Ala
        1               5                   10                  15
        Ser Val Lys Met Ser Cys Lys Ala Ser Gly Tyr Thr Phe Thr Ser Tyr
                        20                  25                  30
        Asn Met His Trp Val Lys Gln Thr Pro Gly Arg Gly Leu Glu Trp Ile
                        35                  40                  45
        Gly Ala Ile Tyr Pro Gly Asn Gly Asp Thr Ser Tyr Asn Gln Lys Phe
                  50                  55                  60
        Lys Gly Lys Ala Thr Leu Thr Ala Asp Lys Ser Ser Ser Thr Ala Tyr
        65                  70                  75                  80
        Met Gln Leu Ser Ser Leu Thr Ser Glu Asp Ser Ala Val Tyr Tyr Cys
                        85                  90                  95
        Ala Arg Ser Thr Tyr Tyr Gly Gly Asp Trp Tyr Phe Asn Val Trp Gly
                        100                 105                 110
        Ala Gly Thr Thr Val Thr Val Ser Ala Ala Ser Thr Lys Gly Pro Ser
                        115                 120                 125
        Val Phe Pro Leu Ala Pro Ser Ser Lys Ser Thr Ser Gly Gly Thr Ala
                        130                 135                 140
```

```
Ala Leu Gly Cys Leu Val Lys Asp Tyr Phe Pro Glu Pro Val Thr Val
145                 150                 155                 160

Ser Trp Asn Ser Gly Ala Leu Thr Ser Gly Val His Thr Phe Pro Ala
            165                 170                 175

Val Leu Gln Ser Ser Gly Leu Tyr Ser Leu Ser Ser Val Thr Val
            180                 185                 190

Pro Ser Ser Ser Leu Gly Thr Gln Thr Tyr Ile Cys Asn Val Asn His
            195                 200                 205

Lys Pro Ser Asn Thr Lys Val Asp Lys Lys Ala Glu Pro Lys Ser Cys
            210                 215                 220

Asp Lys Thr His Thr Cys Pro Pro Cys Pro Ala Pro Glu Leu Leu Gly
225                 230                 235                 240

Gly Pro Ser Val Phe Leu Phe Pro Pro Lys Pro Lys Asp Thr Leu Met
            245                 250                 255

Ile Ser Arg Thr Pro Glu Val Thr Cys Val Val Val Asp Val Ser His
            260                 265                 270

Glu Asp Pro Glu Val Lys Phe Asn Trp Tyr Val Asp Gly Val Glu Val
            275                 280                 285

His Asn Ala Lys Thr Lys Pro Arg Glu Glu Gln Tyr Asn Ser Thr Tyr
290                 295                 300

Arg Val Val Ser Val Leu Thr Val Leu His Gln Asp Trp Leu Asn Gly
305                 310                 315                 320

Lys Glu Tyr Lys Cys Lys Val Ser Asn Lys Ala Leu Pro Ala Pro Ile
            325                 330                 335

Glu Lys Thr Ile Ser Lys Ala Lys Gly Gln Pro Arg Glu Pro Gln Val
            340                 345                 350

Tyr Thr Leu Pro Pro Ser Arg Asp Glu Leu Thr Lys Asn Gln Val Ser
            355                 360                 365

Leu Thr Cys Leu Val Lys Gly Phe Tyr Pro Ser Asp Ile Ala Val Glu
            370                 375                 380

Trp Glu Ser Asn Gly Gln Pro Glu Asn Asn Tyr Lys Thr Thr Pro Pro
385                 390                 395                 400

Val Leu Asp Ser Asp Gly Ser Phe Phe Leu Tyr Ser Lys Leu Thr Val
            405                 410                 415

Asp Lys Ser Arg Trp Gln Gln Gly Asn Val Phe Ser Cys Ser Val Met
            420                 425                 430

His Glu Ala Leu His Asn His Tyr Thr Gln Lys Ser Leu Ser Leu Ser
            435                 440                 445

Pro Gly Lys
    450

<210> SEQ ID NO 56
<211> LENGTH: 218
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 56

Asp Ile Val Leu Thr Gln Ser Pro Ala Ser Leu Ala Val Ser Leu Gly
1               5                   10                  15

Gln Arg Ala Thr Ile Ser Cys Lys Ala Ser Gln Ser Val Asp Phe Asp
            20                  25                  30
```

```
Gly Asp Ser Tyr Met Asn Trp Tyr Gln Gln Lys Pro Gly Gln Pro Pro
            35                  40                  45

Lys Val Leu Ile Tyr Ala Ala Ser Asn Leu Glu Ser Gly Ile Pro Ala
 50                  55                  60

Arg Phe Ser Gly Ser Gly Ser Gly Thr Asp Phe Thr Leu Asn Ile His
 65                  70                  75                  80

Pro Val Glu Glu Glu Asp Ala Ala Thr Tyr Tyr Cys Gln Gln Ser Asn
                85                  90                  95

Glu Asp Pro Trp Thr Phe Gly Gly Gly Thr Lys Leu Glu Ile Lys Arg
            100                 105                 110

Thr Val Ala Ala Pro Ser Val Phe Ile Phe Pro Pro Ser Asp Glu Gln
            115                 120                 125

Leu Lys Ser Gly Thr Ala Ser Val Val Cys Leu Leu Asn Asn Phe Tyr
130                 135                 140

Pro Arg Glu Ala Lys Val Gln Trp Lys Val Asp Asn Ala Leu Gln Ser
145                 150                 155                 160

Gly Asn Ser Gln Glu Ser Val Thr Glu Gln Asp Ser Lys Asp Ser Thr
                165                 170                 175

Tyr Ser Leu Ser Ser Thr Leu Thr Leu Ser Lys Ala Asp Tyr Glu Lys
            180                 185                 190

His Lys Val Tyr Ala Cys Glu Val Thr His Gln Gly Leu Ser Ser Pro
            195                 200                 205

Val Thr Lys Ser Phe Asn Arg Gly Glu Cys
            210                 215

<210> SEQ ID NO 57
<211> LENGTH: 446
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 57

Gln Ile Gln Leu Gln Gln Ser Gly Pro Glu Val Val Lys Pro Gly Ala
 1               5                  10                  15

Ser Val Lys Ile Ser Cys Lys Ala Ser Gly Tyr Thr Phe Thr Asp Tyr
                20                  25                  30

Tyr Ile Thr Trp Val Lys Gln Lys Pro Gly Gln Gly Leu Glu Trp Ile
            35                  40                  45

Gly Trp Ile Tyr Pro Gly Ser Gly Asn Thr Lys Tyr Asn Glu Lys Phe
 50                  55                  60

Lys Gly Lys Ala Thr Leu Thr Val Asp Thr Ser Ser Ser Thr Ala Phe
 65                  70                  75                  80

Met Gln Leu Ser Ser Leu Thr Ser Glu Asp Thr Ala Val Tyr Phe Cys
                85                  90                  95

Ala Asn Tyr Gly Asn Tyr Trp Phe Ala Tyr Trp Gly Gln Gly Thr Gln
            100                 105                 110

Val Thr Val Ser Ala Ala Ser Thr Lys Gly Pro Ser Val Phe Pro Leu
            115                 120                 125

Ala Pro Ser Ser Lys Ser Thr Ser Gly Gly Thr Ala Ala Leu Gly Cys
            130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
```

```
            165                 170                 175
Ser Gly Leu Tyr Ser Leu Ser Ser Val Val Thr Val Pro Ser Ser Ser
            180                 185                 190

Leu Gly Thr Gln Thr Tyr Ile Cys Asn Val Asn His Lys Pro Ser Asn
            195                 200                 205

Thr Lys Val Asp Lys Lys Val Glu Pro Lys Ser Cys Asp Lys Thr His
        210                 215                 220

Thr Cys Pro Pro Cys Pro Ala Pro Glu Leu Leu Gly Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Val Asp Val Ser His Glu Asp Pro Glu
            260                 265                 270

Val Lys Phe Asn Trp Tyr Val Asp Gly Val Glu Val His Asn Ala Lys
            275                 280                 285

Thr Lys Pro Arg Glu Glu Gln Tyr Asn Ser Thr Tyr Arg Val Val Ser
        290                 295                 300

Val Leu Thr Val Leu His Gln Asp Trp Leu Asn Gly Lys Glu Tyr Lys
305                 310                 315                 320

Cys Lys Val Ser Asn Lys Ala Leu Pro Ala Pro Ile Glu Lys Thr Ile
                325                 330                 335

Ser Lys Ala Lys Gly Gln Pro Arg Glu Pro Gln Val Tyr Thr Leu Pro
            340                 345                 350

Pro Ser Arg Asp Glu Leu Thr Lys Asn Gln Val Ser Leu Thr Cys Leu
            355                 360                 365

Val Lys Gly Phe Tyr Pro Ser Asp Ile Ala Val Glu Trp Glu Ser Asn
        370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Lys Leu Thr Val Asp Lys Ser Arg
                405                 410                 415

Trp Gln Gln Gly Asn Val Phe Ser Cys Ser Val Met His Glu Ala Leu
            420                 425                 430

His Asn His Tyr Thr Gln Lys Ser Leu Ser Leu Ser Pro Gly
            435                 440                 445

<210> SEQ ID NO 58
<211> LENGTH: 214
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 58

Asp Ile Leu Leu Thr Gln Ser Pro Val Ile Leu Ser Val Ser Pro Gly
1               5                   10                  15

Glu Arg Val Ser Phe Ser Cys Arg Ala Ser Gln Ser Ile Gly Thr Asn
            20                  25                  30

Ile His Trp Tyr Gln Gln Arg Thr Asn Gly Ser Pro Arg Leu Leu Ile
        35                  40                  45

Lys Tyr Ala Ser Glu Ser Ile Ser Gly Ile Pro Ser Arg Phe Ser Gly
    50                  55                  60

Ser Gly Ser Gly Thr Asp Phe Thr Leu Ser Ile Asn Ser Val Glu Ser
65                  70                  75                  80
```

Glu Asp Ile Ala Asp Tyr Tyr Cys Gln Gln Asn Asn Asn Trp Pro Thr
                85                  90                  95

Thr Phe Gly Ala Gly Thr Lys Leu Glu Leu Lys Arg Thr Val Ala Ala
            100                 105                 110

Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210

<210> SEQ ID NO 59
<211> LENGTH: 449
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 59

Gln Val Gln Leu Lys Gln Ser Gly Pro Gly Leu Val Gln Pro Ser Gln
1               5                   10                  15

Ser Leu Ser Ile Thr Cys Thr Val Ser Gly Phe Ser Leu Thr Asn Tyr
            20                  25                  30

Gly Val His Trp Val Arg Gln Ser Pro Gly Lys Gly Leu Glu Trp Leu
        35                  40                  45

Gly Val Ile Trp Ser Gly Gly Asn Thr Asp Tyr Asn Thr Pro Phe Thr
    50                  55                  60

Ser Arg Leu Ser Ile Asn Lys Asp Asn Ser Lys Ser Gln Val Phe Phe
65                  70                  75                  80

Lys Met Asn Ser Leu Gln Ser Asn Asp Thr Ala Ile Tyr Tyr Cys Ala
                85                  90                  95

Arg Ala Leu Thr Tyr Tyr Asp Tyr Glu Phe Ala Tyr Trp Gly Gln Gly
            100                 105                 110

Thr Leu Val Thr Val Ser Ala Ala Ser Thr Lys Gly Pro Ser Val Phe
        115                 120                 125

Pro Leu Ala Pro Ser Ser Lys Ser Thr Ser Gly Gly Thr Ala Ala Leu
    130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
            180                 185                 190

Ser Ser Leu Gly Thr Gln Thr Tyr Ile Cys Asn Val Asn His Lys Pro
        195                 200                 205

```
Ser Asn Thr Lys Val Asp Lys Lys Val Glu Pro Lys Ser Cys Asp Lys
        210                 215                 220

Thr His Thr Cys Pro Pro Cys Pro Ala Pro Glu Leu Leu Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
                260                 265                 270

Pro Glu Val Lys Phe Asn Trp Tyr Val Asp Gly Val Glu Val His Asn
                275                 280                 285

Ala Lys Thr Lys Pro Arg Glu Glu Gln Tyr Asn Ser Thr Tyr Arg Val
290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335

Thr Ile Ser Lys Ala Lys Gly Gln Pro Arg Glu Pro Gln Val Tyr Thr
                340                 345                 350

Leu Pro Pro Ser Arg Asp Glu Leu Thr Lys Asn Gln Val Ser Leu Thr
                355                 360                 365

Cys Leu Val Lys Gly Phe Tyr Pro Ser Asp Ile Ala Val Glu Trp Glu
370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
                420                 425                 430

Ala Leu His Asn His Tyr Thr Gln Lys Ser Leu Ser Leu Ser Pro Gly
                435                 440                 445

Lys

<210> SEQ ID NO 60
<211> LENGTH: 214
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 60

Asp Ile Gln Met Thr Gln Ser Pro Ser Ser Leu Ser Ala Ser Val Gly
1               5                   10                  15

Asp Arg Val Thr Ile Thr Cys Gln Ala Ser Gln Asp Ile Ser Asn Tyr
                20                  25                  30

Leu Asn Trp Tyr Gln Gln Lys Pro Gly Lys Ala Pro Lys Leu Leu Ile
                35                  40                  45

Tyr Asp Ala Ser Asn Leu Glu Thr Gly Val Pro Ser Arg Phe Ser Gly
            50                  55                  60

Ser Gly Ser Gly Thr Asp Phe Thr Phe Thr Ile Ser Ser Leu Gln Pro
65                  70                  75                  80

Glu Asp Ile Ala Thr Tyr Phe Cys Gln His Phe Asp His Leu Pro Leu
                85                  90                  95

Ala Phe Gly Gly Gly Thr Lys Val Glu Ile Lys Arg Thr Val Ala Ala
                100                 105                 110
```

```
Pro Ser Val Phe Ile Phe Pro Pro Ser Asp Glu Gln Leu Lys Ser Gly
        115                 120                 125

Thr Ala Ser Val Val Cys Leu Leu Asn Asn Phe Tyr Pro Arg Glu Ala
    130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
                165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
        195                 200                 205

Phe Asn Arg Gly Glu Cys
    210
```

<210> SEQ ID NO 61
<211> LENGTH: 385
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 61

```
Gly His Ile Tyr Tyr Ser Gly Asn Thr Asn Tyr Asn Pro Ser Leu Lys
1               5                   10                  15

Ser Arg Leu Thr Ile Ser Ile Asp Thr Ser Lys Thr Gln Phe Ser Leu
            20                  25                  30

Lys Leu Ser Ser Val Thr Ala Ala Asp Thr Ala Ile Tyr Tyr Cys Val
        35                  40                  45

Arg Asp Arg Val Thr Gly Ala Phe Asp Ile Trp Gly Gln Gly Thr Met
    50                  55                  60

Val Thr Val Ser Ser Ala Ser Thr Lys Gly Pro Ser Val Phe Pro Leu
65                  70                  75                  80

Ala Pro Cys Ser Arg Ser Thr Ser Glu Ser Thr Ala Ala Leu Gly Cys
                85                  90                  95

Leu Val Lys Asp Tyr Phe Pro Glu Pro Val Thr Val Ser Trp Asn Ser
            100                 105                 110

Gly Ala Leu Thr Ser Gly Val His Thr Phe Pro Ala Val Leu Gln Ser
        115                 120                 125

Ser Gly Leu Tyr Ser Leu Ser Ser Val Val Thr Val Pro Ser Ser Asn
    130                 135                 140

Phe Gly Thr Gln Thr Tyr Thr Cys Asn Val Asp His Lys Pro Ser Asn
145                 150                 155                 160

Thr Lys Val Asp Glu Arg Lys Cys Cys Val Glu Cys Pro Ala Gly Pro
                165                 170                 175

Ser Val Phe Leu Phe Pro Pro Lys Pro Lys Asp Thr Leu Met Ile Ser
            180                 185                 190

Arg Thr Pro Glu Val Thr Cys Val Val Val Asp Val Ser His Glu Asp
        195                 200                 205

Pro Glu Val Gln Phe Asn Trp Tyr Val Asp Gly Val Glu Val His Asn
    210                 215                 220

Ala Lys Thr Lys Pro Arg Glu Glu Gln Phe Asn Ser Thr Phe Arg Val
225                 230                 235                 240
```

```
Val Ser Val Leu Thr Val His Gln Asp Trp Leu Asn Gly Lys Glu
            245                 250                 255

Tyr Lys Cys Lys Val Ser Asn Lys Gly Leu Pro Ala Pro Ile Glu Lys
        260                 265                 270

Thr Ile Ser Lys Thr Lys Gly Gln Pro Arg Glu Pro Gln Val Tyr Thr
        275                 280                 285

Leu Pro Pro Ser Arg Glu Glu Met Thr Lys Asn Gln Val Ser Leu Thr
        290                 295                 300

Cys Leu Val Lys Gly Phe Tyr Pro Ser Asp Ile Ala Val Glu Trp Glu
305                 310                 315                 320

Ser Asn Gly Gln Pro Glu Asn Asn Tyr Lys Thr Thr Pro Pro Met Leu
                325                 330                 335

Asp Ser Asp Gly Ser Phe Phe Leu Tyr Ser Lys Leu Thr Val Asp Lys
                340                 345                 350

Ser Arg Trp Gln Gln Gly Asn Val Phe Ser Cys Ser Val Met His Glu
                355                 360                 365

Ala Leu His Asn His Tyr Thr Gln Lys Ser Leu Ser Leu Ser Pro Gly
        370                 375                 380

Lys
385

<210> SEQ ID NO 62
<211> LENGTH: 219
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 62

Asp Ile Val Met Thr Gln Ala Ala Pro Ser Val Pro Val Thr Pro Gly
1               5                   10                  15

Glu Ser Val Ser Ile Ser Cys Arg Ser Ser Lys Ser Leu Leu His Ser
            20                  25                  30

Asn Gly Asn Thr Tyr Leu Tyr Trp Phe Leu Gln Arg Pro Gly Gln Ser
        35                  40                  45

Pro Gln Val Leu Ile Tyr Arg Met Ser Asn Leu Ala Ser Gly Val Pro
    50                  55                  60

Asp Arg Phe Ser Gly Ser Gly Ser Gly Thr Ala Phe Thr Leu Arg Ile
65                  70                  75                  80

Arg Arg Val Glu Ala Glu Asp Val Gly Val Tyr Tyr Cys Met Gln Asn
                85                  90                  95

Leu Glu Tyr Pro Phe Thr Phe Gly Gly Gly Thr Lys Leu Glu Ile Lys
            100                 105                 110

Arg Thr Val Ala Ala Pro Ser Val Phe Ile Phe Pro Pro Ser Asp Glu
        115                 120                 125

Gln Leu Lys Ser Gly Thr Ala Ser Val Val Cys Leu Leu Asn Asn Phe
    130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
```

-continued

```
                195                 200                 205
Pro Val Thr Lys Ser Phe Asn Arg Gly Glu Cys
    210                 215

<210> SEQ ID NO 63
<211> LENGTH: 444
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 63

Gln Val Gln Leu Gln Gln Ser Gly Pro Glu Leu Val Lys Ser Gly Ala
1               5                   10                  15

Ser Val Lys Met Ser Cys Lys Ala Ser Gly Asn Thr Leu Lys Asp Asp
            20                  25                  30

His Val His Trp Val Lys Gln Arg Pro Gly Gln Gly Leu Glu Trp Ile
        35                  40                  45

Gly Trp Ile Tyr Pro Gly Gly Arg Thr Arg Tyr Asn Glu Lys Phe
    50                  55                  60

Lys Gly Lys Thr Thr Leu Thr Ala Asp Lys Pro Ser Ser Thr Val Asn
65                  70                  75                  80

Met Leu Leu Ser Ser Leu Thr Ser Glu Asp Ser Ala Ile Tyr Phe Cys
                85                  90                  95

Thr Asn Leu Val Phe Asp Val Trp Gly Ala Gly Thr Thr Val Thr Val
            100                 105                 110

Ser Ser Ala Ser Thr Lys Gly Pro Ser Val Phe Pro Leu Ala Pro Ser
        115                 120                 125

Ser Lys Ser Thr Ser Gly Gly Thr Ala Ala Leu Gly Cys Leu Val Lys
    130                 135                 140

Asp Tyr Phe Pro Glu Pro Val Thr Val Ser Trp Asn Ser Gly Ala Leu
145                 150                 155                 160

Thr Ser Gly Val His Thr Phe Pro Ala Val Leu Gln Ser Ser Gly Leu
                165                 170                 175

Tyr Ser Leu Ser Ser Val Val Thr Val Pro Ser Ser Ser Leu Gly Thr
            180                 185                 190

Gln Thr Tyr Ile Cys Asn Val Asn His Lys Pro Ser Asn Thr Lys Val
        195                 200                 205

Asp Lys Lys Val Glu Pro Lys Ser Cys Asp Lys Thr His Thr Cys Pro
    210                 215                 220

Pro Cys Pro Ala Pro Glu Leu Leu Gly Gly Pro Ser Val Phe Leu Phe
225                 230                 235                 240

Pro Pro Lys Pro Lys Asp Thr Leu Met Ile Ser Arg Thr Pro Glu Val
                245                 250                 255

Thr Cys Val Val Val Asp Val Ser His Glu Asp Pro Glu Val Lys Phe
            260                 265                 270

Asn Trp Tyr Val Asp Gly Val Glu Val His Asn Ala Lys Thr Lys Pro
        275                 280                 285

Arg Glu Glu Gln Tyr Asn Ser Thr Tyr Arg Val Val Ser Val Leu Thr
    290                 295                 300

Val Leu His Gln Asp Trp Leu Asn Gly Lys Glu Tyr Lys Cys Lys Val
305                 310                 315                 320

Ser Asn Lys Ala Leu Pro Ala Pro Ile Glu Lys Thr Ile Ser Lys Ala
                325                 330                 335
```

```
Lys Gly Gln Pro Arg Glu Pro Gln Val Tyr Thr Leu Pro Pro Ser Arg
            340                 345                 350

Glu Glu Met Thr Lys Asn Gln Val Ser Leu Thr Cys Leu Val Lys Gly
            355                 360                 365

Phe Tyr Pro Ser Asp Ile Ala Val Glu Trp Glu Ser Asn Gly Gln Pro
            370                 375                 380

Glu Asn Asn Tyr Lys Thr Thr Pro Pro Val Leu Asp Ser Asp Gly Ser
385                 390                 395                 400

Phe Phe Leu Tyr Ser Lys Leu Thr Val Asp Lys Ser Arg Trp Gln Gln
                405                 410                 415

Gly Asn Val Phe Ser Cys Ser Val Met His Glu Ala Leu His Asn His
            420                 425                 430

Tyr Thr Gln Lys Ser Leu Ser Leu Ser Pro Gly Lys
            435                 440
```

<210> SEQ ID NO 64
<211> LENGTH: 219
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 64

```
Asp Val Val Met Thr Gln Ser Pro Leu Ser Leu Pro Val Thr Pro Gly
1               5                   10                  15

Glu Pro Ala Ser Ile Ser Cys Arg Ser Ser Gln Ser Leu Val His Ser
            20                  25                  30

Asn Ala Asn Thr Tyr Leu His Trp Tyr Leu Gln Lys Pro Gly Gln Ser
            35                  40                  45

Pro Gln Leu Leu Ile Tyr Lys Val Ser Asn Arg Phe Ser Gly Val Pro
        50                  55                  60

Asp Arg Phe Ser Gly Ser Gly Ser Gly Thr Asp Phe Thr Leu Lys Ile
65                  70                  75                  80

Ser Arg Val Glu Ala Glu Asp Val Gly Val Tyr Tyr Cys Ser Gln Asn
                85                  90                  95

Thr His Val Pro Pro Thr Phe Gly Gln Gly Thr Lys Leu Glu Ile Lys
            100                 105                 110

Arg Thr Val Ala Ala Pro Ser Val Phe Ile Phe Pro Pro Ser Asp Glu
            115                 120                 125

Gln Leu Lys Ser Gly Thr Ala Ser Val Val Cys Leu Leu Asn Asn Phe
        130                 135                 140

Tyr Pro Arg Glu Ala Lys Val Gln Trp Lys Val Asp Asn Ala Leu Gln
145                 150                 155                 160

Ser Gly Asn Ser Gln Glu Ser Val Thr Glu Gln Asp Ser Lys Asp Ser
                165                 170                 175

Thr Tyr Ser Leu Ser Ser Thr Leu Thr Leu Ser Lys Ala Asp Tyr Glu
            180                 185                 190

Lys His Lys Val Tyr Ala Cys Glu Val Thr His Gln Gly Leu Ser Ser
            195                 200                 205

Pro Val Thr Lys Ser Phe Asn Arg Gly Glu Cys
        210                 215
```

<210> SEQ ID NO 65
<211> LENGTH: 445

-continued

```
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 65
```

| | | | | | | | | | | | | | | | |
|---|---|---|---|---|---|---|---|---|---|---|---|---|---|---|---|
| Gln | Val | Gln | Leu | Val | Gln | Ser | Gly | Ala | Glu | Val | Lys | Lys | Pro | Gly | Ala |
| 1 | | | | 5 | | | | | 10 | | | | | 15 | |
| Ser | Val | Lys | Val | Ser | Cys | Lys | Ala | Ser | Gly | Tyr | Thr | Phe | Thr | Asp | Tyr |
| | | | 20 | | | | | 25 | | | | | 30 | | |
| Glu | Met | His | Trp | Val | Arg | Gln | Ala | Pro | Gly | Gln | Gly | Leu | Glu | Trp | Met |
| | | 35 | | | | | 40 | | | | | 45 | | | |
| Gly | Ala | Leu | Asp | Pro | Lys | Thr | Gly | Asp | Thr | Ala | Tyr | Ser | Gln | Lys | Phe |
| 50 | | | | | 55 | | | | | 60 | | | | | |
| Lys | Gly | Arg | Val | Thr | Leu | Thr | Ala | Asp | Lys | Ser | Ser | Thr | Ala | Tyr | |
| 65 | | | | 70 | | | | | 75 | | | | | 80 | |
| Met | Glu | Leu | Ser | Ser | Leu | Thr | Ser | Glu | Asp | Thr | Ala | Val | Tyr | Tyr | Cys |
| | | | | 85 | | | | | 90 | | | | | 95 | |
| Thr | Arg | Phe | Tyr | Ser | Tyr | Thr | Tyr | Trp | Gly | Gln | Gly | Thr | Leu | Val | Thr |
| | | | 100 | | | | | 105 | | | | | 110 | | |
| Val | Ser | Ser | Ala | Ser | Thr | Lys | Gly | Pro | Ser | Val | Phe | Pro | Leu | Ala | Pro |
| | | 115 | | | | | 120 | | | | | 125 | | | |
| Ser | Ser | Lys | Ser | Thr | Ser | Gly | Gly | Thr | Ala | Ala | Leu | Gly | Cys | Leu | Val |
| 130 | | | | | 135 | | | | | 140 | | | | | |
| Lys | Asp | Tyr | Phe | Pro | Glu | Pro | Val | Thr | Val | Ser | Trp | Asn | Ser | Gly | Ala |
| 145 | | | | | 150 | | | | | 155 | | | | | 160 |
| Leu | Thr | Ser | Gly | Val | His | Thr | Phe | Pro | Ala | Val | Leu | Gln | Ser | Ser | Gly |
| | | | | 165 | | | | | 170 | | | | | 175 | |
| Leu | Tyr | Ser | Leu | Ser | Ser | Val | Val | Thr | Val | Pro | Ser | Ser | Ser | Leu | Gly |
| | | | 180 | | | | | 185 | | | | | 190 | | |
| Thr | Gln | Thr | Tyr | Ile | Cys | Asn | Val | Asn | His | Lys | Pro | Ser | Asn | Thr | Lys |
| | | | 195 | | | | | 200 | | | | | 205 | | |
| Val | Asp | Lys | Lys | Val | Glu | Pro | Lys | Ser | Cys | Asp | Lys | Thr | His | Thr | Cys |
| 210 | | | | | 215 | | | | | 220 | | | | | |
| Pro | Pro | Cys | Pro | Ala | Pro | Glu | Leu | Leu | Gly | Gly | Pro | Ser | Val | Phe | Leu |
| 225 | | | | | 230 | | | | | 235 | | | | | 240 |
| Phe | Pro | Pro | Lys | Pro | Lys | Asp | Thr | Leu | Met | Ile | Ser | Arg | Thr | Pro | Glu |
| | | | | 245 | | | | | 250 | | | | | 255 | |
| Val | Thr | Cys | Val | Val | Val | Asp | Val | Ser | His | Glu | Asp | Pro | Glu | Val | Lys |
| | | | 260 | | | | | 265 | | | | | 270 | | |
| Phe | Asn | Trp | Tyr | Val | Asp | Gly | Val | Glu | Val | His | Asn | Ala | Lys | Thr | Lys |
| | | | 275 | | | | | 280 | | | | | 285 | | |
| Pro | Arg | Glu | Glu | Gln | Tyr | Asn | Ser | Thr | Tyr | Arg | Val | Val | Ser | Val | Leu |
| | | 290 | | | | | 295 | | | | | 300 | | | |
| Thr | Val | Leu | His | Gln | Asp | Trp | Leu | Asn | Gly | Lys | Glu | Tyr | Lys | Cys | Lys |
| 305 | | | | | 310 | | | | | 315 | | | | | 320 |
| Val | Ser | Asn | Lys | Ala | Leu | Pro | Ala | Pro | Ile | Glu | Lys | Thr | Ile | Ser | Lys |
| | | | | 325 | | | | | 330 | | | | | 335 | |
| Ala | Lys | Gly | Gln | Pro | Arg | Glu | Pro | Gln | Val | Tyr | Thr | Leu | Pro | Pro | Ser |
| | | | 340 | | | | | 345 | | | | | 350 | | |
| Arg | Glu | Glu | Met | Thr | Lys | Asn | Gln | Val | Ser | Leu | Thr | Cys | Leu | Val | Lys |
| | | | 355 | | | | | 360 | | | | | 365 | | |
| Gly | Phe | Tyr | Pro | Ser | Asp | Ile | Ala | Val | Glu | Trp | Glu | Ser | Asn | Gly | Gln |

```
                370                 375                 380
Pro Glu Asn Asn Tyr Lys Thr Thr Pro Val Leu Asp Ser Asp Gly
385                 390                 395                 400

Ser Phe Phe Leu Tyr Ser Lys Leu Thr Val Asp Lys Ser Arg Trp Gln
                405                 410                 415

Gln Gly Asn Val Phe Ser Cys Ser Val Met His Glu Ala Leu His Asn
                420                 425                 430

His Tyr Thr Gln Lys Ser Leu Ser Leu Ser Pro Gly Lys
                435                 440                 445

<210> SEQ ID NO 66
<211> LENGTH: 220
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 66

Asp Ile Val Met Thr Gln Ser Pro Ser Ser Leu Thr Val Thr Ala Gly
1               5                   10                  15

Glu Lys Val Thr Met Ser Cys Lys Ser Ser Gln Ser Leu Leu Asn Ser
                20                  25                  30

Gly Asn Gln Lys Asn Tyr Leu Thr Trp Tyr Gln Gln Lys Pro Gly Gln
            35                  40                  45

Pro Pro Lys Leu Leu Ile Tyr Trp Ala Ser Thr Arg Glu Ser Gly Val
        50                  55                  60

Pro Asp Arg Phe Thr Gly Ser Gly Ser Gly Thr Asp Phe Thr Leu Thr
65                  70                  75                  80

Ile Ser Ser Val Gln Ala Glu Asp Leu Ala Val Tyr Tyr Cys Gln Asn
                85                  90                  95

Asp Tyr Ser Tyr Pro Phe Thr Phe Gly Ser Gly Thr Lys Leu Glu Ile
                100                 105                 110

Lys Arg Thr Val Ala Ala Pro Ser Val Phe Ile Phe Pro Pro Ser Asp
            115                 120                 125

Glu Gln Leu Lys Ser Gly Thr Ala Ser Val Val Cys Leu Leu Asn Asn
        130                 135                 140

Phe Tyr Pro Arg Glu Ala Lys Val Gln Trp Lys Val Asp Asn Ala Leu
145                 150                 155                 160

Gln Ser Gly Asn Ser Gln Glu Ser Val Thr Glu Gln Asp Ser Lys Asp
                165                 170                 175

Ser Thr Tyr Ser Leu Ser Ser Thr Leu Thr Leu Ser Lys Ala Asp Tyr
                180                 185                 190

Glu Lys His Lys Val Tyr Ala Cys Glu Val Thr His Gln Gly Leu Ser
            195                 200                 205

Ser Pro Val Thr Lys Ser Phe Asn Arg Gly Glu Cys
        210                 215                 220

<210> SEQ ID NO 67
<211> LENGTH: 448
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 67
```

```
Gln Val Gln Leu Gln Gln Pro Gly Ala Glu Leu Val Arg Pro Gly Ala
1               5                   10                  15

Ser Val Lys Leu Ser Cys Lys Ala Ser Gly Tyr Thr Phe Thr Ser Tyr
            20                  25                  30

Trp Ile Asn Trp Val Lys Gln Arg Pro Gly Gln Gly Leu Glu Trp Ile
            35                  40                  45

Gly Asn Ile Tyr Pro Ser Asp Ser Tyr Thr Asn Tyr Asn Gln Lys Phe
        50                  55                  60

Lys Asp Lys Ala Thr Leu Thr Val Asp Lys Ser Ser Thr Ala Tyr
65              70                  75                  80

Met Gln Leu Ser Ser Pro Thr Ser Glu Asp Ser Ala Val Tyr Tyr Cys
                85                  90                  95

Thr Arg Ser Trp Arg Gly Asn Ser Phe Asp Tyr Trp Gly Gln Gly Thr
                100                 105                 110

Thr Leu Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
        130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
                180                 185                 190

Ser Leu Gly Thr Gln Thr Tyr Ile Cys Asn Val Asn His Lys Pro Ser
                195                 200                 205

Asn Thr Lys Val Asp Lys Lys Val Glu Pro Lys Ser Cys Asp Lys Thr
        210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Asp Val Ser His Glu Asp Pro
                260                 265                 270

Glu Val Lys Phe Asn Trp Tyr Val Asp Gly Val Glu Val His Asn Ala
                275                 280                 285

Lys Thr Lys Pro Arg Glu Glu Gln Tyr Asn Ser Thr Tyr Arg Val Val
        290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
                340                 345                 350

Pro Pro Ser Arg Asp Glu Leu Thr Lys Asn Gln Val Ser Leu Thr Cys
                355                 360                 365

Leu Val Lys Gly Phe Tyr Pro Ser Asp Ile Ala Val Glu Trp Glu Ser
        370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415
```

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly Lys
        435                 440                 445

<210> SEQ ID NO 68
<211> LENGTH: 11
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 68

Lys Ala Ser Gln Asp Val Ser Ile Ala Val Ala
1               5                   10

<210> SEQ ID NO 69
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 69

Ser Ala Ser Tyr Arg Tyr Thr
1               5

<210> SEQ ID NO 70
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 70

Gln Gln His Tyr Ile Thr Pro Leu Thr
1               5

<210> SEQ ID NO 71
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 71

Asn Tyr Gly Met Asn
1               5

<210> SEQ ID NO 72
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 72

Trp Ile Asn Thr Tyr Thr Gly Glu Pro Thr Tyr Thr Asp Asp Phe Lys

```
1               5                   10                  15

Gly

<210> SEQ ID NO 73
<211> LENGTH: 12
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 73

Gly Gly Phe Gly Ser Ser Tyr Trp Tyr Phe Asp Val
1               5                   10

<210> SEQ ID NO 74
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 74

Ser Ala Ser Ser Ser Val Ser Tyr Met His
1               5                   10

<210> SEQ ID NO 75
<211> LENGTH: 7
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 75

Asp Thr Ser Lys Leu Ala Ser
1               5

<210> SEQ ID NO 76
<211> LENGTH: 9
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 76

Gln Gln Trp Ser Gly Tyr Pro Leu Thr
1               5

<210> SEQ ID NO 77
<211> LENGTH: 5
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"

<400> SEQUENCE: 77

Gly Tyr Thr Met Asn
1               5
```

<210> SEQ ID NO 78
<211> LENGTH: 17
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 78

Leu Ile Thr Pro Tyr Asn Gly Ala Ser Ser Tyr Asn Gln Lys Phe Arg
1               5                   10                  15
Gly

<210> SEQ ID NO 79
<211> LENGTH: 10
<212> TYPE: PRT
<213> ORGANISM: Artificial Sequence
<220> FEATURE:
<221> NAME/KEY: source
<223> OTHER INFORMATION: /note="Description of Artificial Sequence: Synthetic peptide"

<400> SEQUENCE: 79

Gly Gly Tyr Asp Gly Arg Gly Phe Asp Tyr
1               5                   10

<210> SEQ ID NO 80
<211> LENGTH: 213
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 80

Gln Ile Val Leu Thr Gln Ser Pro Ala Thr Leu Ser Leu Ser Pro Gly
1               5                   10                  15

Glu Arg Ala Thr Leu Ser Cys Ser Ala Ser Ser Gly Val Asn Phe Met
            20                  25                  30

His Trp Tyr Gln Gln Lys Pro Gly Gln Ala Pro Arg Arg Leu Ile Phe
        35                  40                  45

Asp Thr Ser Lys Leu Ala Ser Gly Ile Pro Ala Arg Phe Ser Gly Ser
    50                  55                  60

Gly Ser Gly Thr Asp Tyr Thr Leu Thr Ile Ser Ser Leu Glu Pro Glu
65                  70                  75                  80

Asp Phe Ala Val Tyr Tyr Cys Gln Gln Trp Ser Phe Asn Pro Pro Thr
                85                  90                  95

Phe Gly Gln Gly Thr Lys Val Glu Ile Lys Arg Thr Val Ala Ala Pro
            100                 105                 110

Ser Val Phe Ile Phe Pro Pro Ser Asp Glu Gln Leu Lys Ser Gly Thr
        115                 120                 125

Ala Ser Val Val Cys Leu Leu Asn Asn Phe Tyr Pro Arg Glu Ala Lys
    130                 135                 140

Val Gln Trp Lys Val Asp Asn Ala Leu Gln Ser Gly Asn Ser Gln Glu
145                 150                 155                 160

Ser Val Thr Glu Gln Asp Ser Lys Asp Ser Thr Tyr Ser Leu Ser Ser
                165                 170                 175

Thr Leu Thr Leu Ser Lys Ala Asp Tyr Glu Lys His Lys Val Tyr Ala
            180                 185                 190

```
Cys Glu Val Thr His Gln Gly Leu Ser Ser Pro Val Thr Lys Ser Phe
        195                 200                 205

Asn Arg Gly Glu Cys
    210

<210> SEQ ID NO 81
<211> LENGTH: 213
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 81

Gln Ile Val Leu Thr Gln Ser Pro Ala Thr Leu Ser Leu Ser Pro Gly
1               5                   10                  15

Glu Arg Ala Thr Leu Ser Cys Ser Ala Ser Ser Gly Val Asn Phe Met
            20                  25                  30

His Trp Tyr Gln Gln Lys Pro Gly Gln Ala Pro Lys Arg Leu Ile Phe
        35                  40                  45

Asp Thr Ser Lys Leu Ala Ser Gly Val Pro Ala Arg Phe Ser Gly Ser
    50                  55                  60

Gly Ser Gly Thr Asp Tyr Thr Leu Thr Ile Ser Ser Leu Glu Pro Glu
65                  70                  75                  80

Asp Phe Ala Val Tyr Tyr Cys Gln Gln Trp Ser Phe Asn Pro Pro Thr
                85                  90                  95

Phe Gly Gln Gly Thr Lys Val Glu Ile Lys Arg Thr Val Ala Ala Pro
            100                 105                 110

Ser Val Phe Ile Phe Pro Pro Ser Asp Glu Gln Leu Lys Ser Gly Thr
        115                 120                 125

Ala Ser Val Val Cys Leu Leu Asn Asn Phe Tyr Pro Arg Glu Ala Lys
    130                 135                 140

Val Gln Trp Lys Val Asp Asn Ala Leu Gln Ser Gly Asn Ser Gln Glu
145                 150                 155                 160

Ser Val Thr Glu Gln Asp Ser Lys Asp Ser Thr Tyr Ser Leu Ser Ser
                165                 170                 175

Thr Leu Thr Leu Ser Lys Ala Asp Tyr Glu Lys His Lys Val Tyr Ala
            180                 185                 190

Cys Glu Val Thr His Gln Gly Leu Ser Ser Pro Val Thr Lys Ser Phe
        195                 200                 205

Asn Arg Gly Glu Cys
    210

<210> SEQ ID NO 82
<211> LENGTH: 447
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 82

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Thr Phe Thr Asn Asn
            20                  25                  30
```

-continued

Gly Ile Asn Trp Leu Arg Gln Ala Pro Gly Gln Gly Leu Glu Trp Met
                35                  40                  45

Gly Glu Ile Tyr Pro Arg Ser Thr Asn Thr Leu Tyr Ala Gln Lys Phe
 50                  55                  60

Gln Gly Arg Val Thr Ile Thr Ala Asp Arg Ser Ser Asn Thr Ala Tyr
65                   70                  75                  80

Met Glu Leu Ser Ser Leu Arg Ser Glu Asp Thr Ala Val Tyr Phe Cys
                 85                  90                  95

Ala Arg Thr Leu Thr Ala Pro Phe Ala Phe Trp Gly Gln Gly Thr Leu
                100                 105                 110

Val Thr Val Ser Ser Ala Ser Thr Lys Gly Pro Ser Val Phe Pro Leu
                115                 120                 125

Ala Pro Ser Ser Lys Ser Thr Ser Gly Gly Thr Ala Ala Leu Gly Cys
            130                 135                 140

Leu Val Lys Asp Tyr Phe Pro Glu Pro Val Thr Val Ser Trp Asn Ser
145                 150                 155                 160

Gly Ala Leu Thr Ser Gly Val His Thr Phe Pro Ala Val Leu Gln Ser
                165                 170                 175

Ser Gly Leu Tyr Ser Leu Ser Ser Val Val Thr Val Pro Ser Ser Ser
                180                 185                 190

Leu Gly Thr Gln Thr Tyr Ile Cys Asn Val Asn His Lys Pro Ser Asn
                195                 200                 205

Thr Lys Val Asp Lys Lys Val Glu Pro Lys Ser Cys Asp Lys Thr His
            210                 215                 220

Thr Cys Pro Pro Cys Pro Ala Pro Glu Leu Leu Gly Gly Pro Ser Val
225                 230                 235                 240

Phe Leu Phe Pro Pro Lys Pro Lys Asp Thr Leu Met Ile Ser Arg Thr
                245                 250                 255

Pro Glu Val Thr Cys Val Val Val Asp Val Ser His Glu Asp Pro Glu
                260                 265                 270

Val Lys Phe Asn Trp Tyr Val Asp Gly Val Glu Val His Asn Ala Lys
            275                 280                 285

Thr Lys Pro Arg Glu Glu Gln Tyr Asn Ser Thr Tyr Arg Val Val Ser
            290                 295                 300

Val Leu Thr Val Leu His Gln Asp Trp Leu Asn Gly Lys Glu Tyr Lys
305                 310                 315                 320

Cys Lys Val Ser Asn Lys Ala Leu Pro Ala Pro Ile Glu Lys Thr Ile
                325                 330                 335

Ser Lys Ala Lys Gly Gln Pro Arg Glu Pro Gln Val Tyr Thr Leu Pro
            340                 345                 350

Pro Ser Arg Asp Glu Leu Thr Lys Asn Gln Val Ser Leu Thr Cys Leu
            355                 360                 365

Val Lys Gly Phe Tyr Pro Ser Asp Ile Ala Val Glu Trp Glu Ser Asn
            370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Lys Leu Thr Val Asp Lys Ser Arg
                405                 410                 415

Trp Gln Gln Gly Asn Val Phe Ser Cys Ser Val Met His Glu Ala Leu
                420                 425                 430

His Asn His Tyr Thr Gln Lys Ser Leu Ser Leu Ser Pro Gly Lys
            435                 440                 445

<210> SEQ ID NO 83
<211> LENGTH: 113
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 83

Asp Ile Val Met Thr Gln Ser Pro Asp Ser Leu Ala Val Ser Leu Gly
1               5                   10                  15

Glu Arg Ala Thr Ile Asn Cys Lys Ser Ser Gln Ser Leu Leu Tyr Ser
            20                  25                  30

Arg Asn Gln Lys Asn Tyr Leu Ala Trp Tyr Gln Gln Lys Pro Gly Gln
        35                  40                  45

Pro Pro Lys Leu Leu Ile Phe Trp Ala Ser Thr Arg Glu Ser Gly Val
    50                  55                  60

Pro Asp Arg Phe Ser Gly Ser Gly Phe Gly Thr Asp Phe Thr Leu Thr
65                  70                  75                  80

Ile Ser Ser Leu Gln Ala Glu Asp Val Ala Val Tyr Tyr Cys Gln Gln
                85                  90                  95

Tyr Phe Ser Tyr Pro Leu Thr Phe Gly Gln Gly Thr Lys Val Glu Ile
            100                 105                 110

Lys

<210> SEQ ID NO 84
<211> LENGTH: 124
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 84

Gln Val Gln Leu Val Gln Ser Gly Ala Glu Val Lys Lys Pro Gly Ala
1               5                   10                  15

Ser Val Lys Val Ser Cys Lys Thr Ser Arg Tyr Thr Phe Thr Glu Tyr
            20                  25                  30

Thr Ile His Trp Val Arg Gln Ala Pro Gly Gln Arg Leu Glu Trp Ile
        35                  40                  45

Gly Gly Ile Asn Pro Asn Asn Gly Ile Pro Asn Tyr Asn Gln Lys Phe
    50                  55                  60

Lys Gly Arg Val Thr Ile Thr Val Asp Thr Ser Ala Ser Thr Ala Tyr
65                  70                  75                  80

Met Glu Leu Ser Ser Leu Arg Ser Glu Asp Thr Ala Val Tyr Tyr Cys
                85                  90                  95

Ala Arg Arg Ile Ala Tyr Gly Tyr Asp Glu Gly His Ala Met Asp
            100                 105                 110

Tyr Trp Gly Gln Gly Thr Leu Val Thr Val Ser Ser
            115                 120

<210> SEQ ID NO 85
<211> LENGTH: 120
<212> TYPE: PRT
<213> ORGANISM: Artificial Sequence
<220> FEATURE:
<221> NAME/KEY: source
<223> OTHER INFORMATION: /note="Description of Artificial Sequence: Synthetic polypeptide"

<400> SEQUENCE: 85

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Gly Tyr
            20                  25                  30

Tyr Met His Trp Val Lys Gln Ser Pro Gly Gln Gly Leu Glu Trp Ile
        35                  40                  45

Gly Arg Ile Asn Pro Asn Asn Gly Val Thr Leu Tyr Asn Gln Lys Phe
    50                  55                  60

Lys Asp Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Ser Thr Met Ile Thr Asn Tyr Val Met Asp Tyr Trp Gly Gln
            100                 105                 110

Gly Thr Leu Trp Thr Val Ser Ser
        115                 120

<210> SEQ ID NO 86
<211> LENGTH: 120
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 86

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Gly Tyr
            20                  25                  30

Tyr Met His Trp Val Arg Gln Ala Pro Gly Gln Gly Leu Glu Trp Met
        35                  40                  45

Gly Arg Ile Asn Pro Asn Asn Gly Val Thr Leu Tyr Asn Gln Lys Phe
    50                  55                  60

Lys Asp Arg Val Thr Met Thr Arg Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Ala Arg Ser Thr Met Ile Thr Asn Tyr Val Met Asp Tyr Trp Gly Gln
            100                 105                 110

Gly Thr Leu Val Thr Val Ser Ser
        115                 120

<210> SEQ ID NO 87
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 87

Asp Ile Val Met Thr Gln Ser Pro Asp Ser Leu Ala Val Ser Leu Gly
1               5                   10                  15

Glu Arg Ala Thr Ile Asn Cys Lys Ala Ser Gln Ser Val Ser Asn Asp

```
                    20                  25                  30

Val Ala Trp Tyr Gln Gln Lys Pro Gly Gln Ser Pro Lys Leu Leu Ile
            35                  40                  45

Ser Tyr Thr Ser Ser Arg Tyr Ala Gly Val Pro Asp Arg Phe Ser Gly
        50                  55                  60

Ser Gly Ser Gly Thr Asp Phe Thr Leu Thr Ile Ser Ser Leu Gln Ala
65                  70                  75                  80

Glu Asp Val Ala Val Tyr Phe Cys Gln Gln Asp Tyr Asn Ser Pro Pro
                85                  90                  95

Thr Phe Gly Gly Gly Thr Lys Leu Glu Ile Lys
            100                 105

<210> SEQ ID NO 88
<211> LENGTH: 107
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 88

Asp Ile Val Met Thr Gln Ser Pro Asp Ser Leu Ala Val Ser Leu Gly
1               5                   10                  15

Glu Arg Ala Thr Ile Asn Cys Lys Ala Ser Gln Ser Val Ser Asn Asp
            20                  25                  30

Val Ala Trp Tyr Gln Gln Lys Pro Gly Gln Pro Pro Lys Leu Leu Ile
            35                  40                  45

Tyr Tyr Thr Ser Ser Arg Tyr Ala Gly Val Pro Asp Arg Phe Ser Gly
        50                  55                  60

Ser Gly Ser Gly Thr Asp Phe Thr Leu Thr Ile Ser Ser Leu Gln Ala
65                  70                  75                  80

Glu Asp Val Ala Val Tyr Tyr Cys Gln Gln Asp Tyr Asn Ser Pro Pro
                85                  90                  95

Thr Phe Gly Gly Gly Thr Lys Leu Glu Ile Lys
            100                 105

<210> SEQ ID NO 89
<211> LENGTH: 214
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 89

Asp Ile Gln Met Thr Gln Ser Pro Ser Ser Leu Ser Ala Ser Val Gly
1               5                   10                  15

Asp Arg Val Thr Ile Thr Cys Arg Ala Ser Gln Asp Val Ser Thr Ala
            20                  25                  30

Val Ala Trp Tyr Gln Gln Lys Pro Gly Lys Ala Pro Lys Leu Leu Ile
            35                  40                  45

Tyr Ser Ala Ser Phe Leu Tyr Ser Gly Val Pro Ser Arg Phe Ser Gly
        50                  55                  60

Ser Gly Ser Gly Thr Asp Phe Thr Leu Thr Ile Ser Ser Leu Gln Pro
65                  70                  75                  80

Glu Asp Phe Ala Thr Tyr Tyr Cys Gln Gln Tyr Leu Tyr His Pro Ala
                85                  90                  95
```

-continued

Thr Phe Gly Gln Gly Thr Lys Val Glu Ile Lys Arg Thr Val Ala Ala
            100                 105                 110

Pro Ser Val Phe Ile Phe Pro Pro Ser Asp Glu Gln Leu Lys Ser Gly
            115                 120                 125

Thr Ala Ser Val Val Cys Leu Leu Asn Asn Phe Tyr Pro Arg Glu Ala
            130                 135                 140

Lys Val Gln Trp Lys Val Asp Asn Ala Leu Gln Ser Gly Asn Ser Gln
145                 150                 155                 160

Glu Ser Val Thr Glu Gln Asp Ser Lys Asp Ser Thr Tyr Ser Leu Ser
            165                 170                 175

Ser Thr Leu Thr Leu Ser Lys Ala Asp Tyr Glu Lys His Lys Val Tyr
            180                 185                 190

Ala Cys Glu Val Thr His Gln Gly Leu Ser Ser Pro Val Thr Lys Ser
            195                 200                 205

Phe Asn Arg Gly Glu Cys
    210

<210> SEQ ID NO 90
<211> LENGTH: 448
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 90

Glu Val Gln Leu Val Glu Ser Gly Gly Gly Leu Val Gln Pro Gly Gly
1               5                   10                  15

Ser Leu Arg Leu Ser Cys Ala Ala Ser Gly Phe Thr Phe Ser Asp Ser
            20                  25                  30

Trp Ile His Trp Val Arg Gln Ala Pro Gly Lys Gly Leu Glu Trp Val
            35                  40                  45

Ala Trp Ile Ser Pro Tyr Gly Gly Ser Thr Tyr Tyr Ala Asp Ser Val
    50                  55                  60

Lys Gly Arg Phe Thr Ile Ser Ala Asp Thr Ser Lys Asn Thr Ala Tyr
65                  70                  75                  80

Leu Gln Met Asn Ser Leu Arg Ala Glu Asp Thr Ala Val Tyr Tyr Cys
            85                  90                  95

Ala Arg Arg His Trp Pro Gly Gly Phe Asp Tyr Trp Gly Gln Gly Thr
            100                 105                 110

Leu Val Thr Val Ser Ser Ala Ser Thr Lys Gly Pro Ser Val Phe Pro
            115                 120                 125

Leu Ala Pro Ser Ser Lys Ser Thr Ser Gly Gly Thr Ala Ala Leu Gly
            130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
            165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
            195                 200                 205

Asn Thr Lys Val Asp Lys Lys Val Glu Pro Lys Ser Cys Asp Lys Thr
            210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
            245                 250                 255

Thr Pro Glu Val Thr Cys Val Val Val Asp Val Ser His Glu Asp Pro
        260                 265                 270

Glu Val Lys Phe Asn Trp Tyr Val Asp Gly Val Glu Val His Asn Ala
    275                 280                 285

Lys Thr Lys Pro Arg Glu Glu Gln Tyr Ala Ser Thr Tyr Arg Val Val
290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Pro Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Glu Glu Met Thr Lys Asn Gln Val Ser Leu Thr Cys
        355                 360                 365

Leu Val Lys Gly Phe Tyr Pro Ser Asp Ile Ala Val Glu Trp Glu Ser
370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
            420                 425                 430

Leu His Asn His Tyr Thr Gln Lys Ser Leu Ser Leu Ser Pro Gly Lys
        435                 440                 445

<210> SEQ ID NO 91
<211> LENGTH: 440
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic polypeptide"

<400> SEQUENCE: 91

Gln Val Gln Leu Val Glu Ser Gly Gly Gly Val Val Gln Pro Gly Arg
1               5                   10                  15

Ser Leu Arg Leu Asp Cys Lys Ala Ser Gly Ile Thr Phe Ser Asn Ser
            20                  25                  30

Gly Met His Trp Val Arg Gln Ala Pro Gly Lys Gly Leu Glu Trp Val
        35                  40                  45

Ala Val Ile Trp Tyr Asp Gly Ser Lys Arg Tyr Tyr Ala Asp Ser Val
    50                  55                  60

Lys Gly Arg Phe Thr Ile Ser Arg Asp Asn Ser Lys Asn Thr Leu Phe
65                  70                  75                  80

Leu Gln Met Asn Ser Leu Arg Ala Glu Asp Thr Ala Val Tyr Tyr Cys
                85                  90                  95

Ala Thr Asn Asp Asp Tyr Trp Gly Gln Gly Thr Leu Val Thr Val Ser
            100                 105                 110

Ser Ala Ser Thr Lys Gly Pro Ser Val Phe Pro Leu Ala Pro Cys Ser
        115                 120                 125

Arg Ser Thr Ser Glu Ser Thr Ala Ala Leu Gly Cys Leu Val Lys Asp

```
                    130                 135                 140

Tyr Phe Pro Glu Pro Val Thr Val Ser Trp Asn Ser Gly Ala Leu Thr
145                 150                 155                 160

Ser Gly Val His Thr Phe Pro Ala Val Leu Gln Ser Ser Gly Leu Tyr
                165                 170                 175

Ser Leu Ser Ser Val Val Thr Val Pro Ser Ser Ser Leu Gly Thr Lys
            180                 185                 190

Thr Tyr Thr Cys Asn Val Asp His Lys Pro Ser Asn Thr Lys Val Asp
            195                 200                 205

Lys Arg Val Glu Ser Lys Tyr Gly Pro Pro Cys Pro Pro Cys Pro Ala
        210                 215                 220

Pro Glu Phe Leu Gly Gly Pro Ser Val Phe Leu Phe Pro Pro Lys Pro
225                 230                 235                 240

Lys Asp Thr Leu Met Ile Ser Arg Thr Pro Glu Val Thr Cys Val Val
                245                 250                 255

Val Asp Val Ser Gln Glu Asp Pro Glu Val Gln Phe Asn Trp Tyr Val
            260                 265                 270

Asp Gly Val Glu Val His Asn Ala Lys Thr Lys Pro Arg Glu Glu Gln
        275                 280                 285

Phe Asn Ser Thr Tyr Arg Val Val Ser Val Leu Thr Val Leu His Gln
290                 295                 300

Asp Trp Leu Asn Gly Lys Glu Tyr Lys Cys Lys Val Ser Asn Lys Gly
305                 310                 315                 320

Leu Pro Ser Ser Ile Glu Lys Thr Ile Ser Lys Ala Lys Gly Gln Pro
                325                 330                 335

Arg Glu Pro Gln Val Tyr Thr Leu Pro Pro Ser Gln Glu Glu Met Thr
            340                 345                 350

Lys Asn Gln Val Ser Leu Thr Cys Leu Val Lys Gly Phe Tyr Pro Ser
        355                 360                 365

Asp Ile Ala Val Glu Trp Glu Ser Asn Gly Gln Pro Glu Asn Asn Tyr
370                 375                 380

Lys Thr Thr Pro Pro Val Leu Asp Ser Asp Gly Ser Phe Phe Leu Tyr
385                 390                 395                 400

Ser Arg Leu Thr Val Asp Lys Ser Arg Trp Gln Glu Gly Asn Val Phe
                405                 410                 415

Ser Cys Ser Val Met His Glu Ala Leu His Asn His Tyr Thr Gln Lys
            420                 425                 430

Ser Leu Ser Leu Ser Leu Gly Lys
        435                 440

<210> SEQ ID NO 92
<211> LENGTH: 218
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 92

Glu Ile Val Leu Thr Gln Ser Pro Ala Thr Leu Ser Leu Ser Pro Gly
1               5                   10                  15

Glu Arg Ala Thr Leu Ser Cys Arg Ala Ser Lys Gly Val Ser Thr Ser
            20                  25                  30

Gly Tyr Ser Tyr Leu His Trp Tyr Gln Gln Lys Pro Gly Gln Ala Pro
        35                  40                  45
```

```
Arg Leu Leu Ile Tyr Leu Ala Ser Tyr Leu Glu Ser Gly Val Pro Ala
 50                  55                  60

Arg Phe Ser Gly Ser Gly Ser Gly Thr Asp Phe Thr Leu Thr Ile Ser
 65                  70                  75                  80

Ser Leu Glu Pro Glu Asp Phe Ala Val Tyr Tyr Cys Gln His Ser Arg
                 85                  90                  95

Asp Leu Pro Leu Thr Phe Gly Gly Gly Thr Lys Val Glu Ile Lys Arg
            100                 105                 110

Thr Val Ala Ala Pro Ser Val Phe Ile Phe Pro Pro Ser Asp Glu Gln
            115                 120                 125

Leu Lys Ser Gly Thr Ala Ser Val Val Cys Leu Leu Asn Asn Phe Tyr
130                 135                 140

Pro Arg Glu Ala Lys Val Gln Trp Lys Val Asp Asn Ala Leu Gln Ser
145                 150                 155                 160

Gly Asn Ser Gln Glu Ser Val Thr Glu Gln Asp Ser Lys Asp Ser Thr
                165                 170                 175

Tyr Ser Leu Ser Ser Thr Leu Thr Leu Ser Lys Ala Asp Tyr Glu Lys
            180                 185                 190

His Lys Val Tyr Ala Cys Glu Val Thr His Gln Gly Leu Ser Ser Pro
            195                 200                 205

Val Thr Lys Ser Phe Asn Arg Gly Glu Cys
210                 215

<210> SEQ ID NO 93
<211> LENGTH: 447
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 93

Gln Val Gln Leu Val Gln Ser Gly Val Glu Val Lys Lys Pro Gly Ala
 1                   5                  10                  15

Ser Val Lys Val Ser Cys Lys Ala Ser Gly Tyr Thr Phe Thr Asn Tyr
                 20                  25                  30

Tyr Met Tyr Trp Val Arg Gln Ala Pro Gly Gln Gly Leu Glu Trp Met
             35                  40                  45

Gly Gly Ile Asn Pro Ser Asn Gly Gly Thr Asn Phe Asn Glu Lys Phe
 50                  55                  60

Lys Asn Arg Val Thr Leu Thr Thr Asp Ser Ser Thr Thr Thr Ala Tyr
 65                  70                  75                  80

Met Glu Leu Lys Ser Leu Gln Phe Asp Asp Thr Ala Val Tyr Tyr Cys
                 85                  90                  95

Ala Arg Arg Asp Tyr Arg Phe Asp Met Gly Phe Asp Tyr Trp Gly Gln
            100                 105                 110

Gly Thr Thr Val Thr Val Ser Ser Ala Ser Thr Lys Gly Pro Ser Val
            115                 120                 125

Phe Pro Leu Ala Pro Cys Ser Arg Ser Thr Ser Glu Ser Thr Ala Ala
130                 135                 140

Leu Gly Cys Leu Val Lys Asp Tyr Phe Pro Glu Pro Val Thr Val Ser
145                 150                 155                 160

Trp Asn Ser Gly Ala Leu Thr Ser Gly Val His Thr Phe Pro Ala Val
                165                 170                 175
```

Leu Gln Ser Ser Gly Leu Tyr Ser Leu Ser Ser Val Val Thr Val Pro
            180                 185                 190

Ser Ser Ser Leu Gly Thr Lys Thr Tyr Thr Cys Asn Val Asp His Lys
        195                 200                 205

Pro Ser Asn Thr Lys Val Asp Lys Arg Val Glu Ser Lys Tyr Gly Pro
    210                 215                 220

Pro Cys Pro Pro Cys Pro Ala Pro Glu Phe Leu Gly Gly Pro Ser Val
225                 230                 235                 240

Phe Leu Phe Pro Pro Lys Pro Lys Asp Thr Leu Met Ile Ser Arg Thr
            245                 250                 255

Pro Glu Val Thr Cys Val Val Val Asp Val Ser Gln Glu Asp Pro Glu
        260                 265                 270

Val Gln Phe Asn Trp Tyr Val Asp Gly Val Glu Val His Asn Ala Lys
    275                 280                 285

Thr Lys Pro Arg Glu Glu Gln Phe Asn Ser Thr Tyr Arg Val Val Ser
290                 295                 300

Val Leu Thr Val Leu His Gln Asp Trp Leu Asn Gly Lys Glu Tyr Lys
305                 310                 315                 320

Cys Lys Val Ser Asn Lys Gly Leu Pro Ser Ser Ile Glu Lys Thr Ile
            325                 330                 335

Ser Lys Ala Lys Gly Gln Pro Arg Glu Pro Gln Val Tyr Thr Leu Pro
        340                 345                 350

Pro Ser Gln Glu Glu Met Thr Lys Asn Gln Val Ser Leu Thr Cys Leu
    355                 360                 365

Val Lys Gly Phe Tyr Pro Ser Asp Ile Ala Val Glu Trp Glu Ser Asn
370                 375                 380

Gly Gln Pro Glu Asn Asn Tyr Lys Thr Thr Pro Pro Val Leu Asp Ser
385                 390                 395                 400

Asp Gly Ser Phe Phe Leu Tyr Ser Arg Leu Thr Val Asp Lys Ser Arg
            405                 410                 415

Trp Gln Glu Gly Asn Val Phe Ser Cys Ser Val Met His Glu Ala Leu
        420                 425                 430

His Asn His Tyr Thr Gln Lys Ser Leu Ser Leu Ser Leu Gly Lys
    435                 440                 445

<210> SEQ ID NO 94
<211> LENGTH: 375
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 94

Asp Lys Thr His Thr Cys Pro Pro Cys Pro Ala Pro Glu Leu Leu Gly
1               5                   10                  15

Gly Pro Ser Val Phe Leu Phe Pro Pro Lys Pro Lys Asp Thr Leu Met
            20                  25                  30

Ile Ser Arg Thr Pro Glu Val Thr Cys Val Val Val Asp Val Ser His
        35                  40                  45

Glu Asp Pro Glu Val Lys Phe Asn Trp Tyr Val Asp Gly Val Glu Val
    50                  55                  60

His Asn Ala Lys Thr Lys Pro Arg Glu Glu Gln Tyr Ala Ser Thr Tyr
65                  70                  75                  80

Arg Val Val Ser Val Leu Thr Val Leu His Gln Asp Trp Leu Asn Gly

```
                85                  90                  95
Lys Glu Tyr Lys Cys Lys Val Ser Asn Lys Ala Leu Pro Ala Pro Ile
            100                 105                 110
Glu Lys Thr Ile Ser Lys Ala Lys Gly Gln Pro Arg Glu Pro Gln Val
            115                 120                 125
Tyr Thr Leu Pro Pro Cys Arg Asp Glu Leu Thr Lys Asn Gln Val Ser
            130                 135                 140
Leu Trp Cys Leu Val Lys Gly Phe Tyr Pro Ser Asp Ile Ala Val Glu
145                 150                 155                 160
Trp Glu Ser Asn Gly Gln Pro Glu Asn Asn Tyr Lys Thr Thr Pro Pro
                165                 170                 175
Val Leu Asp Ser Asp Gly Ser Phe Phe Leu Tyr Ser Lys Leu Thr Val
                180                 185                 190
Asp Lys Ser Arg Trp Gln Gln Gly Asn Val Phe Ser Cys Ser Val Met
                195                 200                 205
His Glu Ala Leu His Asn His Tyr Thr Gln Lys Ser Leu Ser Leu Ser
            210                 215                 220
Pro Gly Ala Gly Gly Gly Ser Gly Gly Gly Ser Gly Gly Gly
225                 230                 235                 240
Gly Ser Gln Gly Gln Asp Arg His Met Ile Arg Met Arg Gln Leu Ile
                245                 250                 255
Asp Ile Val Asp Gln Leu Lys Asn Tyr Val Asn Asp Leu Val Pro Glu
            260                 265                 270
Phe Leu Pro Ala Pro Glu Asp Val Glu Thr Asn Cys Glu Trp Ser Ala
            275                 280                 285
Phe Ser Cys Phe Gln Lys Ala Gln Leu Lys Ser Ala Asn Thr Gly Asn
            290                 295                 300
Asn Glu Arg Ile Ile Asn Val Ser Ile Lys Lys Leu Lys Arg Lys Pro
305                 310                 315                 320
Pro Ser Thr Asn Ala Gly Arg Arg Gln Lys His Arg Leu Thr Cys Pro
                325                 330                 335
Ser Cys Asp Ser Tyr Glu Lys Lys Pro Pro Lys Glu Phe Leu Glu Arg
                340                 345                 350
Phe Lys Ser Leu Leu Gln Lys Met Ile His Gln His Leu Ser Ser Arg
                355                 360                 365
Thr His Gly Ser Glu Asp Ser
            370                 375

<210> SEQ ID NO 95
<211> LENGTH: 375
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic polypeptide"

<400> SEQUENCE: 95

Asp Lys Thr His Thr Cys Pro Pro Cys Pro Ala Pro Glu Leu Leu Gly
1               5                   10                  15
Gly Pro Ser Val Phe Leu Phe Pro Pro Lys Pro Lys Asp Thr Leu Met
                20                  25                  30
Ile Ser Arg Thr Pro Glu Val Thr Cys Val Val Val Asp Val Ser His
            35                  40                  45
Glu Asp Pro Glu Val Lys Phe Asn Trp Tyr Val Asp Gly Val Glu Val
50                  55                  60
```

His Asn Ala Lys Thr Lys Pro Arg Glu Glu Gln Tyr Ala Ser Thr Tyr
65                  70                  75                  80

Arg Val Val Ser Val Leu Thr Val Leu His Gln Asp Trp Leu Asn Gly
                85                  90                  95

Lys Glu Tyr Lys Cys Lys Val Ser Asn Lys Ala Leu Pro Ala Pro Ile
            100                 105                 110

Glu Lys Thr Ile Ser Lys Ala Lys Gly Gln Pro Arg Glu Pro Gln Val
        115                 120                 125

Tyr Thr Leu Pro Pro Cys Arg Asp Glu Leu Thr Lys Asn Gln Val Ser
    130                 135                 140

Leu Trp Cys Leu Val Lys Gly Phe Tyr Pro Ser Asp Ile Ala Val Glu
145                 150                 155                 160

Trp Glu Ser Asn Gly Gln Pro Glu Asn Asn Tyr Lys Thr Thr Pro Pro
                165                 170                 175

Val Leu Asp Ser Asp Gly Ser Phe Phe Leu Tyr Ser Lys Leu Thr Val
            180                 185                 190

Asp Lys Ser Arg Trp Gln Gln Gly Asn Val Phe Ser Cys Ser Val Met
        195                 200                 205

His Glu Ala Leu His Asn His Tyr Thr Gln Lys Ser Leu Ser Leu Ser
    210                 215                 220

Pro Gly Ala Gly Gly Gly Gly Ser Gly Gly Gly Ser Gly Gly Gly
225                 230                 235                 240

Gly Ser Gln Gly Gln Asp Arg His Met Ile Arg Met Arg Gln Leu Ile
                245                 250                 255

Asp Ile Val Asp Lys Leu Lys Asn Tyr Val Asn Asp Leu Val Pro Glu
            260                 265                 270

Phe Leu Pro Ala Pro Glu Asp Val Glu Thr Asn Cys Glu Trp Ser Ala
        275                 280                 285

Phe Ser Cys Phe Gln Lys Ala Gln Leu Lys Ser Ala Asn Thr Gly Asn
    290                 295                 300

Asn Glu Arg Ile Ile Asn Val Ser Ile Lys Lys Leu Lys Arg Lys Pro
305                 310                 315                 320

Pro Ser Thr Asn Ala Gly Arg Arg Gln Lys His Arg Leu Thr Cys Pro
                325                 330                 335

Ser Cys Asp Ser Tyr Glu Lys Lys Pro Pro Lys Glu Phe Leu Arg Arg
            340                 345                 350

Phe Lys Ser Leu Leu Gln Lys Met Ile His Gln His Leu Ser Ser Arg
        355                 360                 365

Thr His Gly Ser Glu Asp Ser
    370                 375

<210> SEQ ID NO 96
<211> LENGTH: 227
<212> TYPE: PRT
<213> ORGANISM: Artificial Sequence
<220> FEATURE:
<221> NAME/KEY: source
<223> OTHER INFORMATION: /note="Description of Artificial Sequence:
    Synthetic polypeptide"

<400> SEQUENCE: 96

Asp Lys Thr His Thr Cys Pro Pro Cys Pro Ala Pro Glu Ala Ala Gly
1               5                   10                  15

Gly Pro Ser Val Phe Leu Phe Pro Pro Lys Pro Lys Asp Thr Leu Met
            20                  25                  30

```
Ile Ser Arg Thr Pro Glu Val Thr Cys Val Val Val Asp Val Ser His
            35                  40                  45
Glu Asp Pro Glu Val Lys Phe Asn Trp Tyr Val Asp Gly Val Glu Val
 50                  55                  60
His Asn Ala Lys Thr Lys Pro Arg Glu Glu Gln Tyr Asn Ser Thr Tyr
 65                  70                  75                  80
Arg Val Val Ser Val Leu Thr Val Leu His Gln Asp Trp Leu Asn Gly
                 85                  90                  95
Lys Glu Tyr Lys Cys Lys Val Ser Asn Lys Ala Leu Pro Ala Pro Ile
             100                 105                 110
Glu Lys Thr Ile Ser Lys Ala Lys Gly Gln Pro Arg Glu Pro Gln Val
             115                 120                 125
Cys Thr Leu Pro Pro Ser Arg Asp Glu Leu Thr Lys Asn Gln Val Ser
 130                 135                 140
Leu Ser Cys Ala Val Lys Gly Phe Tyr Pro Ser Asp Ile Ala Val Glu
145                 150                 155                 160
Trp Glu Ser Asn Gly Gln Pro Glu Asn Asn Tyr Lys Thr Thr Pro Pro
                 165                 170                 175
Val Leu Asp Ser Asp Gly Ser Phe Phe Leu Val Ser Lys Leu Thr Val
                 180                 185                 190
Asp Lys Ser Arg Trp Gln Gln Gly Asn Val Phe Ser Cys Ser Val Met
             195                 200                 205
His Glu Ala Leu His Asn His Tyr Thr Gln Lys Ser Leu Ser Leu Ser
             210                 215                 220
Pro Gly Lys
225

<210> SEQ ID NO 97
<211> LENGTH: 20
<212> TYPE: PRT
<213> ORGANISM: Artificial Sequence
<220> FEATURE:
<221> NAME/KEY: source
<223> OTHER INFORMATION: /note="Description of Artificial Sequence:
      Synthetic peptide"
<220> FEATURE:
<221> NAME/KEY: SITE
<222> LOCATION: (1)..(20)
<223> OTHER INFORMATION: /note="This sequence may encompass 1-4 'Gly Gly
      Gly Gly Ser' repeating units"

<400> SEQUENCE: 97

Gly Gly Gly Gly Ser Gly Gly Gly Gly Ser Gly Gly Gly Gly Ser Gly
1               5                   10                  15
Gly Gly Gly Ser
            20
```

The invention claimed is:

1. A prodrug comprising a human IL-21 agonist polypeptide, a masking moiety, and a carrier moiety, wherein the human IL-21 agonist polypeptide comprises SEQ ID NO: 1, or comprise an amino acid sequence identical to SEQ ID NO: 1 but for one or more mutations selected from D18A/K, Q19K, and E109R (numbering according to SEQ ID NO: 1), the masking moiety comprises consists of an extracellular domain (ECD) of a human IL-21 receptor α or γ subunit, the human IL-21 agonist polypeptide is fused to the carrier moiety, and the masking moiety is fused to the human IL-21 agonist polypeptide or to the carrier moiety through a cleavable peptide linker.

2. The prodrug of claim 1, wherein the IL-21 agonist polypeptide has an amino acid sequence selected from SEQ ID NO: 2, 3, 4, and 5.

3. The prodrug of claim 1, wherein the IL-21 receptor subunit ECD comprises SEQ ID NO: 6 or 7.

4. The prodrug of claim 1, further comprising a second cytokine moiety, wherein the second cytokine moiety comprises
   (i) a human IL-2 agonist polypeptide comprising SEQ ID NO: 8,
   (ii) a human IL-7 agonist polypeptide comprising SEQ ID NO: 28,
   (iii) a human IL-9 agonist polypeptide comprising wild-type human IL-9 polypeptide, (iv) a human IL-15 agonist polypeptide comprising SEQ ID NO: 9,
(v) a human IL-15 agonist polypeptide and a human IL-15 receptor alpha sushi domain, or
(vi) a human CCL19 polypeptide comprising SEQ ID NO: 27.

5. The prodrug of claim 4, further comprising a second masking moiety that binds to the second cytokine moiety and inhibits a biological activity of the second cytokine moiety, wherein the second masking moiety is fused to the second cytokine moiety or to the carrier moiety through a cleavable peptide linker, and wherein the second masking moiety comprises an ECD of IL-2 receptor beta subunit, an ECD of an IL-7 receptor, or an ECD of an IL-9 receptor.

6. The prodrug of claim 4, wherein the human IL-21 agonist polypeptide and/or the second cytokine moiety is fused to the carrier moiety through a noncleavable peptide linker.

7. The prodrug of claim 6, wherein the noncleavable peptide linker comprises an amino acid sequence selected from SEQ ID NOs: 29-33.

8. The prodrug of claim 1, wherein the cleavable peptide linker comprises a substrate sequence of urokinase-type plasminogen activator (uPA), matrix metallopeptidase (MMP) 2, or MMP9.

9. The prodrug of claim 8, wherein the cleavable peptide linker comprises substrate sequences of (i) both uPA and MMP2, (ii) both uPA and MMP9, or (iii) uPA, MMP2 and MMP9.

10. The prodrug of claim 8, wherein the cleavable peptide linker comprises an amino acid sequence selected from SEQ ID NOs: 11-26.

11. The prodrug of claim 1, wherein the cleavable peptide linker is cleavable by one or more proteases located at a tumor site or its surrounding environment, and the cleavage leads to activation of the prodrug at the tumor site or surrounding environment.

12. The prodrug of claim 1, wherein the carrier moiety is a PEG molecule, an albumin, an albumin fragment, an antibody Fc domain, or an antibody or an antigen-binding fragment thereof.

13. The prodrug of claim 12, wherein the carrier moiety is an antibody Fc domain or an antibody that comprises L234A and L235A ("LALA") mutations (EU numbering).

14. The prodrug of claim 12, wherein the carrier moiety is an antibody Fc domain or an antibody comprising knobs-into-holes mutations, and wherein
the human IL-21 agonist polypeptide and its masking moiety are fused to different polypeptide chains of the antibody Fc domain or to the different heavy chains of the antibody, and optionally further comprising a second cytokine moiety and second masking moiety, wherein
the second cytokine moiety and the second masking moiety also are fused to different polypeptide chains of the antibody Fc domain or to the different heavy chains of the antibody.

15. The prodrug of claim 14, wherein the human IL-21 agonist polypeptide and its masking moiety are fused to the C-termini of the two different polypeptide chains of the Fc domain or to the C-termini of the two different heavy chains of the antibody.

16. The prodrug of claim 14, wherein the human IL-21 agonist polypeptide and its masking moiety are fused to the N-termini of the two different polypeptide chains of the Fc domain or to the N-termini of the two different heavy chains of the antibody.

17. The prodrug of claim 14, wherein the second cytokine moiety and the second masking moiety are fused to the opposite termini of the two different polypeptide chains of the Fc domain, or to the opposite termini of the two different heavy chains of the antibody, from the human IL-21 agonist polypeptide and its masking moiety.

18. The prodrug of claim 14, wherein the knobs-into-holes mutations comprise a T366Y "knob" mutation on a polypeptide chain of the Fc domain or a heavy chain of the antibody, and a Y407T "hole" mutation in the other polypeptide of the Fc domain or the other heavy chain of the antibody (EU numbering).

19. The prodrug of claim 14, wherein the knobs-into-holes mutations comprise Y349C and/or T366W mutations in the CH3 domain of the "knob chain" and E356C, T366S, L368A, and/or Y407V mutations in the CH3 domain of the "hole chain" (EU numbering).

20. The prodrug of claim 14, wherein said prodrug comprises two polypeptide chains whose amino acid sequences respectively comprise
SEQ ID NOs: 36 and 38,
SEQ ID NOs: 37 and 38,
SEQ ID NOs: 39 and 41, or
SEQ ID NOs: 40 and 41.

21. The prodrug of claim 12, wherein the carrier moiety is an antibody or an antigen-binding fragment thereof that specifically binds to one or more antigens selected from Guanyl cyclase C (GCC), carbohydrate antigen 19-9 (CA19-9), glycoprotein A33 (gpA33), mucin 1 (MUC1), carcinoembryonic antigen (CEA), insulin-like growth factor 1 receptor (IGF1-R), human epidermal growth factor receptor 2 (HER2), human epidermal growth factor receptor 3 (HER3), delta-like protein 3 (DLL3), delta-like protein 4 (DLL4), epidermal growth factor receptor (EGFR), glypican-3 (GPC3), c-MET, vascular endothelial growth factor receptor 1 (VEGFR1), vascular endothelial growth factor receptor 2 (VEGFR2), Nectin-4, Liv-1, glycoprotein NMB (GPNMB), prostate specific membrane antigen (PSMA), Trop-2, carbonic anhydrase IX (CA9), endothelin B receptor (ETBR), six transmembrane epithelial antigen of the prostate 1 (STEAP1), folate receptor alpha (FR-α), SLIT and NTRK-like protein 6 (SLITRK6), carbonic anhydrase VI (CA6), ectonucleotide pyrophosphatase/phosphodiesterase family member 3 (ENPP3), mesothelin, trophoblast glycoprotein (TPBG), CD19, CD20, CD22, CD33, CD40, CD56, CD66e, CD70, CD74, CD79b, CD98, CD123, CD138, CD352, CD47, signal- regulatory protein alpha (SIRPα), PD1, Claudin 18.2, Claudin 6, 5T4, BCMA, PD-L1, PD-1, Fibroblast Activation Protein alpha (FAPalpha), the Melanoma-associated Chondroitin Sulfate Proteoglycan (MCSP), and EPCAM.

22. The prodrug of claim 12, comprising two heavy chain polypeptides whose amino acid sequences comprise SEQ ID NOs: 48 and 49, respectively; and a light chain comprises SEQ ID NO: 50 or 51.

23. A pharmaceutical composition comprising the prodrug of claim 1 and a pharmaceutically acceptable excipient.

24. A method of treating a cancer or an infectious disease, or stimulating the immune system, in a patient in need thereof, comprising administering to the patient a therapeutically effective amount of the pharmaceutical composition of claim 23.

25. The method of claim 24, wherein the patient has HIV, HBV, HCV, or HPV infection; or a cancer selected from the group consisting of breast cancer, lung cancer, pancreatic cancer, esophageal cancer, medullary thyroid cancer, ovarian cancer, uterine cancer, prostate cancer, testicular cancer, colorectal cancer, and stomach cancer.

* * * * *